United States Patent [19]

Gavril

[11] Patent Number: 4,727,477
[45] Date of Patent: Feb. 23, 1988

[54] LOGICALLY TRANSPORTABLE MICROPROCESSOR INTERFACE CONTROL UNIT PERMITTING BUS TRANSFERS WITH DIFFERENT BUT COMPATIBLE OTHER MICROPROCESSORS

[75] Inventor: Bruce D. Gavril, Chappaqua, N.Y.

[73] Assignee: International Business Machines Corp., Armonk, N.Y.

[21] Appl. No.: 714,761

[22] Filed: Mar. 22, 1985

[51] Int. Cl.[4] .................................... G06F 13/40
[52] U.S. Cl. ............................................ 364/200
[58] Field of Search ... 364/200 MS File, 900 MS File

[56] References Cited

U.S. PATENT DOCUMENTS

| | | | |
|---|---|---|---|
| 4,225,919 | 9/1980 | Kyu | 364/200 |
| 4,377,843 | 3/1983 | Garringer | 364/200 |
| 4,453,229 | 6/1984 | Schaire | 364/900 |
| 4,485,439 | 11/1984 | Rothstein | 364/200 |

*Primary Examiner*—Archie E. Williams, Jr.
*Assistant Examiner*—Emily Y. Chan
*Attorney, Agent, or Firm*—C. Lamont Whitham

[57] ABSTRACT

A transportable bus control architecture for single-chip microprocessors consists of an interface control unit that is logically independent of the associated co-resident, common clock-driven microprocessing unit. This independence allows the interface control unit logic to be used with a variety of microprocessing units. The interface control unit presents an external appearance that is compatible with the peripheral devices of a specific microprocessor referred to as the "compatible microprocessor", thereby making available to an associated co-resident microprocessing unit the support devices of the compatible microprocessor. The interface control unit can also access other external devices not related and transparent to the devices of the compatible microprocessor. The interface control unit is logically divided into an execution section and a control section. The execution section is controlled by the control section and comprises various registers, latches, multiplexers, logic, and data and address paths that provide communication between the co-resident microprocessing unit and off-chip devices. The control section of the interface control unit executes commands from the co-resident microprocessing unit and also performs bus arbitration, interrupt, and external reset functions. Bus cycles are memory-access or service, depending on the command from the co-resident microprocessing unit. Service cycles perform the interrupt acknowledge functions and other sense and control functions requested by the co-resident microprocessing unit. These sense and control functions have the special feature of being pin-programmable and pin-readable by the microprocessing unit. All action initiated by commands from the microprocessing unit elicits a comprehensive status response from the interface control unit.

23 Claims, 100 Drawing Figures

FIG. 4

| FIG. 4A |
|---------|
| FIG. 4B |

FIG. 4A

| CYCLE | FUNCTIONAL DESIGNATION | ADDRESS/COMMAND/DATA FIELD |
|-------|------------------------|----------------------------|
| SENSE/0 | + | ARBITRARY |
| SENSE/1 | + | " |
| SENSE/2 | + | " |
| SENSE/3 | READ COPROCESSOR | 31 ──────── 4 |
| SENSE/4 | SENSE S/370 INTERRUPTION CODE/LOW | 31 ──────── 4 |
| SENSE/5 | SENSE S/370 INTERRUPTION CODE/HIGH | 31 ──────── 4 |
| SENSE/6 | (RESERVED) | (NOT ASSIGNED) |
| SENSE/7 | SENSE STORAGE KEY | 31 ──────── 4 |

| | | |
|---|---|---|
| CONTROL/0 | + | ARBITRARY |
| CONTROL/1 | + | " |
| CONTROL/2 | + | " |
| CONTROL/3 | WRITE COPROCESSOR | `[                    ]` 31  4 |
| CONTROL/4 | (RESERVED) | (NOT ASSIGNED) |
| CONTROL/5 | DISPLAY NEW PSW | ← HIGH-ORDER THREE BYTES OF PSW → <br> `O R 0 0 0 T I_0 E_X  KEY  E M W P S O C C  MASK  0 0 0 0` <br> 31  2423 20 1615 12  8 7 6 5 4 |
| CONTROL/6 | PURGE TRANSLATION-LOOK-ASIDE BUFFER | `[                    ]` 31  4 |
| CONTROL/7 | STORE STORAGE KEY | `[                    ]` 31  4 |

| FIG. 5A |
|---|
| FIG. 5B |

FIG. 5A

| CYCLE | FUNCTIONAL DESIGNATION | DATA BUS FORMAT |
|---|---|---|
| SENSE/0 | + | 1 OF 4 ARBITRARY FORMATS |
| SENSE/1 | + | " |
| SENSE/2 | + | " |
| SENSE/3 | READ COPROCESSOR | 31 ──────────── 0 |
| SENSE/4 | SENSE S/370 INTERRUPTION CODE/ LOW | 31 ──────────── 0 |
| SENSE/5 | SENSE S/370 INTERRUPTION CODE/ HIGH | 31 ──────────── 0 |
| SENSE/6 | (RESERVED) | (NOT ASSIGNED) |
| SENSE/7 | SENSE STORAGE KEY | 31 ──────────── 0 |

| | | |
|---|---|---|
| CONTROL/0 | + | ARBITRARY |
| CONTROL/1 | + | " |
| CONTROL/2 | + | " |
| CONTROL/3 | WRITE COPROCESSOR | [0 ———— 31] 0 |
| CONTROL/4 | (RESERVED) | (NOT ASSIGNED) |
| CONTROL/5 | DISPLAY NEW PSW | ←— LOW-ORDER FOUR BYTES OF PSW —→ INSTRUCTION ADDRESS [0 ———— 31] 0 |
| CONTROL/6 | PURGE TRANSLATION-LOOK-ASIDE BUFFER | [0 ———— 31] 0 |
| CONTROL/7 | STORE STORAGE KEY | [0 ———— 31] 0 |

FIG.5B

+ DENOTES A PROGRAM-DEDICATED (NON-SHARED) CYCLE; SUCH CYCLES CAN BE ARBITRARILY APPLIED. FOR SENSE CYCLES, DATA BUS FORMAT DEPENDS UPON THE DEVICE ACK SIGNAL.

FOR THE "SHARED" SENSE AND CONTROL CYCLES (3-7), THE SINGLE DATA BUS FORMAT ILLUSTRATED IS THAT USED BY MPU-INITIATED CYCLES, INDEPENDENT OF THE DEVICE ACK SIGNAL.

FIG. 6

| RESPONSE CLASS | | | | VARIATIONS |
|---|---|---|---|---|
| NORMAL (4) | DEVICE EXCEPTIONS (8) | RERUN (2) | INTERFACE CHECK* (1) | |
| • WTACK | • BERR | BERR/HALT | • MULTIPLE ACKNOWLEDGE AND | • HALT |
| • DTACK | AND | • NORMAL RELEASE ↓ | • VPA TO CONTROL CYCLE | |
| • BTACK | ALL | • REVERSE RELEASE | | • CANCEL |
| • VPA | • COMBINATIONS (7) OF DTEXN/0 DTEXN/1 DTEXN/2 | | | • UNCONDITIONAL RERUN |

* THESE RESPONSES (12) ARE NOT DISTINGUISHED FROM ONE ANOTHER

FIG. 9

| GROUP | APPLICATION |
|---|---|
| (a) INDEPENDENT REQUEST (5) | SYSTEM INTERRUPTION REQUESTS |
| | • RESTART |
| | • EXTERNAL |
| | • PROGRAM |
| | • MACHINE |
| | • I/O |
| (b) TWO-BIT ENCODED REQUEST | PRIORITY REQUESTS |

| PR1 | PR0 | |
|---|---|---|
| 0 | 0 | • NONE |
| 0 | 1 | • STOP SYSTEM CPU |
| 1 | 0 | • START SYSTEM CPU |
| 1 | 1 | • E-UNIT DUMP |

(c) THREE-BIT ENCODED REQUEST   MC68000 INTERRUPT

| IPL2 | IPL1 | IPL0 | |
|---|---|---|---|
| 0 | 0 | 0 | • NONE |
| 0 | 0 | 1 | • INTERRUPT PRIORITY LEVEL 1 |
| ⋮ | ⋮ | ⋮ | ⋮ |
| 1 | 1 | 1 | • INTERRUPT PRIORITY LEVEL 7 |

FIG. 10

| REQUEST | ICU RESPONSE MEANS |
|---|---|
| SYSTEM/370 INTERRUPTION | LEVEL 0 SERVICE CYCLE/S |
| | SENSE/4 |
| | SENSE/5 |
| | |
| PRIORITY | S/370 CPU STATE INDICATORS |
| | 0 0  LOAD OR OPERATING |
| | 0 1  STOPPED |
| | 1 0  CHECK-STOP |
| | 1 1  (NEVER OCCURS) |
| MC 68000 INTERRUPT | LEVEL 1-7 SERVICE CYCLE |
| | (INTERRUPT ACKNOWLEDGE) |

FIG. 12A

| FUNCTIONAL GROUP | SIGNAL DIRECTION | | |
|---|---|---|---|
| | INPUT PINS (25) | OUTPUT PINS (47) | BI-DIRECTIONAL PINS (34) |
| ADDRESSING (32) | | Address Bus, A32-A01 (A32 = Real Address Tag) | |
| DATA (32) | | | Data Bus, D31-D00 |
| FUNCTION CODE (3) | | Function Code, FC2-FC0 | |
| BUS CYCLE CONTROLS (12) | Word Transfer Acknowledge, $\overline{\text{WTACK}}$<br>Data Transfer Acknowledge, $\overline{\text{DTACK}}$<br>Byte Transfer Acknowledge, $\overline{\text{BTACK}}$<br>Data Transfer Exception/0, $\overline{\text{DTEXN}}/0$<br>Data Transfer Exception/1, $\overline{\text{DTEXN}}/1$<br>Data Transfer Exception/2, $\overline{\text{DTEXN}}/2$<br>Bus Error, $\overline{\text{BERR}}$ | Read/Write, $\text{R}/\overline{\text{W}}$<br>Address Strobe, $\overline{\text{AS}}$<br>Word Strobe $\left.\begin{array}{c}\\\end{array}\right\}\overline{\text{WS}}/\overline{\text{SA3}}$<br>Service Address 3<br>Upper Data Strobe $\left.\begin{array}{c}\\\end{array}\right\}\overline{\text{UDS}}/\overline{\text{SA2}}$<br>Service Address 2<br>Lower Data Strobe $\left.\begin{array}{c}\\\end{array}\right\}\overline{\text{LDS}}/\overline{\text{SA1}}$<br>Service Address 1 | |

FIG. 12B

| | | | |
|---|---|---|---|
| INTERRUPT (ION) CONTROLS (10) | Interrupt Priority Level, $\overline{IPL2}$-$\overline{IPL0}$<br>Priority Request, $\overline{PR1}$-$\overline{PR0}$<br>System/370 Interruption Requests:<br>$\overline{IR4}$ = Restart<br>$\overline{IR3}$ = External<br>$\overline{IR2}$ = Program<br>$\overline{IR1}$ = Machine Check (Repressible)<br>$\overline{IR0}$ = I/O | | |
| BUS ARBITRATION CONTROLS (3) | Bus Request, $\overline{BR}$<br>Bus Grant Acknowledge, $\overline{BGACK}$ | Bus Grant, $\overline{BG}$ | |
| M6800 PERIPHERAL CONTROLS (3) | Valid Peripheral Address, $\overline{VPA}$ | Valid Memory Address $\overline{VMA}$/$\overline{OSS}$<br>Output Service Strobe<br>Enable, E | |

| RESET CONTROLS (2) | AUXILIARY RESET, $\overline{\text{XREST}}$ | | RESET, $\overline{\text{RESET}}$ |
|---|---|---|---|
| S/370 CPU STATE INDICATORS (2) | | SYSTEM/370 CPU STATE INDICATORS: <br> $\underline{1/1\ 1/0}$ <br> 0  0   LOAD OR OPERATING <br> 0  1   STOPPED <br> 1  0   CHECK-STOP <br> 1  1   (NEVER OCCURS) | |
| TIMING (2) | INPUT CLOCK, CLK | BUS CYCLE-IN-PROGRESS, $\overline{\text{BCIP}}$ | |
| MISCELLANEOUS CONTROLS (5) | SELECT READ CYCLE, 3T/$\overline{\text{4T}}$ <br> SUPPRESS 32 BIT OUTPUT, $\overline{\text{SUPPRESS}}$ <br> SELECT DUAL MODE, $\overline{\text{DUAL}}$ | MACROCYCLE-IN-PROGRESS, $\overline{\text{MIP}}$ | HALT, $\overline{\text{HALT}}$ |

FIG. 12C

| FIG. 12A |
|---|
| FIG. 12B |
| FIG. 12C |

FIG. 12

FIG. 13A
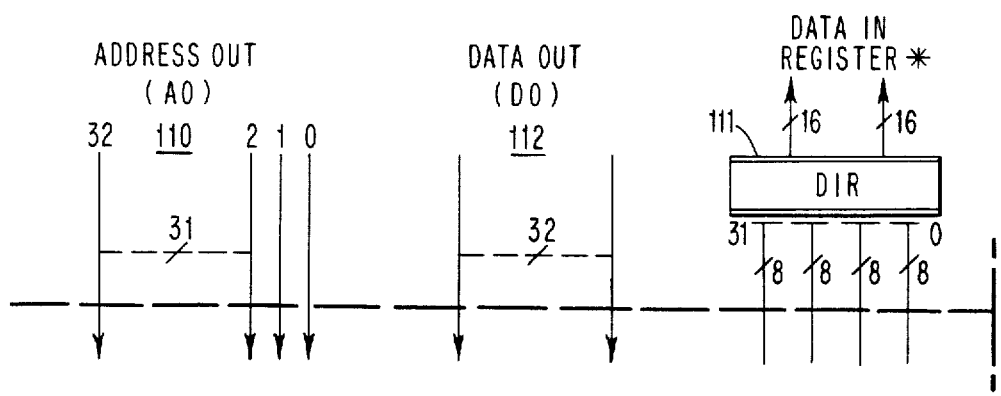
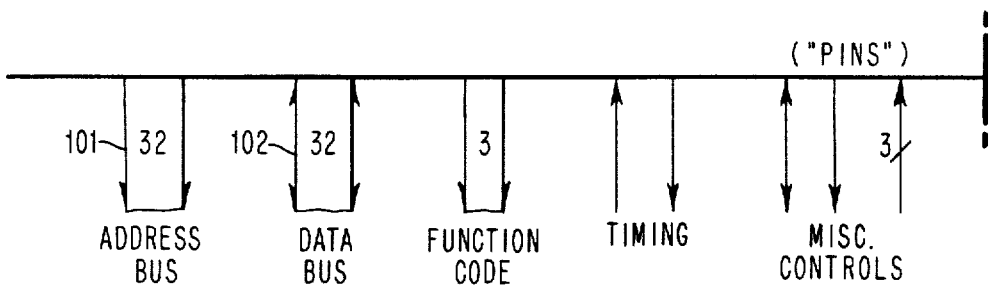

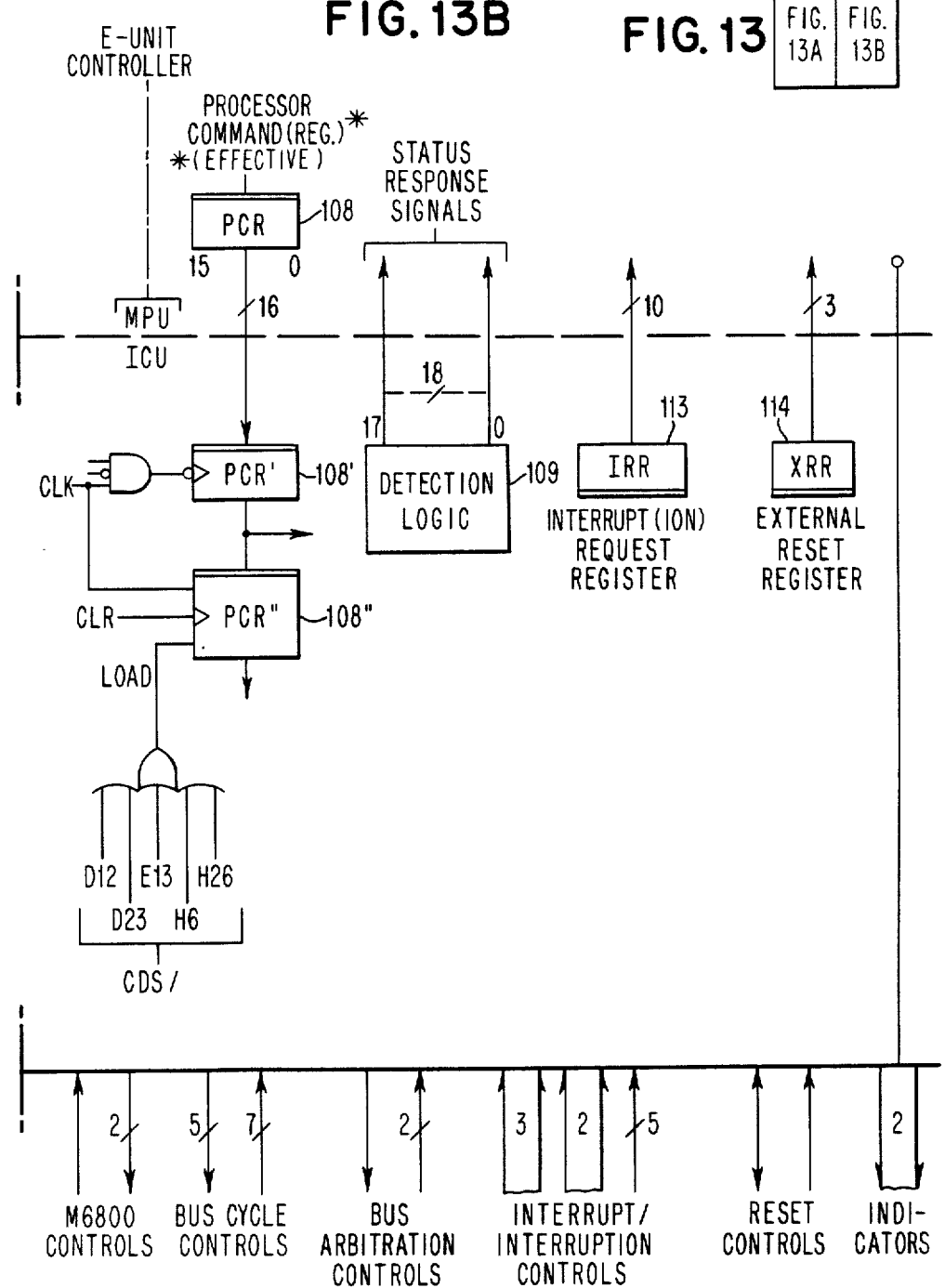

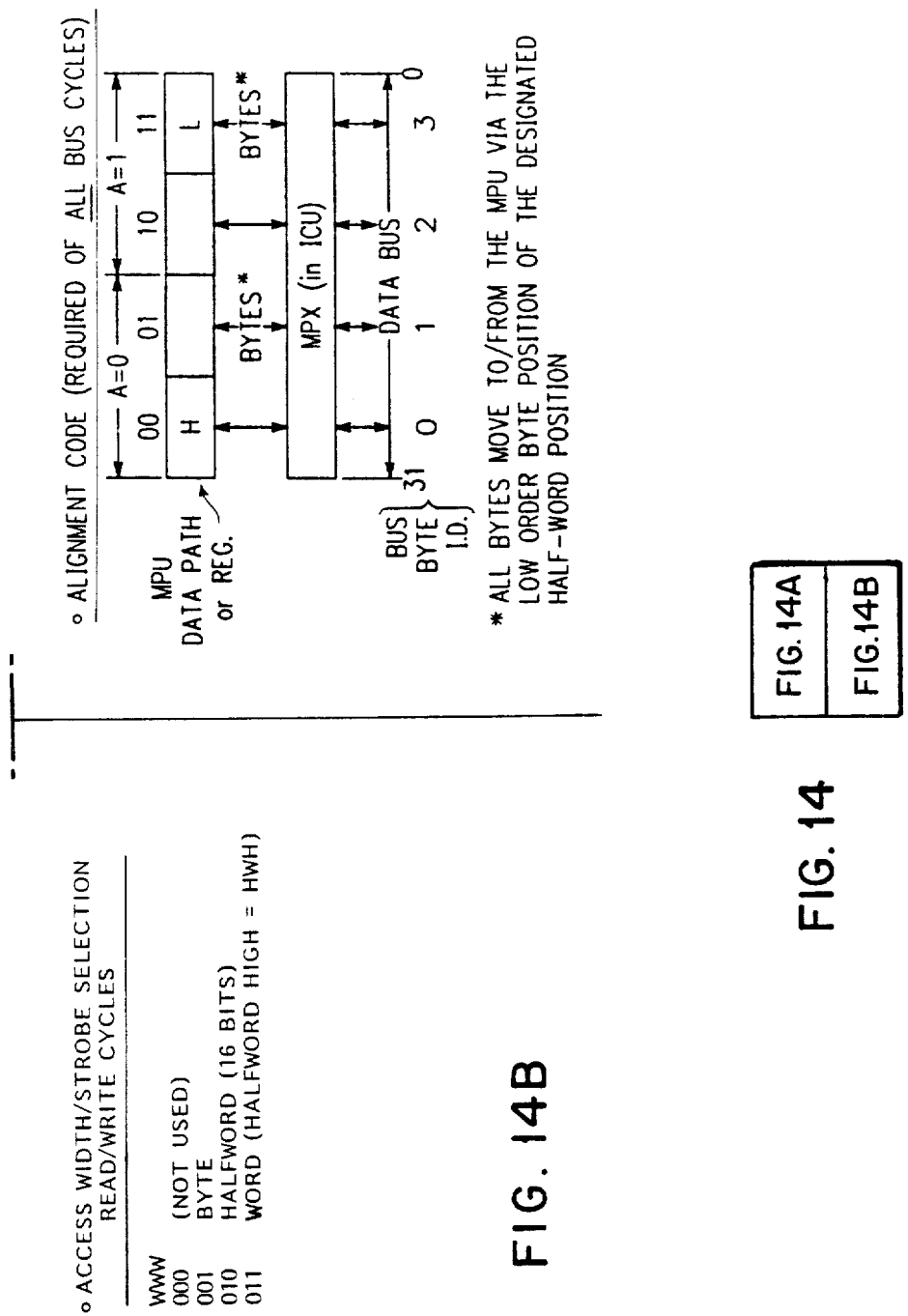
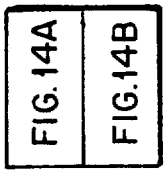
FIG. 14

FIG. 22

○ ADDRESS SELECTION LOGIC

| | Z' | Y' | WIP' | A1' | A0' | | AG2 | AG1 |
|---|---|---|---|---|---|---|---|---|
| A. | ALL CYCLES OTHER THAN CASES B. & C. BELOW† | | | | | | | |
| | X | 0 | 0 | X | X | | 0 | 0 |
| B. | SECOND CYCLE OF DOUBLE-CYCLE, WHEN WIP'=0 | | | | | | | |
| | X | 1 | 0 | 0 | 0 | | 0 | 0 |
| | ↓ | ↓ | ↓ | 0 | 1 | | 0 | 1 |
| | ↓ | ↓ | ↓ | 1 | 0 | | 0 | 0 |
| | ↓ | ↓ | ↓ | 1 | 1 | | 1 | 1 |
| C. | STORE FULL WORD (WIP'-1; A1'=1; A0'=0) | | | | | | | |
| | 0 | 0 | 1 | X | X | | 0 | 1 |
| | 0 | 1 | ↓ | ↓ | ↓ | | 0 | 1 |
| | 1 | 0 | ↓ | ↓ | ↓ | | 0 | 0 |
| | 1 | 1 | ↓ | ↓ | ↓ | | 0 | 0 |

†IT IS ASSUMED THAT THE MPU WILL MAINTAIN THE <u>SAME</u> ADDRESS DURING BOTH MICROCYCLES OF AN OUTPUT SERVICE CYCLE. FOR THESE CYCLES, A1' & A0' ARE PART OF THE LEVEL CODE.

FIG. 24

| FIG.24A | FIG.24B |
|---|---|
| FIG.24C | FIG.24D |

FIG. 24A

| OPERATION | REFERENCE | Q | * | ALIGNMENT CODE A" | BUS CYCLE B₃" B₄" | ACCESS WIDTH W₁₀" W₁₁" | CYCLE CODE Z' | Y' | WORD IN-PROG. WIP' | ADDRESS A0' | DEVICE RESPONSE WTACK' | DTACK' | ZTACK' OR VPA' |
|---|---|---|---|---|---|---|---|---|---|---|---|---|---|
| BUFFER HWH | CDS/D22 & CDS/H32 | 0 | | — | X | X X | X | X | X | X | X | X | X |
| | | 0 | | 0 | X | X X | X | X | X | X | | | |
| | | | Q | | | | | | | | | | |
| | | * | | — | | DENOTES THE ADDRESS ENABLE FF | | | | | | | |
| STORE BYTE | | | | 0 | 0 | 0 — | X | X | X | X | | | |
| | | | | — | 0 | 0 — | X | X | X | X | | | |
| | | | | 0 | 0 | — X | 0 | 0 | 0 | 0 | | | |
| STORE HALFWORD @ EVEN ADDRESS | | | | — | 0 | — X | 0 | — | 0 | 0 | | | |
| | | | | 0 | 0 | — X | 0 | 0 | 0 | 0 | | | |
| | | | | — | 0 | — X | X | — | 0 | 0 | | | |
| STORE HALFWORD @ ODD ADDRESS | | | | 0 | 0 | — X | X | 0 | 0 | — | | | |
| | | | | — | 0 | X X | X | — | 0 | — | | | |
| | | | | 0 | 0 | X X | X | X | 0 | — | | | |

FIG. 24B

| X0 | X1 | X2 | X3 | X4 | X5 | X6 | X7 | X8 | REMARKS |
|---|---|---|---|---|---|---|---|---|---|
| D0 0 | D0 1 | D0 2 | D0 3 | IOR 0 | IOR 1 | D0 | D1 | D3 | |
| — | — | y0 | y1 | — | — | — | — | — | THESE CONNECTIONS PROVIDE A PATH TO IOR 0/1; NOT BUS CYCLE. |
| y0 | y1 | — | — | — | — | — | — | — | |
| — | y0–y3 | — | — | — | — | — | — | — | THE BYTE IS MADE AVAILABLE TO ALL QUADRANTS OF THE BUS. |
| — | — | — | y0–y3 | — | — | — | — | — | |
| y0&y2 | y1&y3 | y0&y2 | y1&y3 | — | — | — | — | — | COMPLETE HALFWORD, DUPLICATED ON BOTH HALVES OF THE BUS.; (Y'=0) |
| — | y0–y3 | — | — | — | — | — | — | — | Y'=1; LOW ORDER BYTE RE-TRANSMITTED TO BYTE DEVICE (LDS) |
| — | — | — | y0–y3 | — | — | — | — | — | |
| y0–y3 | — | y0–y3 | — | — | — | — | — | — | Y'=0; HIGH ORDER BYTE TRANSMITTED ON ALL QUADRANTS OF BUS (LDS) |
| — | y0–y3 | — | — | — | — | — | — | — | Y'=1; LOW ORDER BYTE TRANSMITTED TO BYTE OR MC68000 DEVICE (UDS) |
| — | — | — | y0–y3 | — | — | — | — | — | |

CONNECTIONS

| | †ALIGNMENT CODE SHOULD BE A "=1 HERE. SEE CDS/H24 & DESIGN CHECK LOGIC | NOTE THAT THE IOR IS NOT NECESSARILY LOADED FOR ALL CASES REPRESENTED HERE. ACTUAL LOADING IS DETERMINED BY THE DETECTION OR SYNC SEQUENCES. ALSO SEE ACCOMPANYING NOTES. | THESE ARE THE ONLY VALID ONES CORRESPONDING TO WIP'=1 | | | | | |
|---|---|---|---|---|---|---|---|---|
| — | — | — | — | — | — | — | — | y0 |
| — | — | — | — | — | — | — | y0 | — |
| — | — | — | — | — | — | y0 | — | — |
| y1 | — | — | — | y1 | y0-y3 | — | — | — |
| | | | | y1 | y0-y3 | | | |
| y0 | — | — | — | y0 | — | — | — | — |
| | | | | y0 | | | | |
| y3 | — | — | — | y3 | — | — | — | — |
| | | | | y1&y3 | y1&y3 | | | |
| | | | | | y0-y3 | | | |
| y2 | — | — | — | y2 | — | — | — | — |
| | | | | y0&y2 | | | | |
| | | | | | y0-y3 | | | |
| — | — | — | y3 | — | — | — | — | — |
| | | | y1&y3 | | | | | |
| | | | y0-y3 | | | | | |
| — | — | — | y2 | — | — | — | — | — |
| | | | y0&y2 | | | | | |

| FIG.25A | FIG.25B |
|---------|---------|
| FIG.25C | FIG.25D |

FIG. 25A

| OPERATION | REFERENCE | Q ADDRESS ENABLE FF | ALIGNMENT CODE A″ | BUS CYCLE B₃″ | ACCESS WIDTH W₁₀″ | DOUBLE CYCLE CODE Y′ | ADDRESS A1′ | ADDRESS A0′ | DEVICE RESPONSE WTACK′ | DEVICE RESPONSE DTACK′ | DEVICE RESPONSE ZTACK′, OR VPA′ |
|---|---|---|---|---|---|---|---|---|---|---|---|
| FETCH HWL FROM IOR | BRS | 0 | 0 | X | X | X | X | X | X | X | X |
|  |  | 0 | 1 | X | X | X | X | X | X | X | X |
| FETCH BYTE |  | 1 | X | 0 → | 0 → | 0 → | X | X | 0 | 0 | 1 |
|  |  |  |  |  |  |  | X | 0 | 0 | 1 | 0 |
|  |  |  |  |  |  |  | X | 1 | 0 | 1 | 0 |
|  |  |  |  |  |  |  | 0 | 0 | 1 | 0 | 0 |
|  |  |  |  |  |  |  | 0 | 1 | 1 | 0 | 0 |
|  |  |  |  |  |  |  | 1 | 0 | 1 | 0 | 0 |
|  |  |  |  |  |  |  | 1 | 1 | 1 | 0 | 0 |

FIG. 25B

| X0 (D0) | X1 (D1) | X2 (D2) | X3 (D3) | X4 (IOR 0) | X5 (IOR 1) | X6 (IOR 2) | X7 (IOR 3) | REMARKS |
|---|---|---|---|---|---|---|---|---|
|  |  |  |  |  |  | y0 | y1 | USED WHEN WID = 1 AND FOR SECOND μCYCLE OF INPUTS PER CYCLE - TO FETCH HWL FROM IOR THERE IS NO BUS CYCLE. |
|  |  |  |  |  |  | y2 | y3 |  |
| y1/3 |  |  |  |  |  |  |  | BYTES ARE TACITLY STEPPED TO THE ODD LOCATIONS IN THE MPU'S DIR. |
| y1/3 |  |  |  |  |  |  |  |  |
|  | y1/3 |  |  |  |  |  |  |  |
| y1/3 |  |  |  |  |  |  |  |  |
|  | y1/3 |  |  |  |  |  |  |  |
|  |  | y1/3 |  |  |  |  |  |  |
|  |  |  | y1/3 |  |  |  |  |  |

|  |  |  |  |  |  |  |  |  |  |  | NOTE THAT THIS TACITLY REQUIRES THAT MEMORY MODULES BE HALFWORD ALIGNED! |
|---|---|---|---|---|---|---|---|---|---|---|---|
|  |  |  |  | y0/2 |  |  |  |  |  |  | ← DATA WILL BE STORED BY MPU ONLY FOR A0' = 0 |
| y1/3 | y0/2 | y1/3 |  |  |  |  |  |  |  |  |  |
|  | y0/2 | y1/3 | y1/3 |  |  |  |  |  |  |  | ← HERE, INCIDENTALLY, D2 & D3 ARE BUFFERED IF CM'D IS FETCH WORD. THE IMUX IS NOT NEEDED FOR THIS STEP. |
|  |  | y0/2 | y1/3 |  |  |  |  |  |  |  | • NOTE THAT THE IMUX IS NOT USED DURING THE FIRST CYCLE OF A DOUBLE CYCLE. SEE OMUX. |
|  |  |  |  |  |  |  |  |  |  |  |  |
|  |  |  |  |  |  |  |  |  |  |  |  |
| y0 | y1 |  |  |  |  |  |  |  |  |  | HWL WILL BE FETCHED FROM IOR 2/3 WITH A SEC. CODE OF .01 (SEE ABOVE) |

| $B'_3$ | $W'$ | $Z'$ $Y'$ $WIP'$ | $A0'$ | REMARKS | $WS'$ | $UDS'$ | $LDS$ |
|---|---|---|---|---|---|---|---|
| 0 | 001 | $X^\dagger$ $X^\dagger$ $X^\dagger$ | 0 | Byte Transfers | 0 | 1 | 0 |
| " | " | $X^\dagger$ $X^\dagger$ $X^\dagger$ | 1 | " | 0 | 0 | 1 |

$\dagger$ THESE PARAMETERS SHOULD BE ZERO FOR THIS CASE; IF NOT, A DESIGN CHECK WILL WILL OCCUR DURING THE INITIATION SEQUENCE.

| $B'_3$ | $W'$ | $Z'$ $Y'$ $WIP'$ | $A0'$ | REMARKS | | $WS'$ | $UDS'$ | $LDS$ |
|---|---|---|---|---|---|---|---|---|
| 0 | $01X^{\dagger\dagger}$ | X 0 0 | 0 | Aligned Halfword Address | 1st cycle | 0 | 1 | 1 |
| " | " | X 1 " | 0 | | 2nd cycle | 0 | 0 | 1 |
| " | " | X 0 " | 1 | Non-Aligned Halfword Address | 1st cycle | 0 | 0 | 1 |
| " | " | X 1 " | 1 | | 2nd cycle | 0 | 1 | 0 |

$\dagger\dagger$ IF WIP' = 0, THE RESPONSE OF THE ICU TO HALFWORD VS. WORD COMMANDS IS IDENTICAL, INSOFAR AS STROBE SELECTION IS CONCERNED.

| $B'_3$ | $W'$ | $Z'$ $Y'$ $WIP'$ | $A0'$ | REMARKS | $WS'$ | $UDS'$ | $LDS$ |
|---|---|---|---|---|---|---|---|
| 0 | XXX | 0 0 1 | X | 32-bit Store Cycle | 1 | 1 | 1 |
| | | 0 1 | | (W' WILL BE 010 & | 0 | 0 | 1 |
| | | 1 0 | | A0' WILL BE 0) | | 1 | 1 |
| | | 1 1 | ↓ | | ↓ | 0 | 1 |
| 1 | $W'_9 W'_{10} W'_{11}$ | X X X | X | SERVICE CYCLES | $(W'_9)$ | $(W'_{10})$ | $(W'_{11})$ |

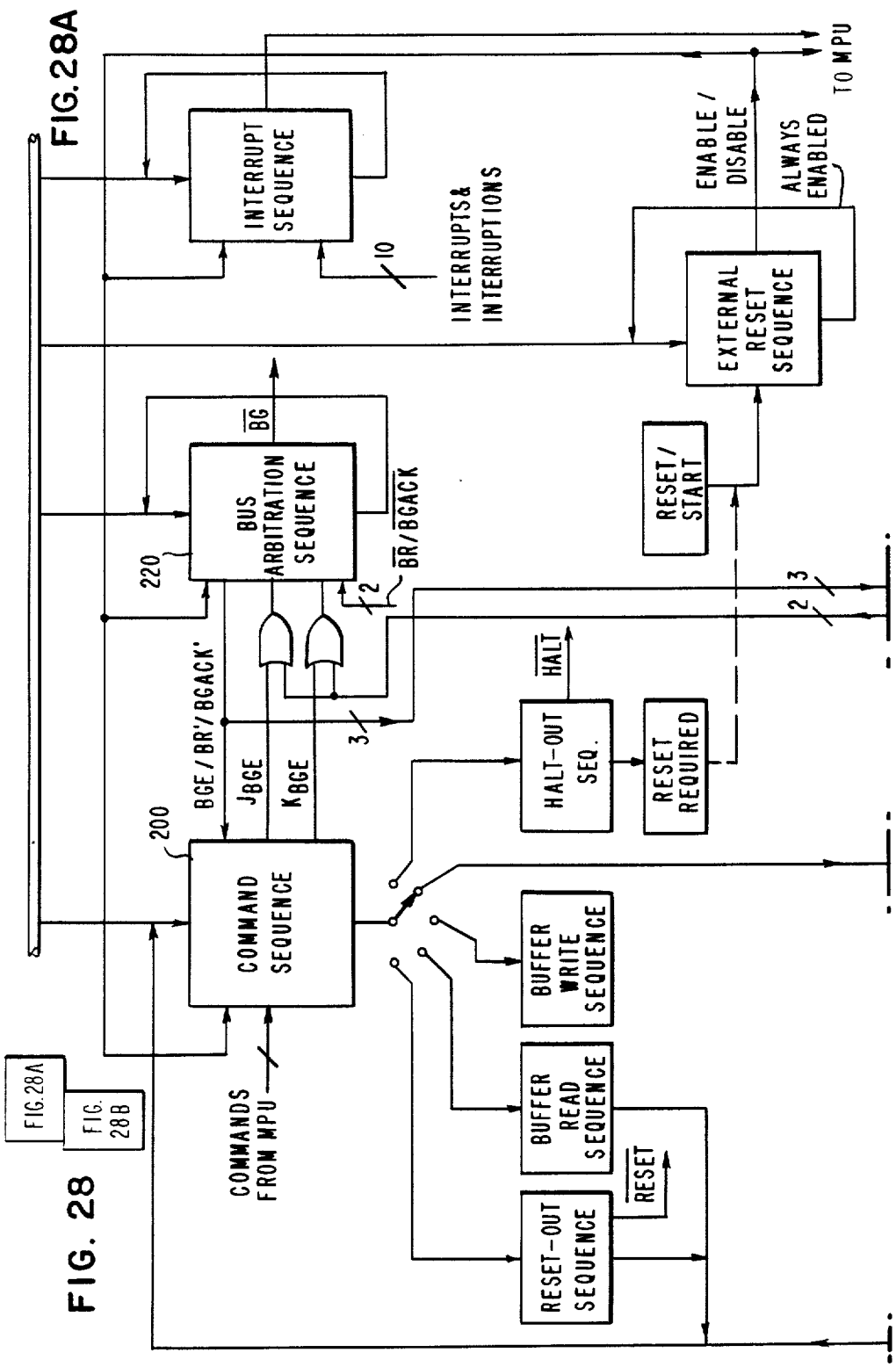

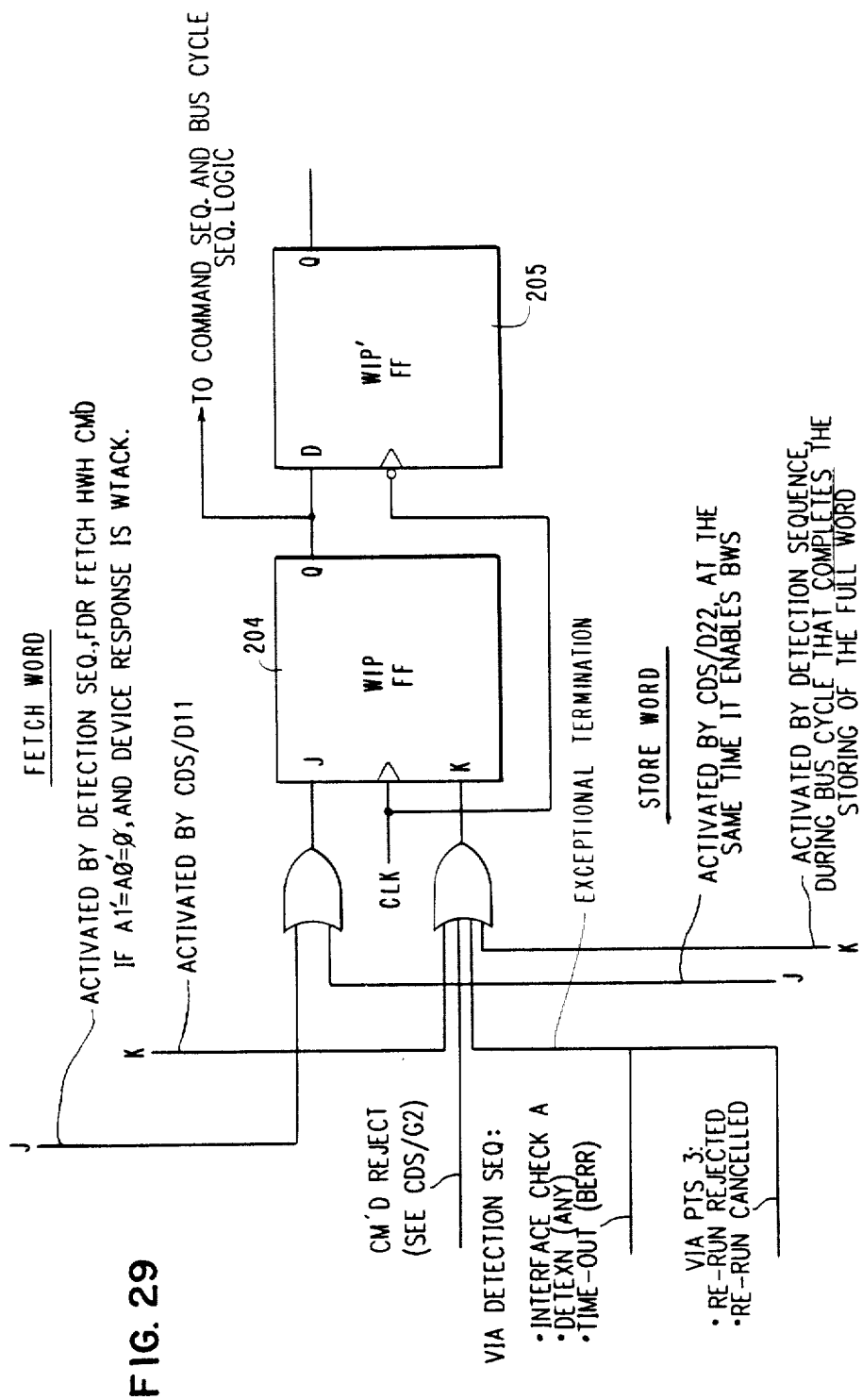

FIG. 34

| | VA | G | BR' | A' | A'' | $G_D$ | J | K | COMMENTS |
|---|---|---|---|---|---|---|---|---|---|
| 0 | 0 | 0 | 0 | 0 | 0 | 0 | 0 | 0 | NO ACTIVITY |
| 1 | | 0 | 0 | 0 | 1 | 0 | 0 | 0 | BUS RELEASED |
| 2 | | 0 | 0 | 1 | 0 | 0 | 1 | 0 | UNAUTHORIZED BGACK |
| 3 | | 0 | 0 | 1 | 1 | 0 | 0 | 0 | NORMAL BUS BUSY CONDITION |
| 4 | | 0 | 1 | 0 | 0 | 1 | 0 | 0 | BUS REQUEST |
| 5 | | 0 | 1 | 0 | 1 | 1 | 0 | 0 | BUS RELEASED AND BUS REQUEST |
| 6 | | 0 | 1 | 1 | 0 | 0 | 1 | 0 | UNAUTHORIZED (PREMATURE) BGACK |
| 7 | | 0 | 1 | 1 | 1 | 1 | 0 | 0 | { BUS REQUEST WHILE BUS BUSY; THIS IS CALLED A 2ND BUS REQUEST |
| 8 | | 1 | 0 | 0 | 0 | 0 | 0 | 0 | BUS REQUEST CANCELLED; SEE CASE 4. |
| 9 | | 1 | 0 | 0 | 1 | 0 | 0 | 0 | { 2ND BUS REQUEST CANCELLED AND BUS RELEASE; (SEE CASE 7) |
| 10 | | 1 | 0 | 1 | 0 | 0 | 0 | 0 | NORMAL BGACK WITH REMOVAL OF BR |
| 11 | | 1 | 0 | 1 | 1 | 0 | 0 | 0 | { 2ND BUS REQUEST CANCELLED WHILE BUS REMAINS BUSY (SEE CASE 7) |
| 12 | | 1 | 1 | 0 | 0 | 1 | 0 | 0 | NORMAL WAITING FOR BGACK; SEE CASE 4 |
| 13 | | 1 | 1 | 0 | 1 | 1 | 0 | 0 | { NORMAL WAITING FOR BGACK FOR 2ND BUS REQUEST WITH CONCURRENT BUS RELEASE |
| 14 | | 1 | 1 | 1 | 0 | 0 | 0 | 0 | { NORMAL BGACK; BR HELD ACTIVE (COMPARE CASE 10) |
| 15 | ↓ | 1 | 1 | 1 | 1 | 1 | 0 | 0 | { BUS BUSY & 2ND REQUEST/GRANT PENDING; (SEE CASE 7) |
| 16 | 1 | X† | 0 | 0 | X†† | 0 | 0 | 1 | UNAUTHORIZED BGACK REMOVED |
| 17 | 1 | X† | 1 | 0 | X†† | 1 | 0 | 1 | { UNAUTHORIZED BGACK REMOVED & BUS REQUEST |
| 18 | 1 | X† | X | 1 | X†† | 0 | 0 | 0 | { UNAUTHORIZED BGACK CONTINUES ACTIVE; BUS ARBITRATION LOGIC IS, IN EFFECT, DISABLED. |

† THOUGH A DON'T CARE, G WILL ALWAYS BE ZERO UNDER THESE CIRCUMSTANCES.
†† THOUGH A DON'T CARE, A'' WILL ALWAYS BE ONE UNDER THESE CIRCUMSTANCES.

FIG. 37A

| SIGNALS | REMARKS |
|---|---|
| J-INPUT (ENABLE) | |
| CDS/A18 | HALT-OUT |
| /C12 | STOP COMMAND & HALT₂ FF OR BR' FF=1 } CM'D. SEQ. THEN REPEATED; BUS CYCLE NOT INITIATED |
| /C18 | STOP COMMAND=NO OP AND HALT₂ FF=BR' FF=0 |
| /G8 | CM'D REJECT |
| DTS | CONDITIONALLY AT END (THIS SIGNAL ALSO ACTIVATES THE J-INPUT TO THE END MACROCYCLE FF) |
| ICU RESET SEQUENCE | |
| INITIATION SEQUENCE (SEE JNS/11) | INTERFACE CHECK B (SEQUENCING EXCEPTION. BUS CYCLE NOT INITIATED. |
| K-INPUT (DISABLE) | |
| CDS/E8 | START OF BUS CYCLE |
| PTS 3 (RERUN) | " |
| PTS 4 (AFTER INNER CYCLE, OR CYCLE OF A WORD-WRITE OPERATION) | " |

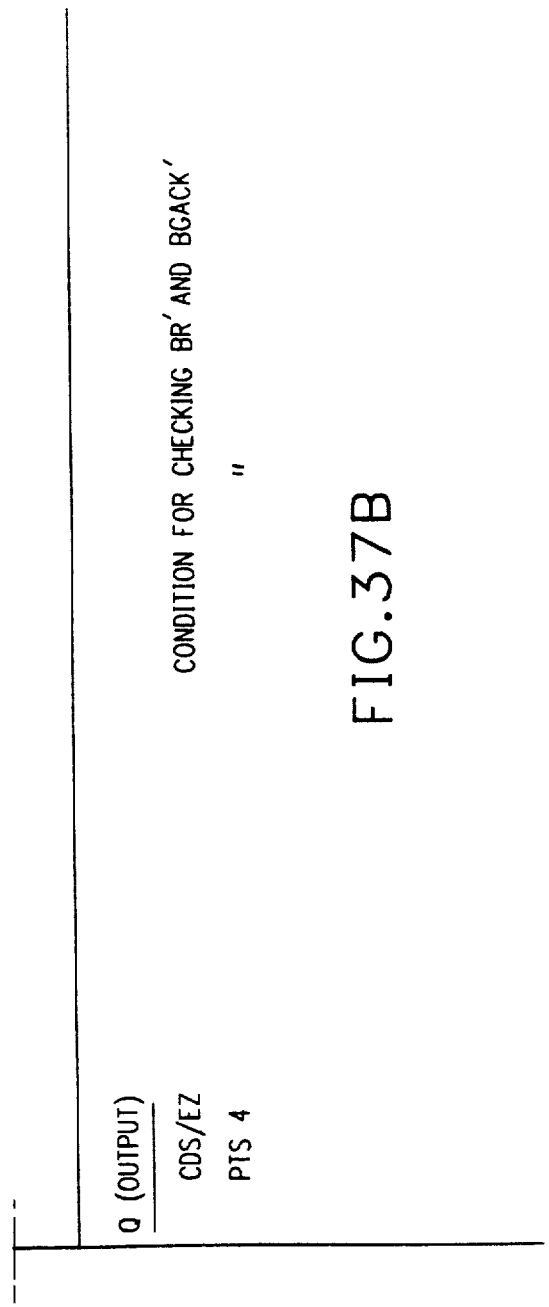
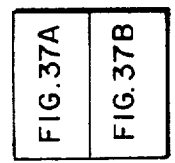
FIG. 37

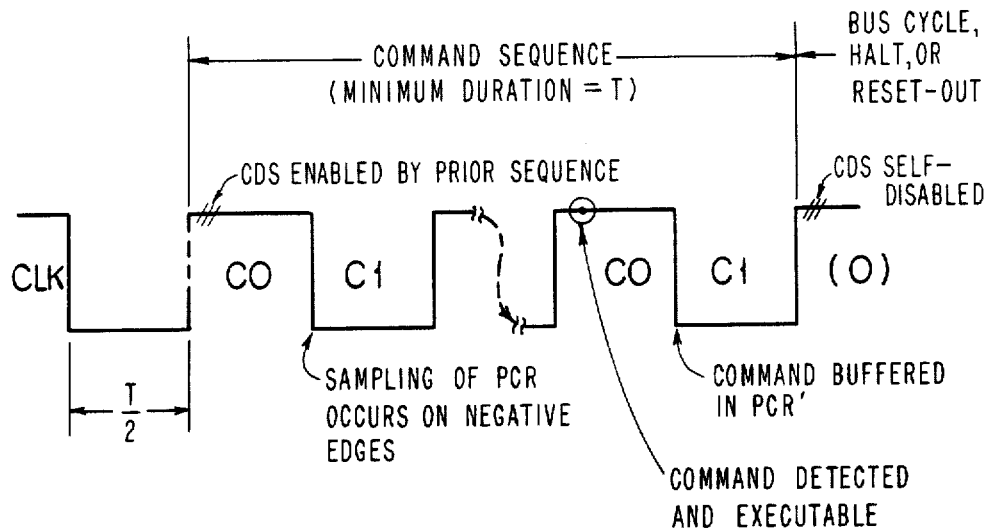
NO. OF STATES : TWO (C0 AND C1)
NO. OF PHASES : ONE, CONTINUOUS, DEFINED BY THE OUTPUT OF THE COMMAND SEQUENCE ENABLE FF ($\alpha$)
RELATIONSHIP TO TYPICAL BUS CYCLE
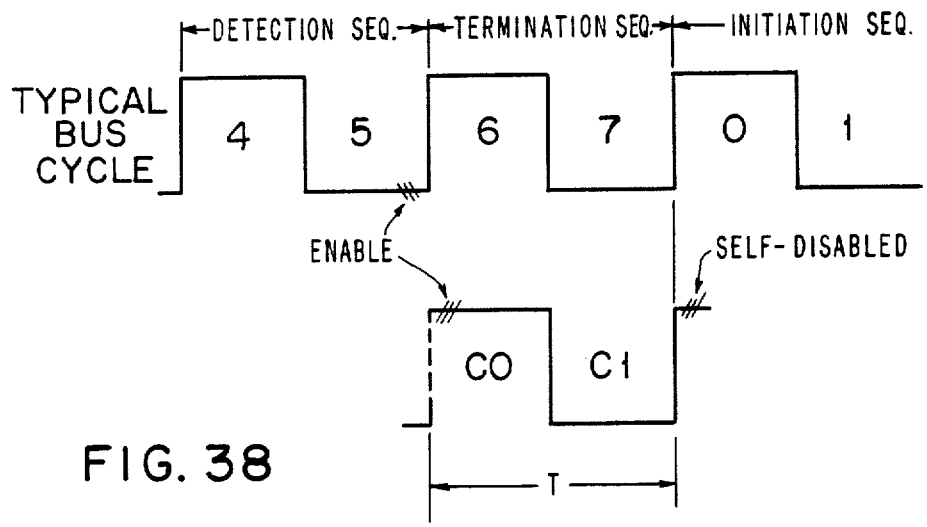
FIG. 38

FIG. 40

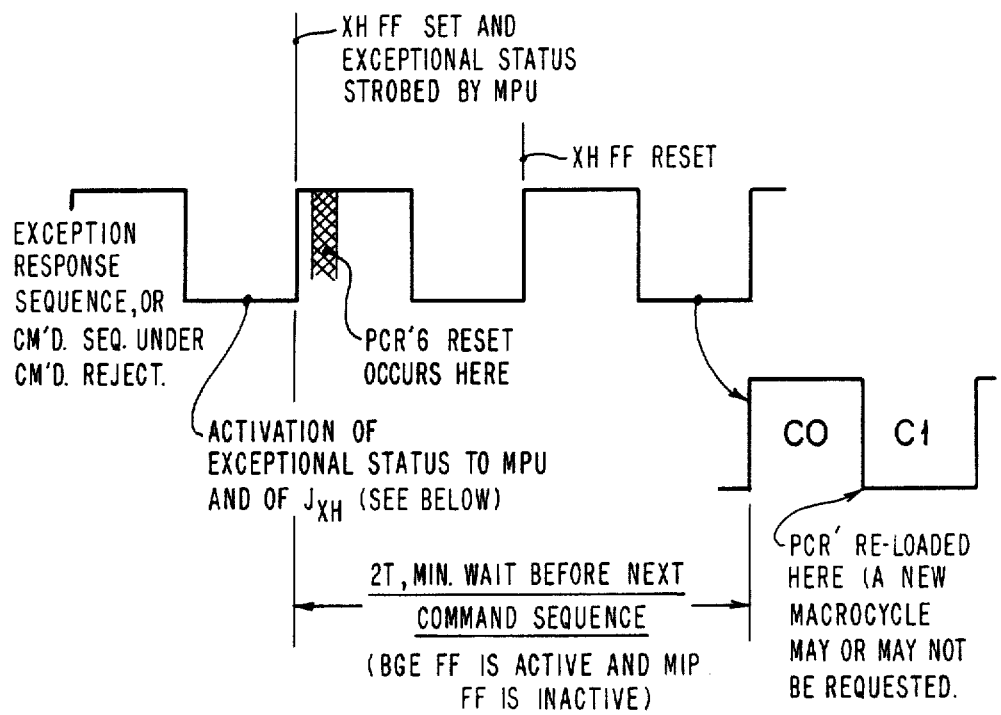

ACTIVATION OF J<sub>XH</sub>

| ACTIVATING SEQUENCE | LOGICAL SOURCE OF ACTIVATION | CONCURRENT STATUS | RELATED SIGNALS |
|---|---|---|---|
| PTS 1,2,5,6 | PTS/9 | VAR | $G_1'$ |
| PTS 3 | PTS 3/12 | SR 11 | SEE STATUS |
|  | PTS 3/44 | SR 10 | IMPLEMENTATION DIAGRAM |
| CM'D. SEQ. | CDS/G5 | SR 13 | ↓ |

NOTE: THE XH FF IS USED TO DELAY RESET OF PCR'6 UNTIL AFTER THE NEXT POSITIVE TRANSITION OF CLK, i.e., UNTIL AFTER ANY ACTION DEPENDENT UPON PCR'6 HAS BEEN COMPLETED (SEE, FOR EXAMPLE, PTS 3/36)

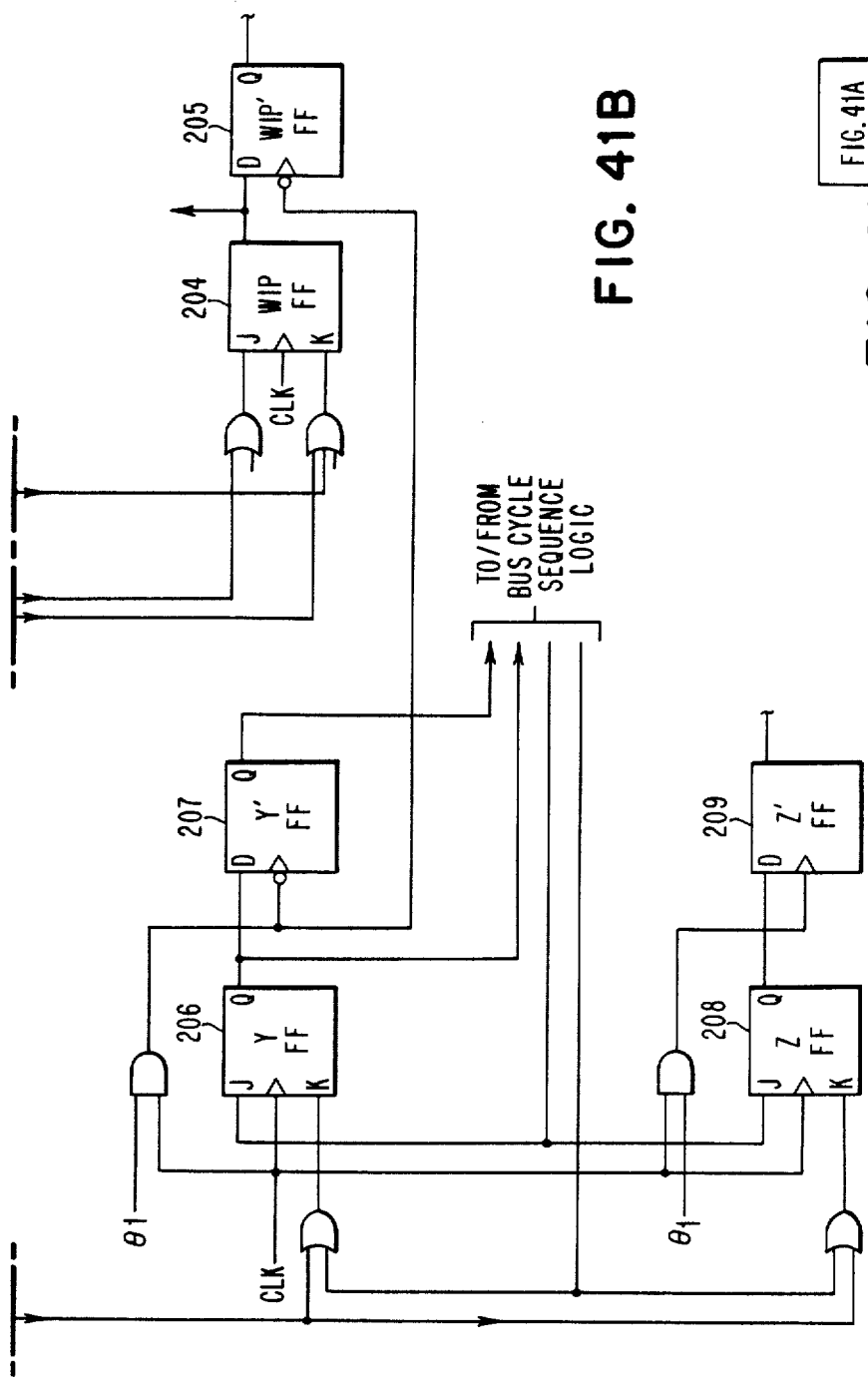
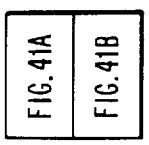
FIG. 41B
FIG. 41

FIG. 54
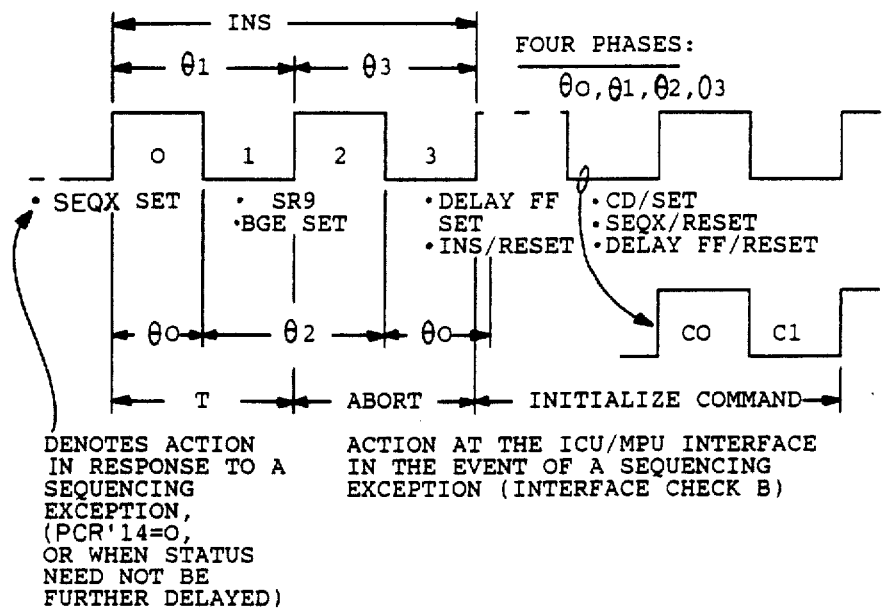
DENOTES ACTION IN RESPONSE TO A SEQUENCING EXCEPTION, (PCR'14=O, OR WHEN STATUS NEED NOT BE FURTHER DELAYED)
ACTION AT THE ICU/MPU INTERFACE IN THE EVENT OF A SEQUENCING EXCEPTION (INTERFACE CHECK B)
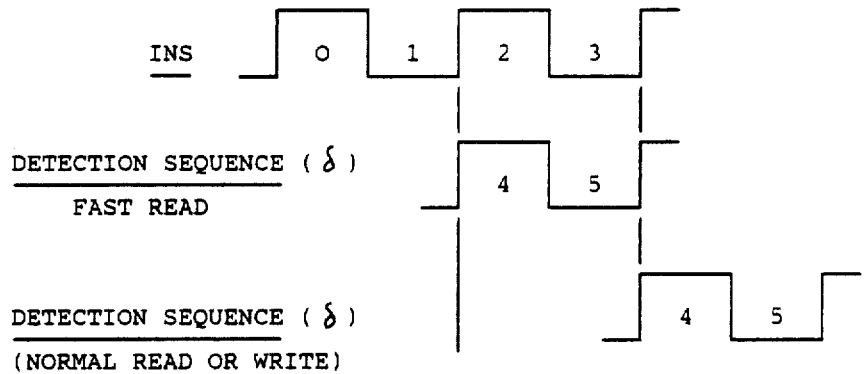

FIG. 57
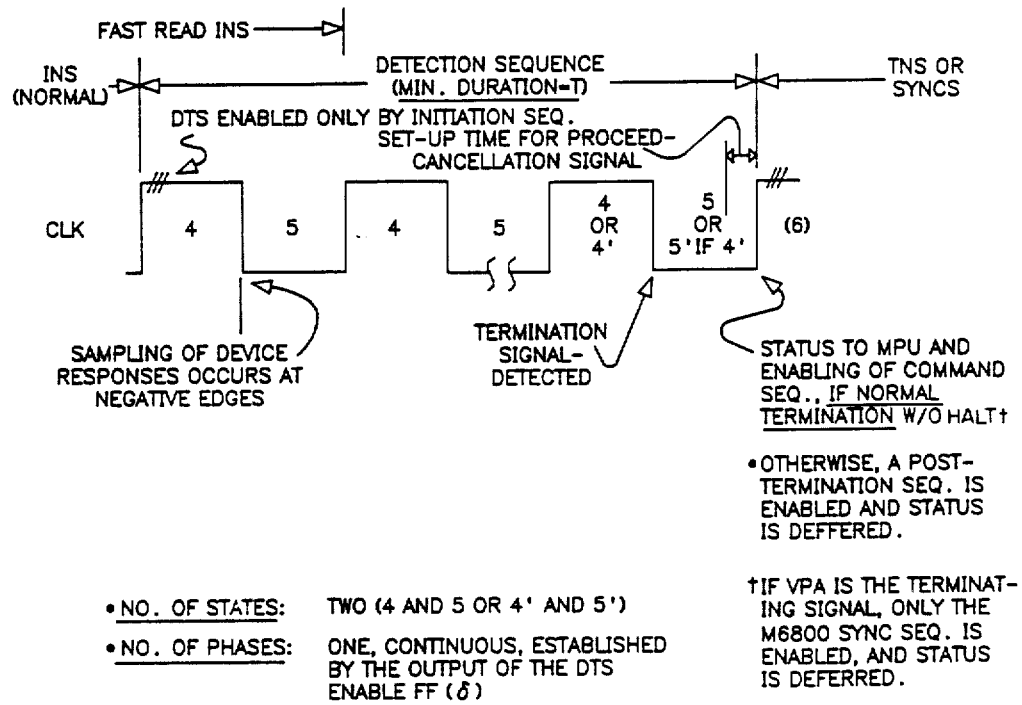
- NO. OF STATES: TWO (4 AND 5 OR 4' AND 5')
- NO. OF PHASES: ONE, CONTINUOUS, ESTABLISHED BY THE OUTPUT OF THE DTS ENABLE FF (δ)
NOTE RE STATES 4'/5': THESE STATES DO NOT NECESSARILY END THE DETECTION SEQUENCE; STATES 4/5 MAY AGAIN OCCUR:
VALID CASE:
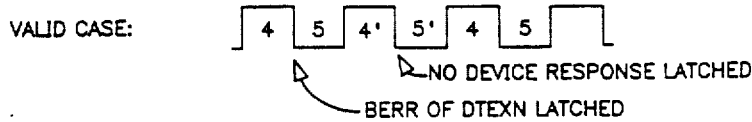

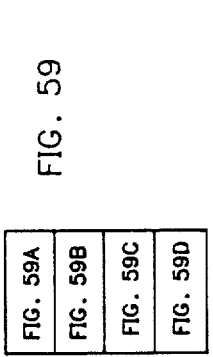

FIG. 59A

| FIG. 59A |
|----------|
| FIG. 59B |
| FIG. 59C |
| FIG. 59D |

FIG. 59

SR=STATUS RESPONSE   NOTE: THESE STATUS RESPONSES ARE MUTUALLY EXCLUSIVE

| STATUS SIGNAL | NAME | | HOW GENERATED AT PINS/SIGNIFICANCE |
|---|---|---|---|
| | FOR MEMORY FETCH/STORE | FOR SERVICE CYCLE | |
| SR0 | PROCEED | WTACK | • PROCEED DENOTES THAT THE COMMAND FROM THE MPU HAS COMPLETED NORMALLY; THIS MAY HAVE REQUIRED MORE THAN ONE BUS CYCLE AND MAY HAVE INVOLVED VARIOUS ACK RESPONSES OR EVEN A VPA RESPONSE FROM THE ADDRESSED DEVICE. |
| SR1 | (NOT POSSIBLE) | DTACK | |
| SR2 | (NOT POSSIBLE) | BTACK | • STATUS FOR A SERVICE CYCLE IS FOR THAT SINGLE CYCLE, AND DEFINES THE PARTICULAR DEVICE RESPONSE THAT TERMINATED THAT BUS CYCLE. NOTE: WHEN TWO μ-CYCLES ARE ASSOCIATED WITH A SINGLE SERVICE CYCLE, THE NORMAL RESPONSE FOR THE BUFFER ACCESS IS SR0. |
| SR3 | (NOT POSSIBLE) | VPA | • DENOTES AN AUTO-VECTORING REQUEST FOR INTERRUPT ACKNOWLEDGE CYCLES. FOR LEVEL 000 CYCLES, SIGNAL IS ARB. |

FIG. 59C

| STATUS SIGNAL | NAME | HOW GENERATED AT PINS/SIGNIFICANCE |
|---|---|---|
| SR10 | RERUN REQUEST REJECTED BY ICU | BERR•HALT, FOLLOWED BY PREFERRED RELEASE;† NO RE-RUN OF ANY CYCLE OF A μ/370 MACROCYCLE IS PERMITTED (SINCE BUS ARBITRATION IS ALWAYS PERMITTED DURING THE RERUN PROCESS), UNLESS INDICATED OTHERWISE BY AN UNCONDITIONAL RERUN REQUEST. |
| SR11 | RERUN REQUEST CANCELLED<br>— BY DEVICE<br>— BY "WATCH-DOG" TIMER | BERR•HALT, FOLLOWED BY REVERSE RELEASE †(MC68000 "ILLEGAL" RELEASE SEQUENCE); THIS SIGNAL DENOTES THAT THE DEVICE DOES NOT WISH TO RERUN THE CYCLE. (THIS PROVIDES MEANS TO TERMINATE A SEQUENCE OF RERUN CYCLES) OR, IT DENOTES A CONCURRENT TIME-OUT AND RERUN REQUEST, INITIATED BY INDEPENDENT DEVICES. |
| SR12 | INTERFACE TIME-OUT | BERR, ACTIVATION AND RELEASE.† |
| SR13 | COMMAND REJECT | SIGNIFIES AN ILLEGAL COMMAND TO THE ICU<br>• UNDEFINED OPERATION<br>• UNDEFINED BUS CYCLE I.D.<br>• WWW=000<br>• INCONSISTENT SECOND COMMAND FOR FULL WORD TRANSFERS. |

| | | |
|---|---|---|
| SR14 | APPLICATION EXCEPTION 0 | DTEXN/0, ACTIVATION AND RELEASE |
| SR15 | APPLICATION EXCEPTION 1 | DTEXN/1, ACTIVATION AND RELEASE |
| SR16 | APPLICATION EXCEPTION 2 | DTEXN/2, ACTIVATION AND RELEASE |
| SR17 | ODD INSTRUCTION ADDRESS | THE ICU HAS DETECTED AN INSTRUCTION FETCH BEGINNING AT AN ODD BYTE ADDRESS. THE OUTCOME OF THE ASSOCIATED BUS CYCLE IS NULLIFIED. (THE MPU WILL FORCE A PROGRAM INTERRUPTION AND STORE AN IDENTIFYING 16-BIT INTERRUPTION CODE (SPECIFICATION EXCEPTION).] |

† BERR SIGNALS TAKE PRECEDENCE OVER ALL OTHER RESPONSE SIGNALS. <u>PREFERRED</u> RELEASE OCCURS WHEN BERR IS NEGATED BEFORE HALT. <u>REVERSE RELEASE</u> OCCURS WHEN HALT IS NEGATED BEFORE OR CONCURRENTLY WITH BERR.

†† STATUS SIGNALS SR8-SR16, WHEN RECEIVED BY THE MPU IN RESPONSE TO A NON-DIAGNOSE SENSE/CONTROL-INITIATED BUS CYCLE, WILL CAUSE THE MPU TO FORCE A SYSTEM/370 MACHINE CHECK FOR WHICH A ONE-BYTE ENCODED STATUS RESPONSE WILL BE FORMED AND STORED BY THE MPU AS PART OF A 64-BIT S/370 INTERRUPTION CODE, I.e., $0C_{16}$ SIGNIFIES "INTERFACE TIME-OUT", etc...

††† APPLICATION EXCEPTIONS CAN BE ASSIGNED ANY SIGNIFICANCE BY THE USER.

| | | INPUT | | | | | | | | OUTPUT |
|---|---|---|---|---|---|---|---|---|---|---|
| | | BERR | HALT | DTEXN/2 | DTEXN/1 | DTEXN/0 | WTACK | DTACK | BTACK | VAP | |
| NORMAL TERMINATIONS (8) | 0 | 0 | X | 0 | 0 | 0 | 1 | 0 | 0 | 0 | WTACK' |
| | 1 | | | | | | 0 | 1 | 0 | 0 | DTACK' |
| | 2 | | | | | | 0 | 0 | 1 | 0 | BTACK' |
| | 3 | | | | | | 0 | 0 | 0 | 1 | VPA' |
| EXCEPTIONAL TERMINATIONS (502) | 4A | | | | | | 1 | A | B | C | ICK' |
| | 4B | | | | | | A | 1 | B | C | IF |
| | 4C | | | | | | A | B | 1 | C | A+B+C=1 |
| | 4D | | | | | | A | B | C | 1 | (11 CASES) |
| | 5 | | | 0 | 0 | 1 | X | X | X | X | DTEXN'1 |
| | 6 | | | 0 | 1 | 0 | | | | | DTEXN'2 |
| | 7 | | | 0 | 1 | 1 | | | | | DTEXN'3 |
| | 8 | | | 1 | 0 | 0 | | | | | DTEXN'4 |
| | 9 | | | 1 | 0 | 1 | | | | | DTEXN'5 |
| | 10 | | | 1 | 1 | 0 | | | | | DTEXN'6 |
| | 11 | | | 1 | 1 | 1 | | | | | DTEXN'7 |
| | 12 | 1 | 0 | X | X | X | | | | | BERR' |
| | 13 | 1 | 1 | X | X | X | | | | | RRR' |

| NOTES | COMMAND FROM MPU (PCR') | | | | SPECIAL CASE |
|---|---|---|---|---|---|
| 1."1 OF X" DENOTES ONE SIGNAL, OR NONE, FROM THE GROUP; A ZERO MEANS NO SIGNAL. | NAME | BUS CYCLE | | ACC WIDTH | NORMAL TERMINATION; ODD TARGET ADDRESS |
| | | B'₃ | B'₄ | W'₁₀ W'₁₁ | |
| 2. X DENOTES A DON'T CARE | FETCH WORD | 0 | 0 | 1  1 | |
| | STORE WORD | 0 | 1 | 1  1 | |

IDENTICAL WITH CORRESPONDING CASES UNDER
FETCH HALFWORD
AND STORE HALFWORD,
RESPECTIVELY.

| NOTES<br>1. "1 OF X" DENOTES ONE SIGNAL, OR NONE, FROM THE GROUP; A ZERO MEANS NO SIGNAL.<br>2. X DENOTES A DON'T CARE | COMMAND FROM MPU (PCR') | | | | | SPECIAL CASE |
|---|---|---|---|---|---|---|
| | NAME | BUS CYCLE | | ACC WIDTH | | NORMAL TERMINATIONS |
| | | $B'_3$ | $B'_4$ | $W'_{10}$ | $W'_{11}$ | |
| | OUTPUT SER CYCLE | 1 | 1 | X | X | |

• THE TABLE FOR OUTPUT SERVICE CYCLES IS IDENTICAL WITH THAT FOR INPUT SERVICE CYCLES -- WITH ONE EXCEPTION: THE LOAD IOR SIGNAL IS ZERO FOR ALL OUTPUT SERVICE CYCLES.

| | Q RR1 | Q PR1 | Q PR2 | Q PS | Q PR3 | Q END | BERR₂ | HALT₂ | X RESET (PIN) | PCR'6 | BR' | BGACK |
|---|---|---|---|---|---|---|---|---|---|---|---|---|
| | | | | INPUTS (12) | | | | | | | | |
| 1 | ← | | ONE OF 5, MAX. | | → | | | | | | | |
| 2 | 0 | 0 | 0 | 0 | 0 | X | 1 | 1 | X | X | X | X |
| 3 | ↓ | | | | | ↓ | 1 | 0 | | | | |
| 4 | | | | | | | 0 | 1 | | | | |
| 5 | ▽ | ▽ | ▽ | ▽ | ▽ | ▽ | 0 | 0 | ▽ | ▽ | ▽ | ▽ |
| 6 | | | | | | | | | | | | |
| 7 | | | | | | | | | | | | |
| 8 | 1 | X | X | X | X | X | | X | X | X | X | X |
| 9 | 1 | X | X | X | X | X | | X | X | X | X | X |
| 10 | | | | | | | | | | | | |
| 11 | | | | | | | | | | | | |
| 12 | | | | | | | | | | | | |
| 13 | | | | | | | | | | | | |
| 14 | | | | | | | | | | | | |
| 15 | | | | | | | | | | | | |
| 16 | X | 1 | X | X | X | X | X | 1 | X | X | X | X |
| 17 | X | 1 | X | X | X | X | X | 0 | X | X | X | X |
| 18 | | | | | | | | | | | | |
| 19 | | | | | | PIN IS "ACTIVE LOW" | | | | | | |
| 20 | X | X | 1 | X | X | X | X | X | 1 | 1 | X | X |
| 21 | | | 1 | | | | | | 0 | 1 | | |
| 22 | ▽ | ▽ | 1 | ▽ | ▽ | ▽ | ▽ | ▽ | X | 0 | ▽ | ▽ |
| 23 | | | | | | | | | | | | |
| 24 | X | X | X | 1 | X | 0 | X | X | X | X | X | X |
| 25 | X | X | X | 1 | X | 1 | X | X | X | X | X | X |
| 26 | | | | | | | | | | | | |
| 27 | | | | | | | | | | | | |
| 28 | X | X | X | X | 1 | X | X | X | X | X | 0 | 0 |
| 29 | | | | | 1 | | | | | | 0 | 1 |
| 30 | ▽ | ▽ | ▽ | ▽ | 1 | ▽ | ▽ | ▽ | ▽ | ▽ | 1 | X |
| 31 | | | | | | | | | | | | |
| 32 | | | | | | | | | | | | |
| 33 | | | | | | | | | | | | |
| 34 | | | | | | | | | | | | |
| 35 | | | | | | | | | | | | |
| 36 | | | | | | | | | | | | |

FIG. 78B

| | | OUTPUTS (10) | | | | | | | | |
|---|---|---|---|---|---|---|---|---|---|---|
| | | J | | | | E | | SR10 | SR11 | JENTER |
| RR1 | | PR1 | PR2 | PS | PR3 | INS | CDS | | | |
| 0 | | 0 | 0 | 0 | 0 | 0 | 0 | 0 | 0 | 0 |
| 1 | | 0 | 0 | 0 | 0 | 0 | 0 | 0 | 0 | 0 |
| 0 | | 1 | 0 | 0 | 0 | 0 | 0 | 0 | 0 | 0 |
| 0 | | 0 | 0 | 1 | 0 | 0 | 0 | 0 | 1 | 0 |
| | | | | | | | | | | |
| 0 | | 0 | 0 | 0 | 0 | 0 | 0 | 0 | 0 | 0 |
| 0 | | 0 | 0 | 1 | 0 | 0 | 0 | 0 | 1 | 0 |
| | | | | | | | | | | |
| | | | | | | | | | | |
| 0 | | 0 | 0 | 0 | 0 | 0 | 0 | 0 | 0 | 0 |
| 0 | | 0 | 1 | 0 | 0 | 0 | 0 | 0 | 0 | 0 |
| | | | | | | | | | | |
| 0 | | 0 | 0 | 1 | 0 | 0 | 0 | 1 | 0 | 0 |
| ↓ | | ↓ | ↓ | 0 | 1 | ↓ | ↓ | 0 | ↓ | ↓ |
| ▽ | | ▽ | ▽ | 0 | 1 | ▽ | ▽ | 0 | ▽ | ▽ |
| 0 | | 0 | 0 | 0 | 0 | 0 | 0 | 0 | 0 | 1 |
| 0 | | 0 | 0 | 0 | 0 | 0 | 1 | 0 | 0 | 0 |
| | | | | | | | | | | |
| 0 | | 0 | 0 | 0 | 0 | 1 | 0 | 0 | 0 | 0 |
| ↓ | | ↓ | ↓ | ↓ | ↓ | 0 | ↓ | ↓ | ↓ | ↓ |
| ▽ | | ▽ | ▽ | ▽ | ▽ | 0 | ▽ | ▽ | ▽ | ▽ |
| | | | | | | | | | | |
| | | | | | | | | | | |

FIG. 78

| FIG. 78A | FIG. 78B |
|---|---| ed. The bus control architecture according to the invention is a logical entity referred to as an Interface Control Unit (ICU) and is distinct from its associated MPU architecture. The ICU resides on the same VLSI circuit chip as the MPU. The ICU of the invention, in effect, surrounds the MPU and is the means by which the MPU communicates with the outside world.

LOGICALLY TRANSPORTABLE MICROPROCESSOR INTERFACE CONTROL UNIT PERMITTING BUS TRANSFERS WITH DIFFERENT BUT COMPATIBLE OTHER MICROPROCESSORS

DESCRIPTION

1. Technical Field

The present invention relates to microprocessor bus controllers and, particularly, to a logically distinct interface control unit (ICU) which resides on the same very large scale integrated (VSLI) circuit chip as the microprocessing unit (MPU). The ICU of the invention, in effect, surrounds the MPU and is the means by which the MPU communicates with the outside world.

2. Prior Art

In the past, in the design of a microprocessor circuit chip, the bus controller has been integrated into and functions as part of the microprocessor architecture. This was certainly the expedient design for the early, relatively simple microprocessors for which also a large repertoire of peripheral devices was not yet in existence. But, because the bus controller was integrated into the architecture of the microprocessor, it was impossible to separate and use the bus controller with other MPU architectures. And, consequently, the peripheral devices of one microprocessor could not, in general, be used directly with the bus of another microprocessor.

With the proliferation and increased sophistication of the many commercially available microprocessors, it can be desirable to separate the architecture of a microprocessor into two logically distinct entities, a bus controller and an MPU. The purpose of such separation is to facilitate (1) the design process and (2) the transferrability of peripheral devices among different microprocessors. With the many 8- and 16-bit microprocessors currently in use, there are a large number of 8- and 16-bit support devices which have been developed for these microprocessors. Such support devices include, for example, memory management units, CRT controllers, floppy disk controllers, arithmetic co-processors and the like. It would be a desirable feature of a newly designed microprocessor, and in particular a microprocessor of the new generation of 32-bit microprocessors, to be able to use many of these already existing devices without the immediate need for special design of new support devices.

OBJECTS OF THE INVENTION

It is therefore an object of the present invention to define a bus controller that is logically independent of MPU architecture, thereby permitting the bus controller to be used with a variety of MPUs.

It is a further object of the invention to define a bus controller that effectively isolates its MPU from the details of communication with external devices, thereby freeing the MPU, and its designer, from the responsibilities of device control, signal synchronization and relating logical address space to the physical constraints of external storage devices.

It is another object of the invention to define a bus controller that is compatible with support devices of a particular microprocessor, referred to as the "compatible" microprocessor, thereby allowing its associated MPU to utilize any support device of the compatible microprocessor.

A further object of the invention is to define a bus controller that extends the functional capability of the external interface of the compatible microprocessor by means which are completely transparent to devices designed for direct attachment to the compatible microprocessor. Such transparent extensions to the functional capability of the external interface of the compatible microprocessor may include:

(a) capability for mixed-width device handling, wherein the operation of the bus controller is governed dynamically by each device's width-identifying response to the bus cycle;

(b) capability for accessing operands at any byte location in memory and, in particular, at locations which do not correspond to the integral boundary for that operand;

(c) capability to perform special additional bus cycles having a somewhat different form and function than those of the compatible microprocessor, to thereby extend the functional capability of the associated MPU;

(d) capability to perform and identify a chain of logically related bus cycles (called a "macrocycle") whose normal execution cannot be interrupted by external devices and whose purpose is to provide means for serialized access to shared resources;

(e) capability for varying the minimum duration of a bus cycle, under external control;

(f) capability for detecting, resolving, and reporting to the MPU additional response signals from devices unrelated to the bus architecture of the compatible microprocessor;

(g) capability for distinguishing between re-run requests of external devices of the compatible microprocessor and of other external devices, with additional means for the latter type of device to cancel a re-run request and have that cancellation indicated to the MPU;

(h) capability for detecting a synchronous "cancellation" signal which a device may use to cancel its earlier response to a bus cycle, thereby providing means for a device to overlap its operation with that of the bus controller; and/or (i) capability for detecting and reporting interrupt signals that are separate and additional to those associated with the compatible microprocessor.

Still another object of the nvention is to define a bus controller whose control logic is broken down into various distinct, clearly identifiable control sequences which comprise its operation. Associated with this object is a means for integrating any form of bus arbitrtion architecture with the essentially autonomous bus cycle control logic to effect an orderly, prioritized, dynamic means for sharing the external bus of the bus controller.

In summary, the overall object of the present invention, therefore, is to define a bus controller characterized by (1) logical distinction from the MPU, (2) total responsibility for communicating with external devices on behalf of the MPU, (3) compatibility with the the support devices of the "compatible" microprocessor, (4) transparent extended capability, and (5) definitive functional specification. These elements and their relationship to one another are illustrated in FIG 1.

SUMMARY OF THE INVENTION

According to the invention, a transportable bus control architecture for single-chip microprocessors is provided. This bus control architecture consists of an interace control unit that is logically independent of the associated co-resident, common clock-driven microprocessing unit. This independence allows the interface control unit logic to be used with a variety of microprocessing units. Further, the interface control unit presents an external appearance that is compatible with the peripheral devices of a specific microprocessor referred to as the "compatible microprocessor", thereby making available to an associated co-resident microprocessing unit the support devices of the compatible microprocessor. The interface control unit can also access other external devices not related and transparent to the devices of the compatible microprocessor.

The interface control unit is logically divided into an execution section and a control section. The execution section is controlled by the control section and comprises various registers, latches, multiplexers, logic, and data and address paths that provide communications between the co-resident microprocessing unit and off-chip devices. The control section of the interface control unit executes commands from the co-resident micro-processing unit and also performs bus arbitration, interrupt, and external reset functions.

Bus cycles are of two types: memory-access or service, depending on the command from the co-resident microprocessing unit. Service cycles perform the interrupt acknowledge functions and other sense and control functions requested by the co-resident miroprocessing unit. These sense and control functions have the special feature of being pin-programmable and pin-readable by the microprocessing unit. All action initiated by commands from the microprocessing unit elicits a comprehensive status response from the interface control unit.

BREIF DESCRIPTION OF THE DRAWINGS

The foregoing and other objects, aspects and advantages of the invention will be better understood from the following detailed description of the preferred embodiment. This description references the accompanying drawings, in which:

FIGS. 4A and 4B are a table of the SENSE and CONTROL cycles designating the ACD fields for a specific example of an MPU used with the preferred embodiment of the ICU according to the invention;

FIGS. 5A and 5B are a table of the SENSE and CONTROL cycles designating the data bus formats for a specific example of an MPU used with the preferred embodiment of the ICU according to the invention;

FIG. 6 is a table of distinguishable device responses to an ICU bus cycle;

FIG. 9 is a table of the ICU interrupt request groups;

FIG. 10 is a table of the application of the ICU facilities to the interrupt response process of a specific example of an MPU used with the preferred embodiment of the ICU according to the invention;

FIGS. 12A, 12B and 12C are a table summarizing the ICU pin designations according to signal direction and function;

FIGS. 13A and 13B are a functional block diagram illustrating the relationship of the ICU to its external interface and to the MPU;

FIGS. 14A and 14B are a functional diagram and table detailing the required content of the MPU's Processor Command Register (PCR);

FIG. 22 is a truth table which defines the address selection logic shown in FIG. 21;

FIGS. 24A, 24B, 24C, 24D and 25A, 25B, 25C, 25D are truth tables which define the asynchronous control logic for the output and input multiplexers, respectively, shown in FIG. 23;

FIG. 27 is a truth table which defines the data strobe selection logic shown in FIG. 26;

FIGS. 28A and 28B are a block diagram of the logical structure and operation of the ICU control section;

FIGS. 29, 30 and 31 are detailed logic diagrams of the control inputs to the address selection logic shown in FIG. 21;

FIG. 34 is a truth table defining the G logic of the bus arbitration logic;

FIGS. 37A and 37B are a table which summarizes the set/reset conditions of the BGE flip-flop;

FIG. 38 is the specification timing diagram for the command sequence;

FIG. 40 is the command sequence specification timing diagram for clearing the HOLD flip-flop;

FIGS. 41A and 41B are a detailed logic diagram of the ICU command sequence and its in bound and out bound control signals;

Figure 52:
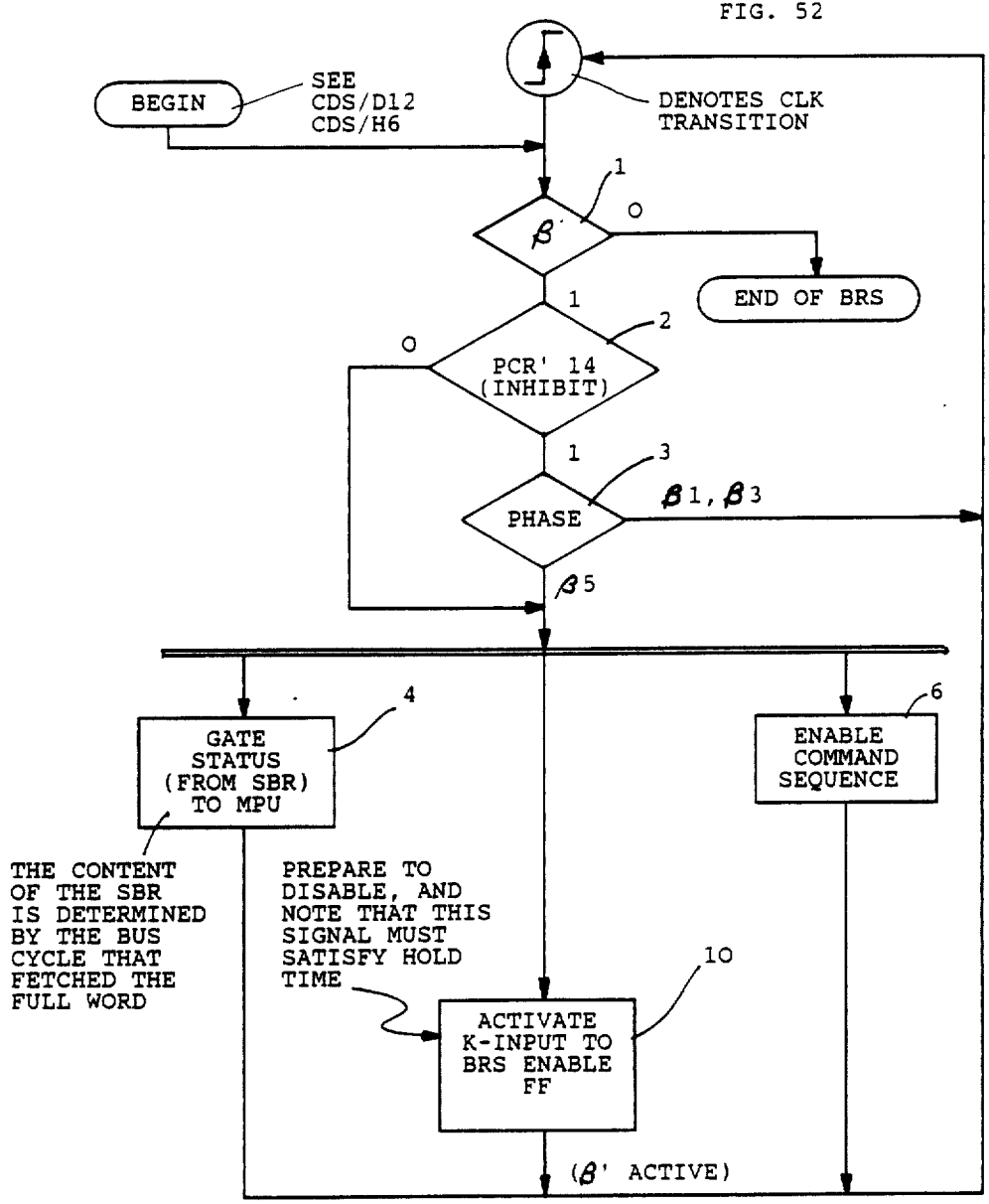
Figure 53:
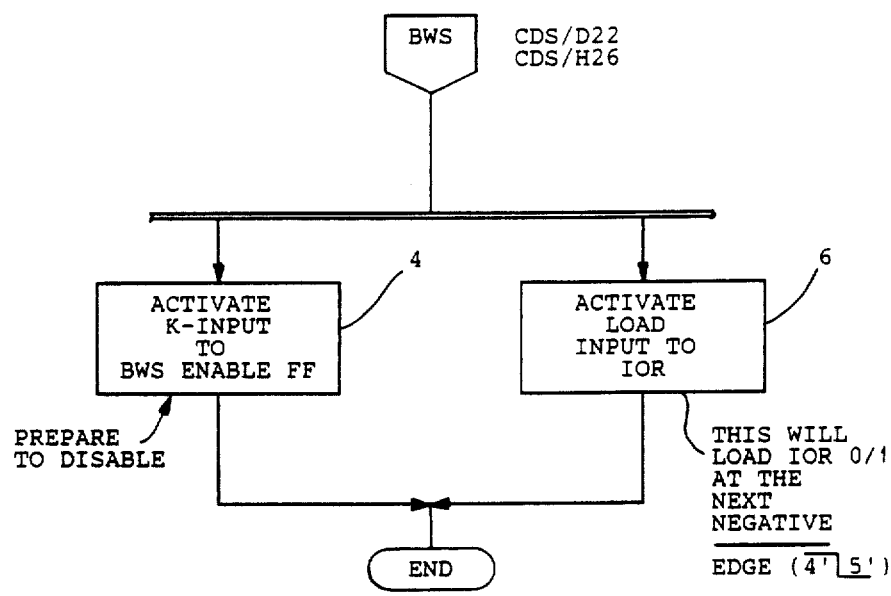
Figure 55A:
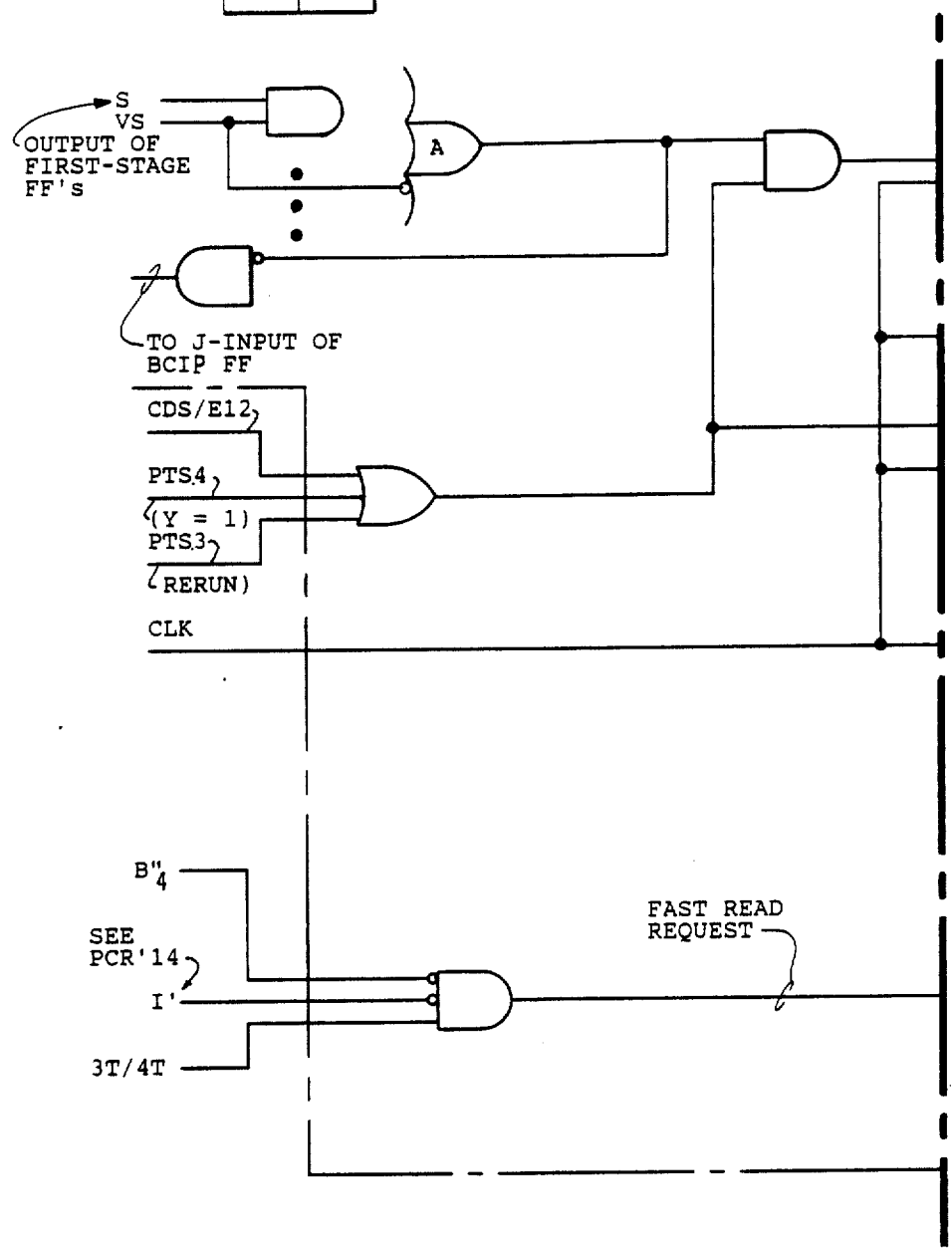
Figure 55B:
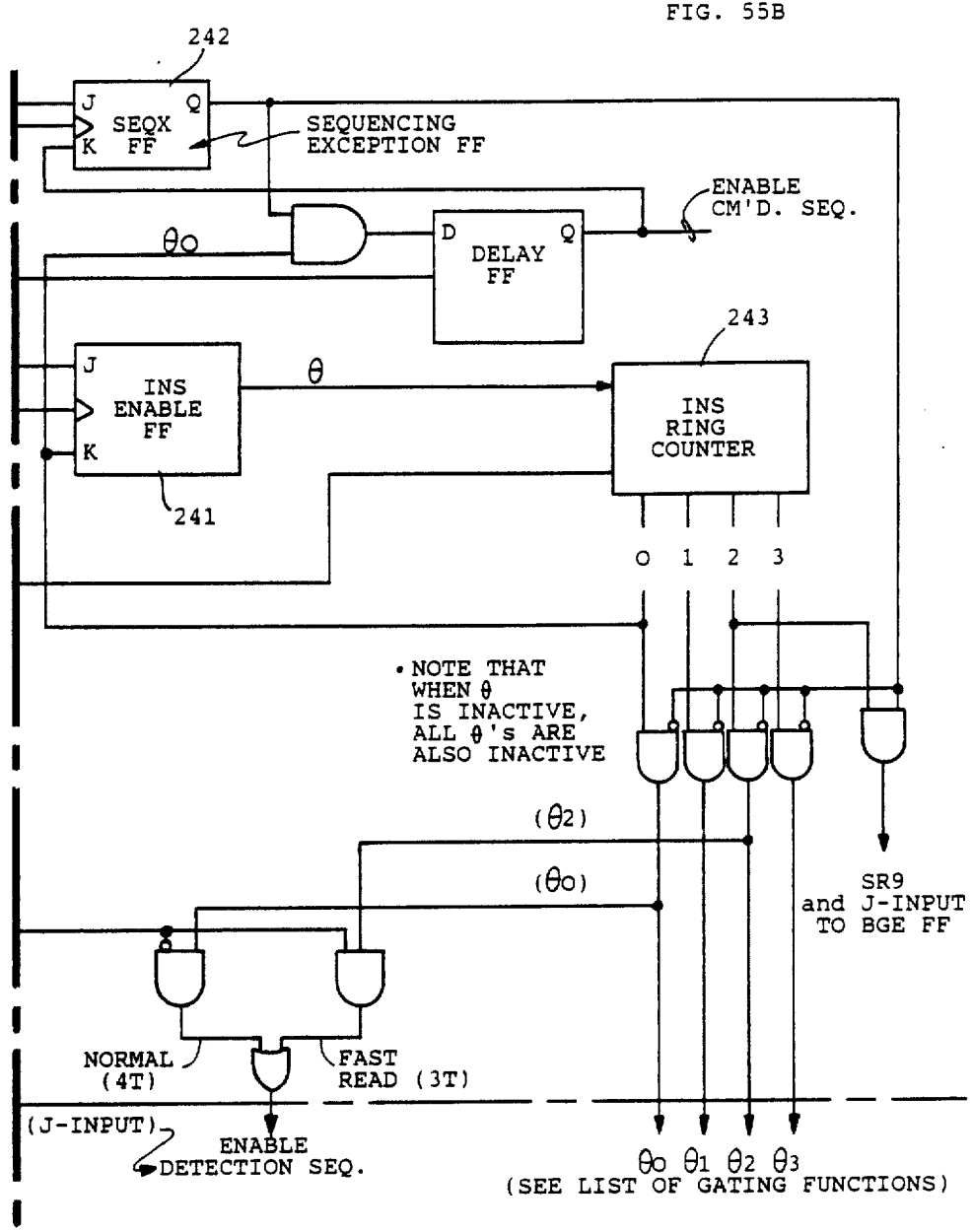
Figure 56A:
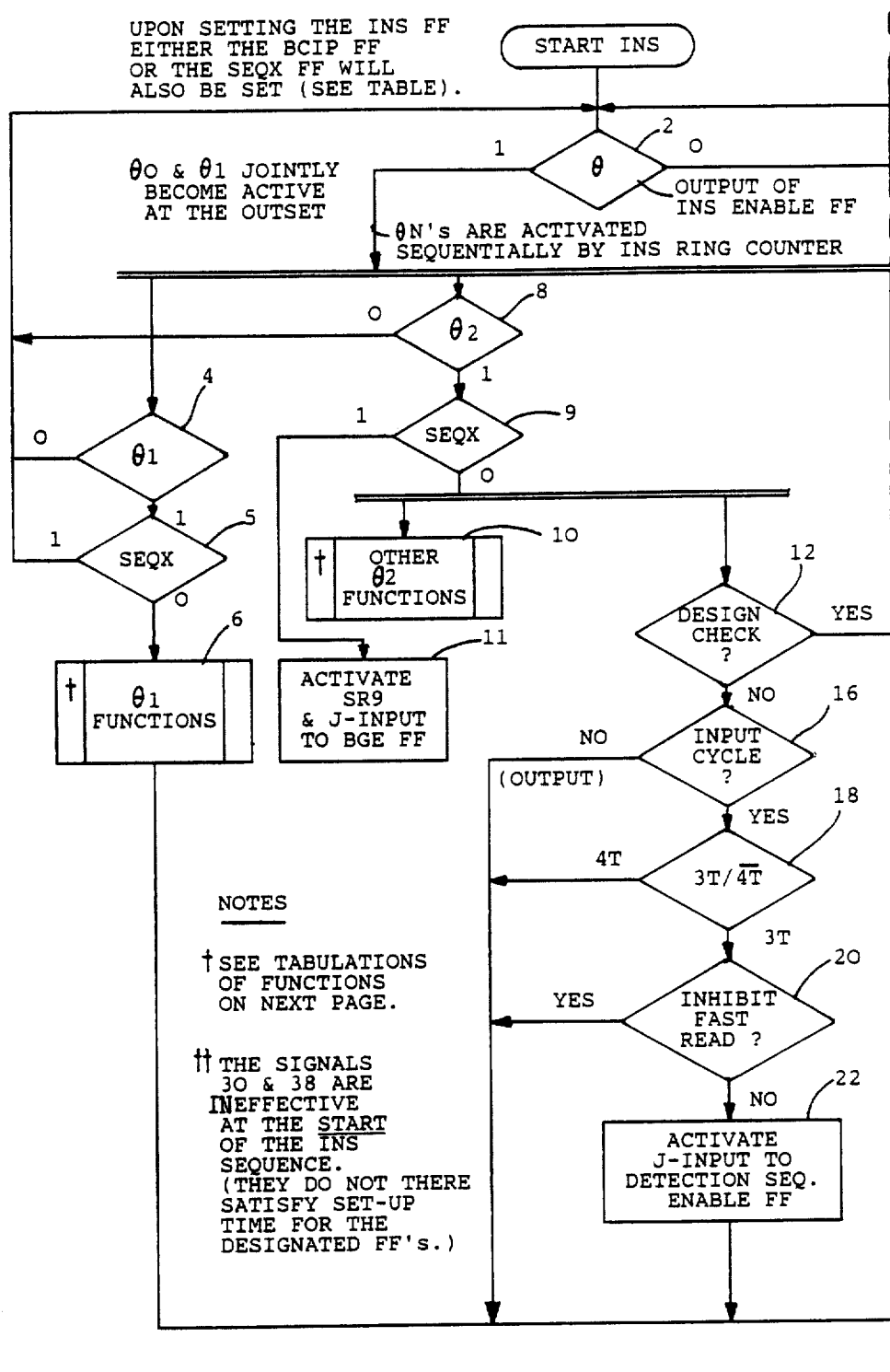
Figure 56B:
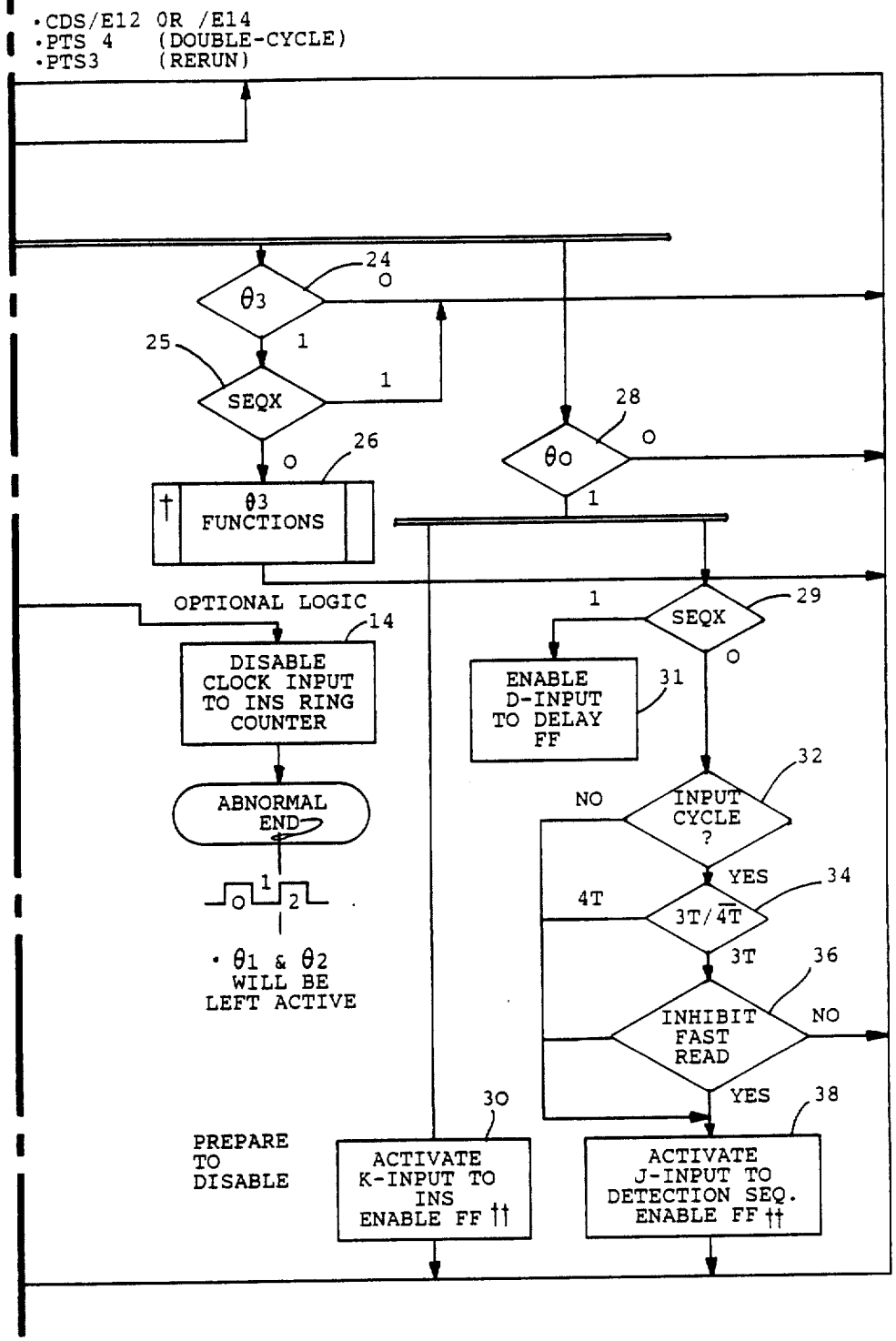
Figure 58:
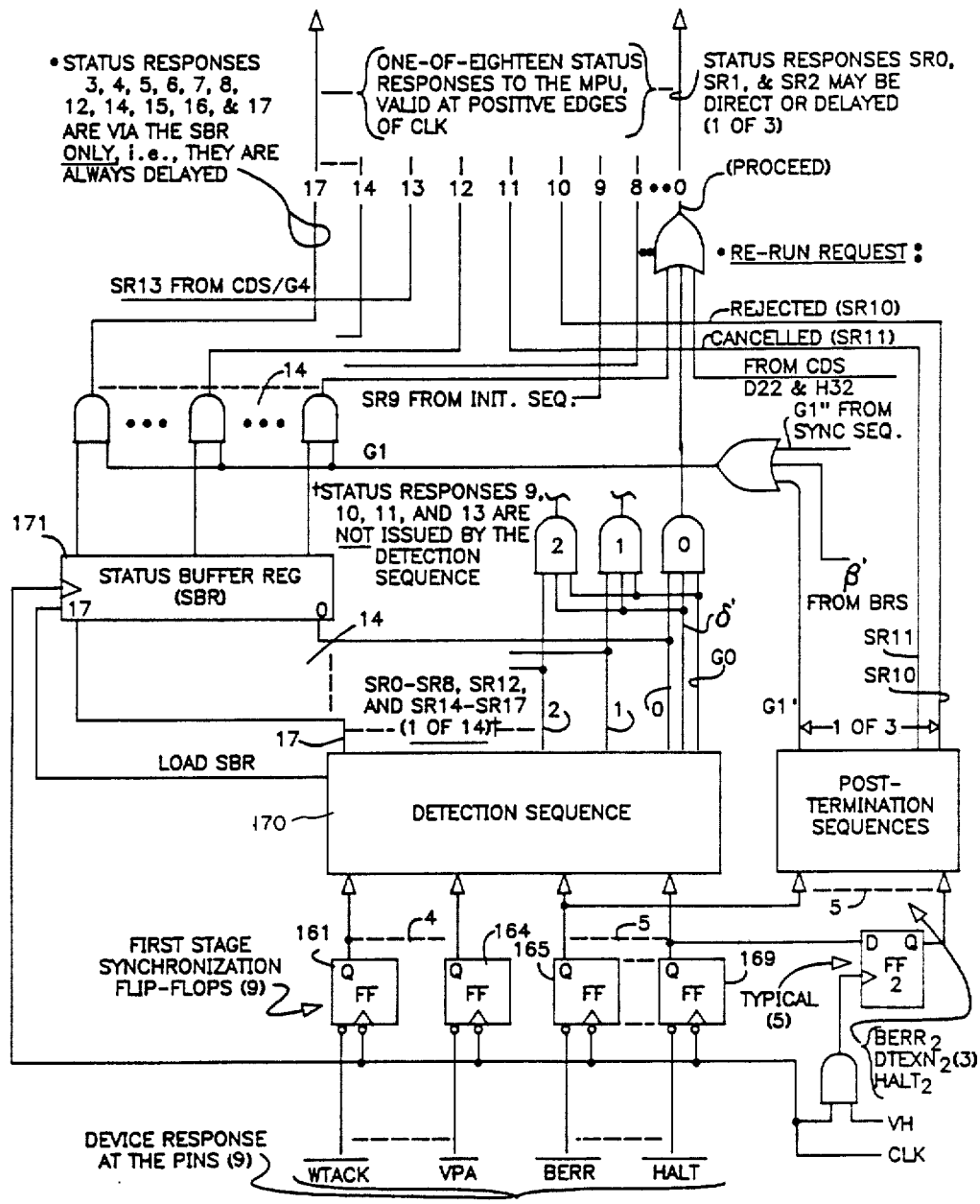
Figure 59B:
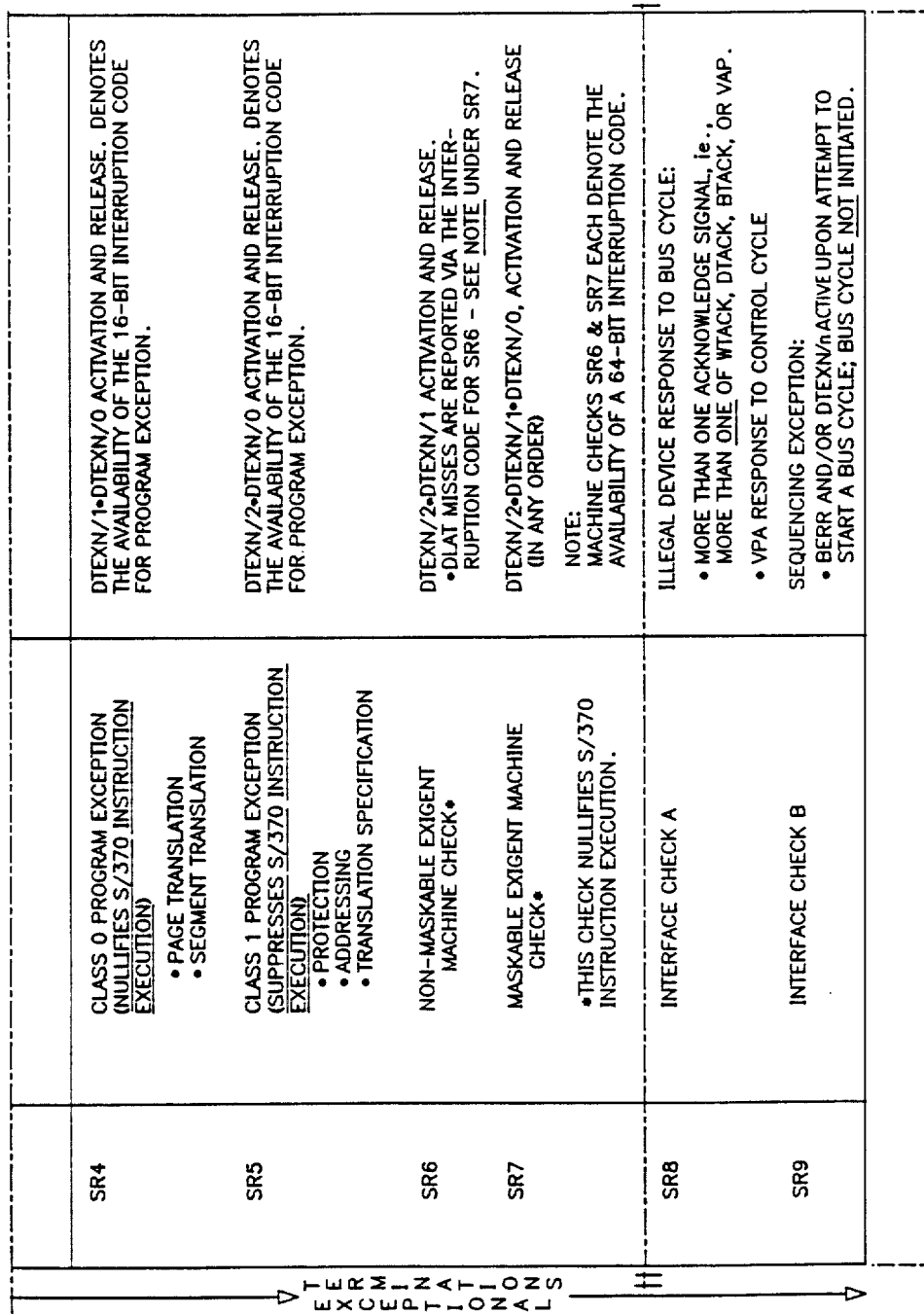
Figure 60:
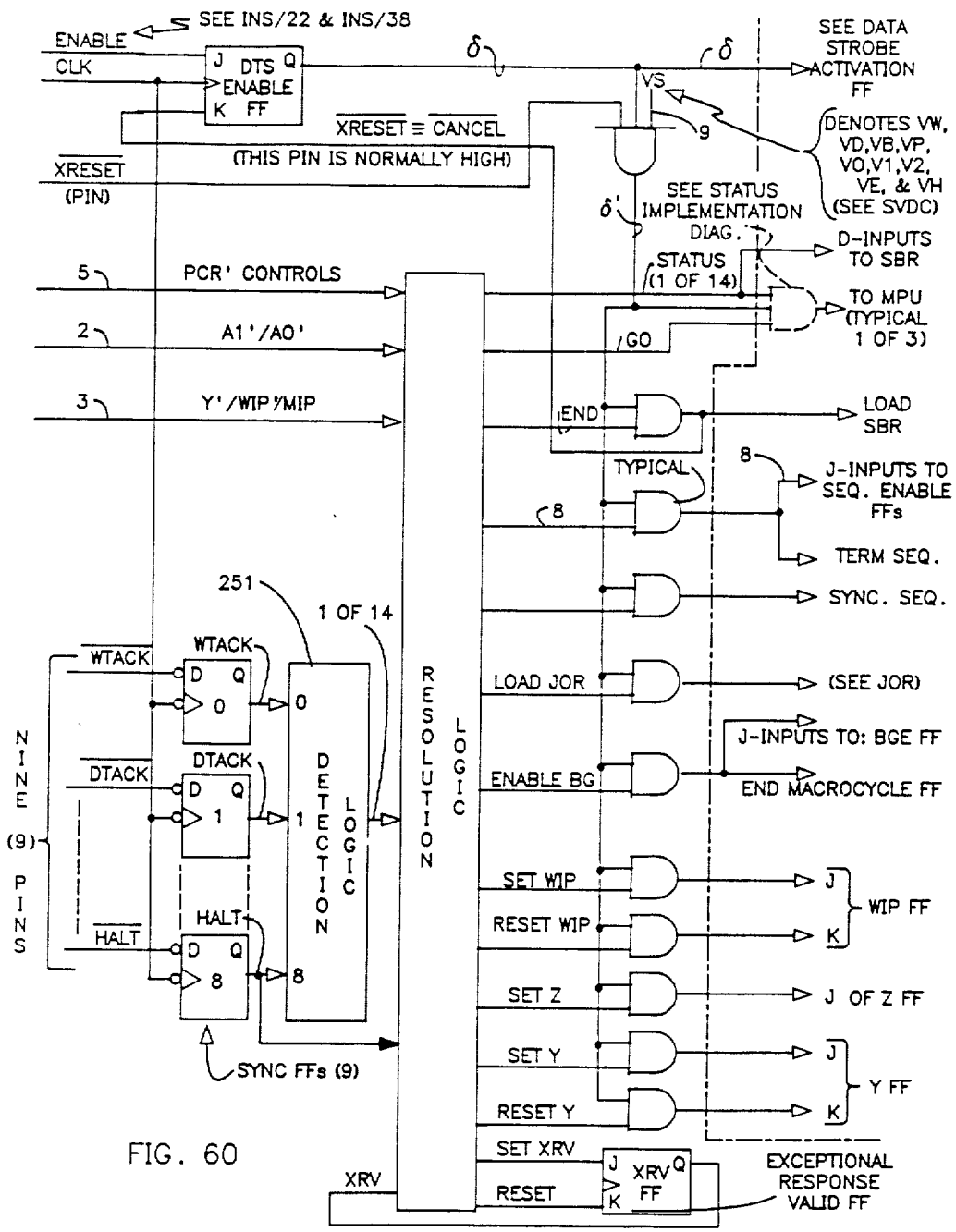
Figure 75:
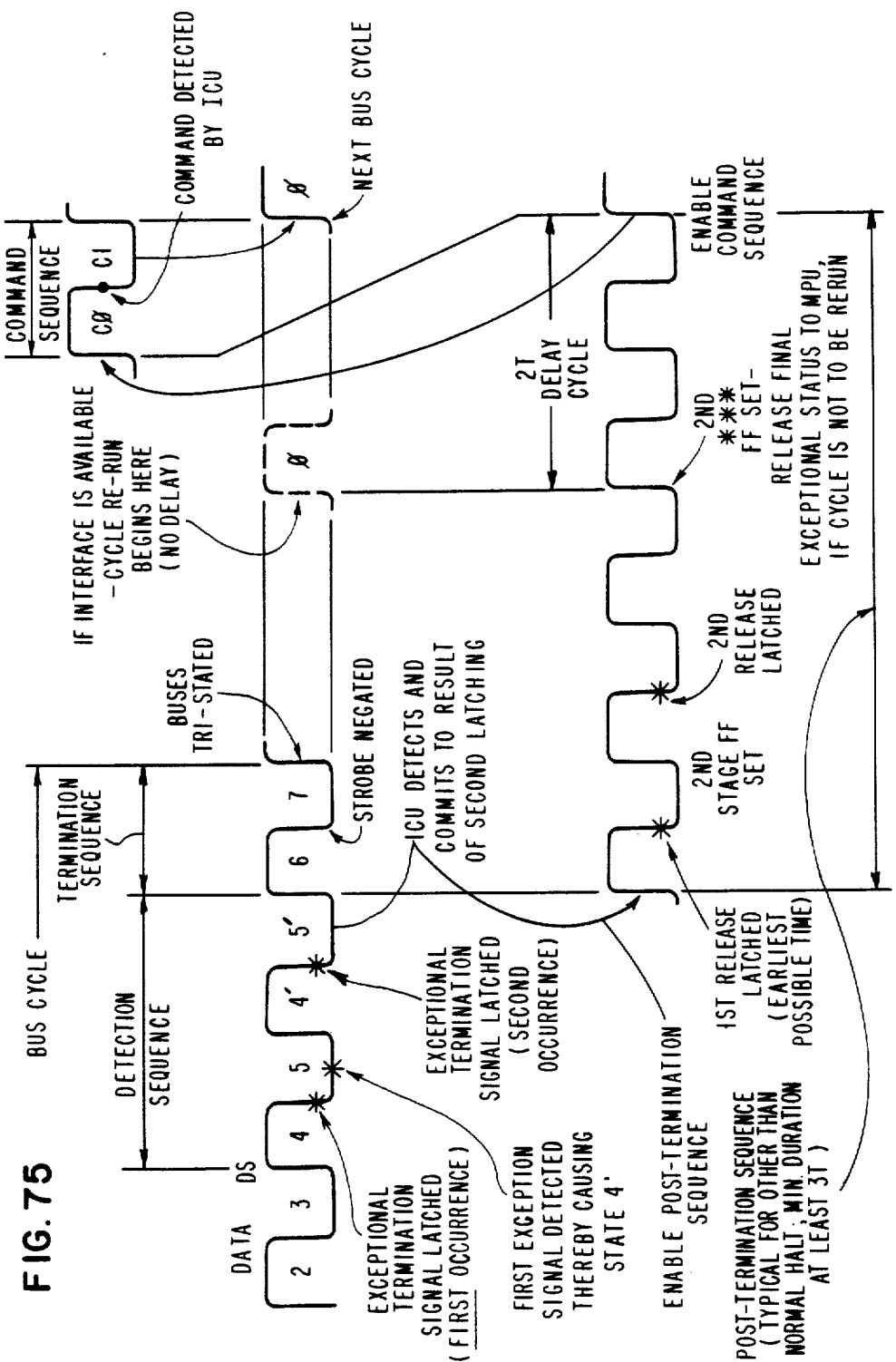
Figure 76:
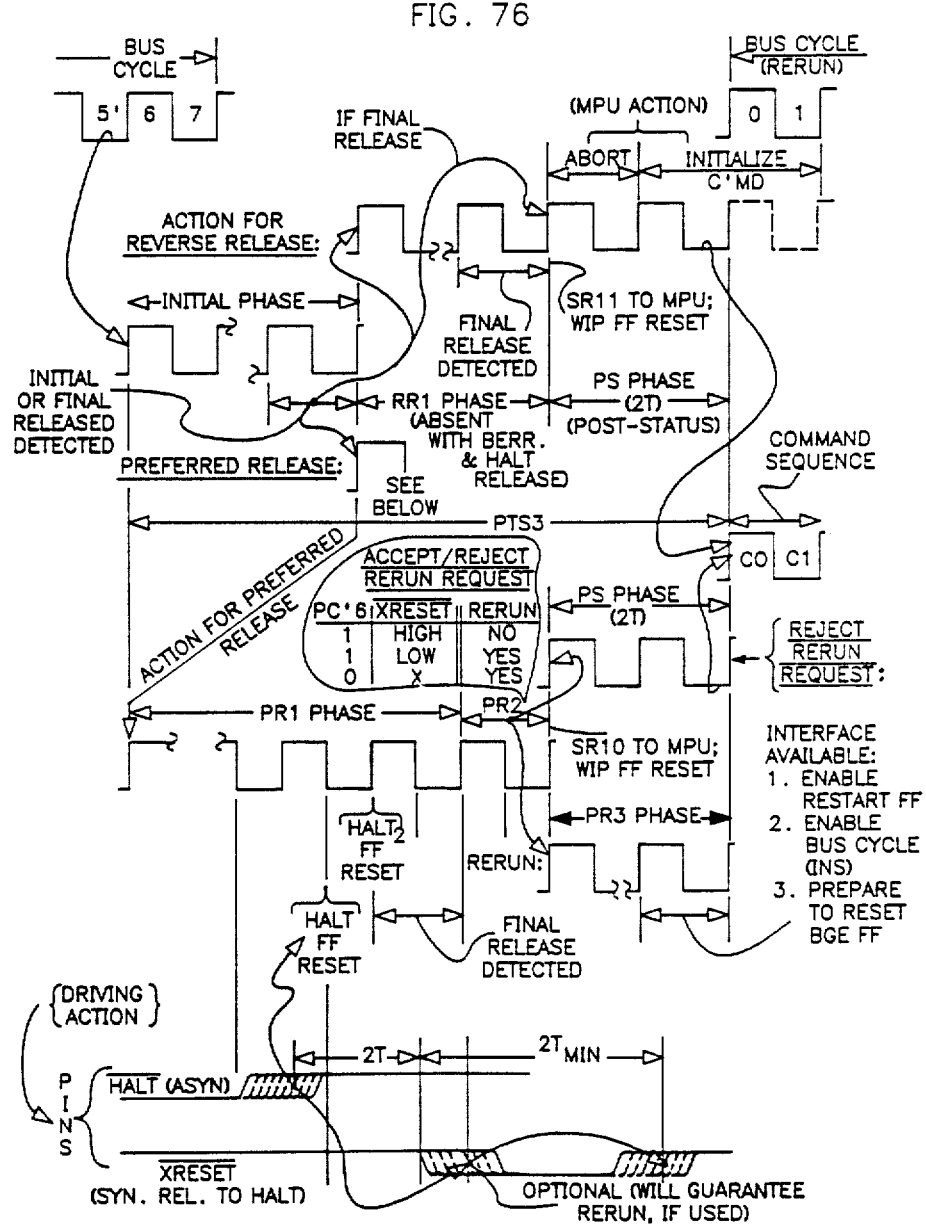

FIGS. 43 to 51, inclusive, are flow diagrams describing the required action of the command sequence control logic;

FIGS. 52 and 53 are flow chart descriptions of the operation of the buffer read/write logic;

FIG. 54 is a timing diagram illustrating the operations the initiation sequence;

FIGS. 55A and 55B are a detailed logic diagram of the initiation sequence;

FIGS. 56A and 56B is a flow diagram describing the operations of the initiation sequence;

FIG. 57 is a timing diagram illustrating the operation of the detection sequence;

FIG. 58 is a detailed logic diagram of the ICU status response logic which communicates with the MPU;

FIGS. 59A, 59B, 59C and 59D are a table summarizing the status response signals and how they are generated;

FIG. 60 is a detailed logic diagram of the implementation of the detection sequence;

FIGS. 61 to 74, inclusive, are truth tables defining the detection and resolution logic of the detection sequence;

FIG. 75 is a timing diagram illustrating the operation of the post termination sequence;

FIG. 76 is the post termination sequence 3 specification timing diagram; and

Figure 77:
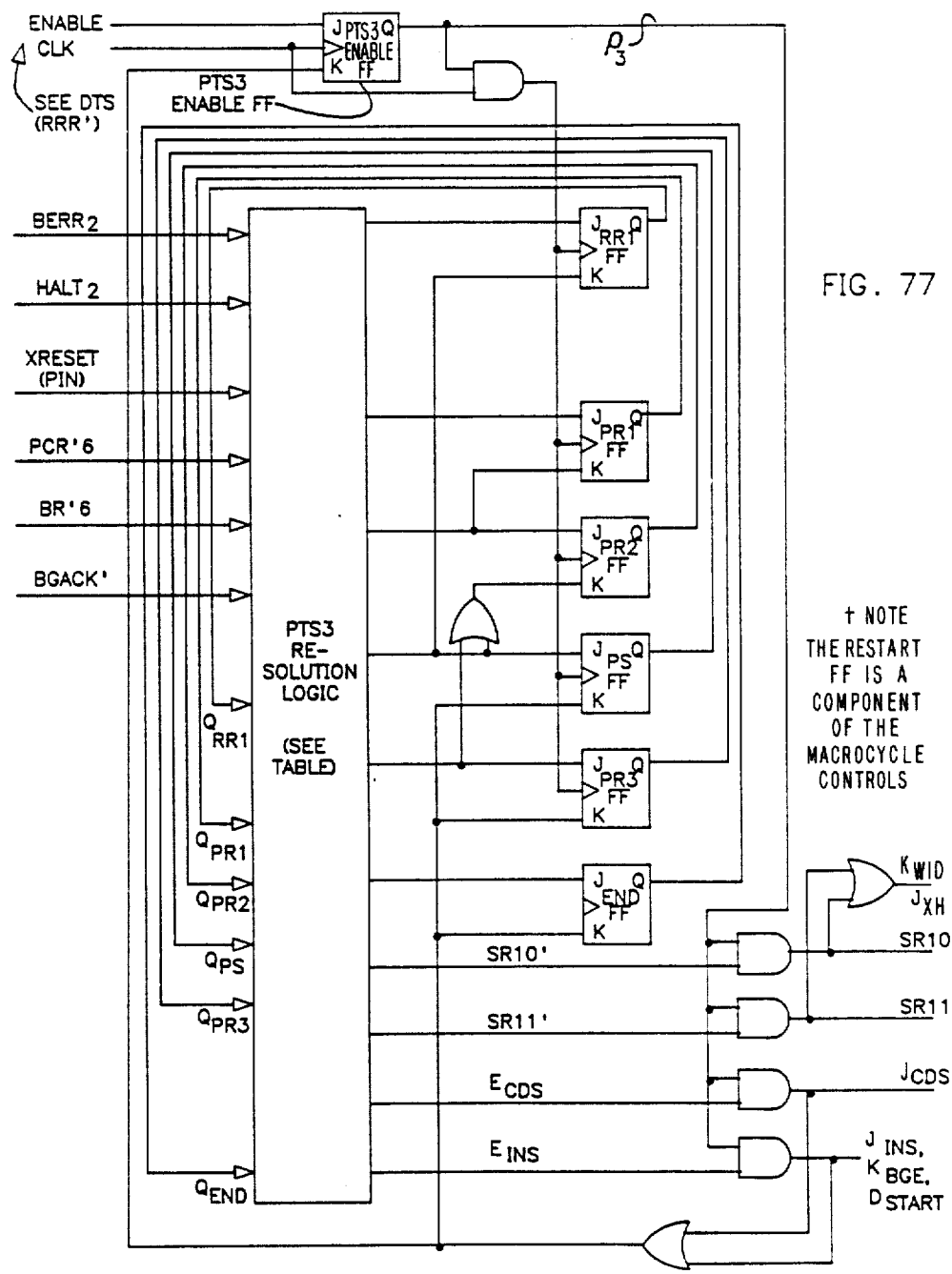

FIGS. 77 and 78A, 78B are, respectively, the post termination sequence 3 (PTS3) logical implementation and the truth table defining the resolution logic.

DETAILED DESCRIPTION OF THE INVENTION INTRODUCTION

The interface control unit (ICU) according to the invention is characterized by a unique logical and functional capability which, in the disclosed preferred embodiment, presents an external appearance that is fully compatible with the support devices of an industry standard microprocessor, the Motorola MC68000. The MC68000 is, therefore, the "compatible microprocessor" of the preferred embodiment. The reader is referred to the MC68000 literature available from Motorola, Inc., of Austin, Tex., for a description of pin assignments and signals associated with each of the pins. The MC68000 microprocessor is actually part of a family of microprocessors which include, in addition to the MC68000, the MC68008 and at least three other microprocessors with various differences in bus architecture The following table briefly summarizes the data bus and address bus sizes of the two named members of this family of microprocessors:

| Microprocessor | Data Bus | Address Bus |
| --- | --- | --- |
| MC68000 | 16 | 23 |
| MC68008 | 8 | 20 |

In addition to the foregoing, there is a MC6800 microprocessor having an 8-bit data bus and a 16-bit address bus. These microprocessors are supported by a wide variety of peripheral devices. By making the ICU fully compatible with the support devices of the MC68000 and the MC6800, and therefore closely compatible with the support devices of the other members of the MC68000 family of Motorola microprocessors, a very large number of support devices are immediately available for use with the associated MPU to build a complete system.

Figure 1:
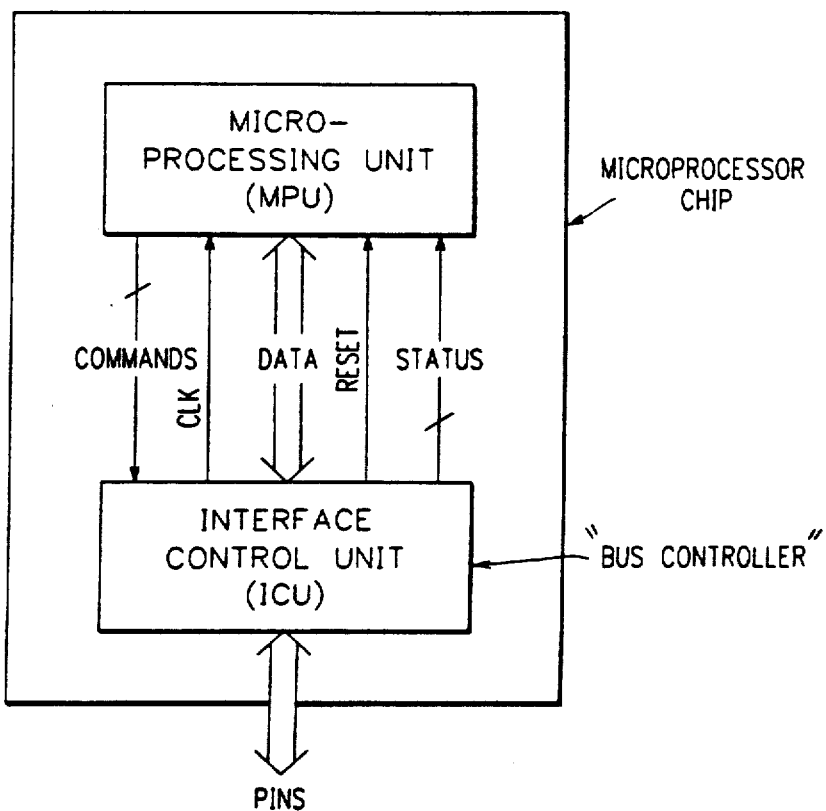
FIG. 1 is a block diagram illustrating the nomenclature of the invention.

FIG. 1 shows in generalized form a single-chip microprocessor 10 having thereon a microprocessing unit (MPU) 12 and an interface control unit (ICU) 14. According to a preferred embodiment of the invention as shown in FIG. 1, the ICU bus 16 has 32 bits of address and up to 32 bits of data. Address and data are separate, not multiplexed. Sixty signal pins of a VSLI chip which incorporates the ICU correspond precisely to those of the MC68000 microprocessor, which itself comes in a 64-pin package, four pins of which provide power and ground. Thus, the ICU has the property of exactly emulating the MC68000 bus but with an MPU that may be of totally different design.

While the invention is disclosed with respect to a preferred embodiment which emulates the MC68000 bus, it should be understood by those skilled in the art that the principles of the invention can be applied to other families of microprocessors and their support devices. For example, with modification to allow for the different bus architecture, the invention could be practiced to support the Intel family of storage and peripheral devices associated with the 16-bit 086/8088 microprocessors and the newer iAPX 186 and iAPX 286 microprocessors.

The 32-bit address part of bus 16 is a uni-directional, three-state bus which carries the address for each bus cycle. For memory accesses, bits A31-A01 identify aligned half-words in "memory space". Bytes within each halfword are separately identified by data strobes. A32 is not used for addressing but is used to distinguish real from virtual addresses. These facilities provide the MPU 12 with means for addressing up to $2^{31}$ (about 2 billion) halfword locations (4 gigabytes) in memory space.

The 32-bit data part of bus 16 is a bi-directional, three-state bus which is used to transfer data to and from external devices. The data may be transferred in widths of a byte (8 bits), halfword (16 bits), or a word (32 bits). For a byte output, the byte is duplicated on all quadrants of the bus. For a halfword output, the halfword is duplicated on the high-order and low-order halves of the bus. For input cycles, the ICU 14 reads Bytes and halfwords from the high-order pins of the data bus; i.e., Bytes from D3114 D24 or D23-D16 and halfwords from D31-D16.

The ICU 14 is designed to operate normally with any mix of concurrently attached 8-, 16-, and 32-bit peripheral devices. Operation is governed dynamically by each device with its width-identifying response to the bus cycle. If a device cannot fulfill the MPU's access request in a single bus cycle, the ICU 14 will itself initiate additional bus cycles to fulfill that request. This process is transparent to the MPU. Each 8-bit and 16-bit device may occupy any range of halfword address space. Similarly, word devices may occupy any range of aligned word address space. The ICU 14 is designed, moreover, to initiate an access request from the MPU 12 at any byte location. The request may be for a byte, halfword or word operand. If the operand is not aligned with its integral boundary, the ICU 14 will access the operand piecewise using separate bus cycles directed at each aligned halfword field of memory within which any portion of the operand is contained or directed. This capability of the ICU frees the MPU 12 from this responsibility of relating its logical address space to the physical constraints of the storage device(s).

The ICU bus cycles are of two distinct types, distinguished by the bus cycle function code. Bus cycles having any one of the seven function codes 000-110 are memory access cycles for which bits A31-A01 of the address bus identify the addressed halfword location in "memory space". Bus cycles having a function code of 111 are of the second type and are called service cycles.

These special bus cycles perform the MC68000 interrupt acknowledge function and other sense and control functions for the MPU 12.

Based on additional control information available at the pins of the ICU 14, service cycles are further identified as one of three types as follows:

| Level Code (LLL) | Read/$\overline{\text{Write}}$ R/$\overline{\text{W}}$ | Service Address (AAA) | Service Cycle Type |
|---|---|---|---|
| 000 | 0 | 000-111 | Control/AAA |
| 000 | 1 | 000-111 | Sense/AAA |
| 001-111 | 1 | none | Inter. Ack. |
| 001-111 | 0 | — | (not used) |

Figure 2:
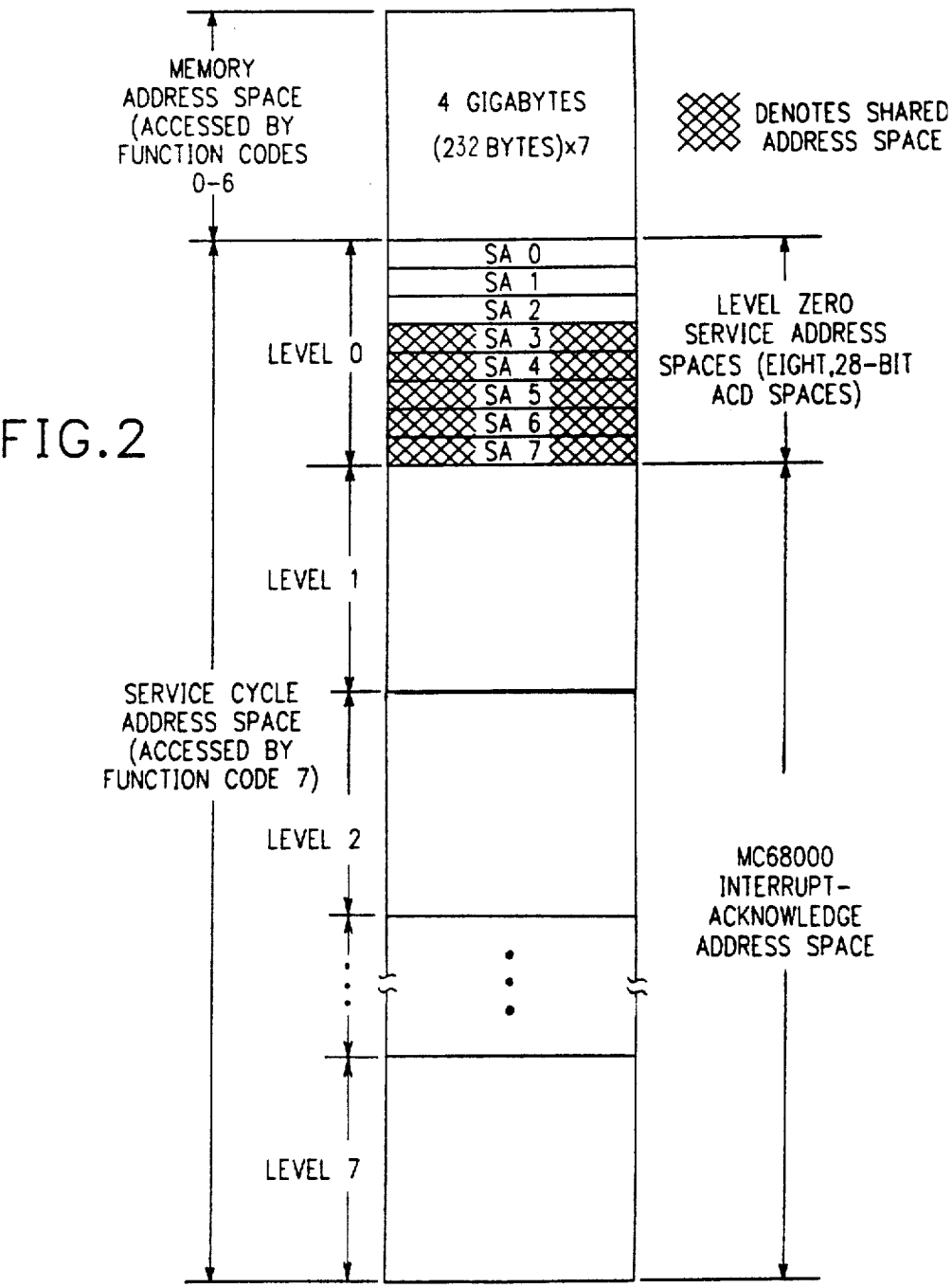
FIG. 2 is a functional diagram illustrating the structure of the address space of a specific example of an MPU used with the preferred embodiment of the ICU according to the invention.

The service cycle repertoire thus comprises eight control cycles, eight sense cycles, and seven (MC68000) interrupt acknowledge cycles. The special features of these cycles are summarized as follows:

(a) The service cycles do not reference the MPU memory address space. Instead, they reference their own service cycle "address space" which is subdivided into eight separate levels, designated Levels 0 to 7. Levels 1 to 7 of service address space are dedicated to the MC68000 interrupt-acknowledge function. Level 0 address space, on the other hand, is dedicated to the MPU sense and control functions and is itself subdivided into a set of eight service address spaces, SA0 to SA7. The complete address space of the specific preferred embodiment is illustrated in FIG. 2.

In the application of the ICU 14 to a particular MPU 12, the interrupt acknowledge address space can be accessed exclusively by the MPU microcode; i.e., interrupt acknowledge cycles need not be instruction-driven. Similarly, level-zero service address spaces 0-2 can be reserved for the exclusive use of the program through two special instructions called, respectively, SENSE and CONTROL. Level-zero address spaces 3-7, on the other hand, may be accessed by either the MPU or the system program, the latter through the same SENSE and CONTROL instructions just described. Under these circumstances, service-address spaces 3-7 are therefore "shared" address space, tacitly requiring the system program and the MPU microcode to be consistent in their application of these address spaces. Such shared service-cycle address space is shown in cross-hatching in FIG. 2.

Figure 3:
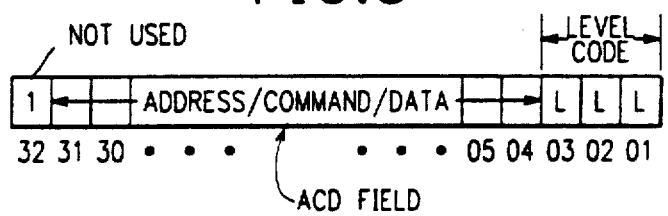
FIG. 3 is a functional diagram illustrating the format of the address bus for service cycles.

(b) For service cycles, the significance of the content of the address bus is shown in FIG. 3. The low-order bits A03 to A01 denote the service cycle level code, LLL. The seven non-zero service cycle level codes identify MC68000-compatible interrupt acknowledge cycles, while the level code zero indicates that a SENSE (input) or CONTROL (output) cycle is in progress. The high-order bits A31-A04 comprise the address/command/data (ACD) field. The significance of this field is dependent upon the particular cycle. For all interrupt acknowledge cycles, the ACD field is always all 1's (active high), in accordance with the Motorola specification for these cycles. For SENSE and CONTROL cycles, on the other hand, the significance of the ACD field is dependent upon the 3-bit service address appearing on the data strobe pins. The table shown in FIG. 4 designates the ACD field for each of the SENSE and CONTROL cycles of a particular MPU. Note that the specification of "shared" service cycles would be tacitly established by the MPU microcode. The system program should conform to this specification whenever it shares service cycles; otherwise, operation is unpredictable. Compatibility with the MC68000 "memory-mapped I/O" is thus achieved through the use of the level zero address space which is transparent to the MC68000 peripheral devices.

(c) For SENSE and CONTROL cycles, the data strobe pins $\overline{\text{WS}}$, $\overline{\text{UDS}}$ and $\overline{\text{LDS}}$ provide the service address bits SA3, SA2 and SA1, respectively. By this means, eight distinct SENSE cycles (SENSE/AAA) and eight distinct CONTROL cycles (CONTROL/AAA) are established, where AAA denotes the encoded service address. The service address signals have approximately the same timing as the address strobe ($\overline{\text{AS}}$). Because of the unavailability of the data strobe pins for data strobe control under these circumstances, other means are provided for the actual data strobe control function. For SENSE cycles, the address strobe ($\overline{\text{AS}}$) performs the dual function of an address/data strobe. For CONTROL cycles, an output service strobe signal (e,ovs/OSS/) is generated on the $\overline{\text{VMA}}$ pin. The timing of $\overline{\text{OSS}}$ coincides with that of the data strobes of memory-access write cycles.

(d) All 32-bits of the data bus are used during each service cycle. The ICU does not inspect or modify data, nor does it initiate additional cycles to complete a service cycle request from the MPU. For output service cycles, 32-bits of "data" are taken from the MPU and transferred over D31-D00 in a single bus cycle. For input service cycles, the content of D31-D00 is transferred to the MPU.

For SENSE and CONTROL cycles, the format of the data bus for the specific MPU specified in the table of FIG. 4 is as shown in the table of FIG. 5. For this MPU, program-initiated SENSE cycles can recognize any one-of-four data bus formats, depending upon the device response ($\overline{\text{WTACK}}$, $\overline{\text{DTACK}}$, $\overline{\text{BTACK}}$ or $\overline{\text{VPA}}$). MPU-initiated SENSE cycles do not have this capability; the MPU interprets the data bus identically for each of these normal responses. For the "shared" SENSE cycles (3-7), therefore, only the single data format shown in FIG. 5 should be used. To do otherwise would lead to unpredictable results inasmuch as the source of the "shared" service cycle is not known to the device.

For the MC68000 interrupt acknowledge cycle, external logic is expected to place the 8-bit interrupt vector number on the data bus as follows:

| Device Response | Location of Interrupt Vector Number |
|---|---|
| $\overline{\text{BTACK}}$ | D31-D24 |
| $\overline{\text{DTACK}}$ | D23-D26 (MC6800 compatible) |
| $\overline{\text{WTACK}}$ | D07-D00 |
| $\overline{\text{VPA}}$ | No Vector (Auto-Vectoring) |

(e) For service cycles, the ICU unconditionally reports all device responses to the MPU. For input service cycles, one-of-four normal responses, $\overline{\text{WTACK}}$, $\overline{\text{DTACK}}$, $\overline{\text{BTACK}}$ or $\overline{\text{VPA}}$, can be reported, while for output service cycles, one-of-three responses, $\overline{\text{WTACK}}$, $\overline{\text{DTACK}}$ or $\overline{\text{BTACK}}$, is available. This behavior of the ICU provides means to distinguish between any one-offour/one-of-three normal outcomes to a SENSE/CONTROL bus cycle and is one of the features of the programmable bus architecture of the ICU according to the invention. By contrast, for memory access cycles, the ICU works with the accessed device(s) to satisfy the MPU's access request. If more than one bus cycle is required, the ICU will automatically initiate such additional cycles and continue to do so until the MPU's access request is completely satisfied. All of this bus action is transparent to the MPU.

(f) The service cycle architecture may be seen to be synonymous with the important capability of "pin-programmability". This is the capability to specify, by means external to the ICU, the precise state of various output signal pins during a bus cycle. Service cycles have this property, and the content of the fields of the address bus, the service address, and the entire content of the data bus for CONTROL cycles are, in effect, all controlled by the MPU. To appreciate the uniqueness of this property, consider the way ordinary memory-access cycles are performed. For these cycles, the ICU acts to satisfy the MPU's access request by performing one or more bus cycles and adjusting the access address, the choice of data strobes, and the content of the data bus (for CONTROL cycles) to satisfy the requirements of each particular bus cycle. This behavior is in sharp contrast to the operation of the service cycles according to the present invention. The ICU according to the invention does not intervene but, instead, allows the MPU control information to "pass-through" directly to the output pins. This property has the important consequence that the access request and all of its attributes may originate not only at the MPU but also at the user program itself. While the ICU does not care about from where the request for a SENSE or CONTROL cycle ultimately comes, its architecture is nevertheless the basis for its user-programmable interface feature. This feature is further enhanced by the high-resolution status response of the ICU to each request for a service cycle.

The ICU architecture also sets forth the concept of a "macrocycle". As used herein, a macrocycle is defined as a logically unbroken sequence of bus cycles identified by the macrocycle-in-progress ($\overline{\text{MIP}}$) signal and having the following characteristics:

(1) During a macrocycle, the ICU will not respond to a normal halt request. A normal halt can be taken only after the last bus cycle of the macrocycle.

(2) Upon initiating a macrocycle, the ICU will not respond to any request for bus mastership until the macrocycle has been completed.

(3) Any normal attempt by a peripheral device to rerun any bus cycle of a macrocycle will cause the ICU to terminate the macrocycle and present "rerun request rejected" status to the MPU.

A macrocycle is initiated and normally terminated in response to "start" and "stop" command signals from the MPU. The purpose of a macrocycle is to provide a means for serializing access to shared memory. Macrocycles are used by the MPU in the execution of test-and-set and compare-and-swap instructions which are extended forms of MC68000 capability.

With MC68000 microprocessors, a bus cycle can be synchronized externally with the common clock through use of the address strobe. This signal begins to appear just after the start of the second clock period of the bus cycle and is guaranteed to be valid before the start of the next (third) clock period. The ICU according to the present invention provides means to establish this synchronization a full clock period earlier than the MC68000. This is accomplished with the bus cycle in-progress ($\overline{\text{BCIP}}$) signal which is activated at the beginning of each bus cycle and is held active until the start of the last clock period of the bus cycle. Using the e,ovs/BCIP/ signal, external logic can be "started" a full clock period earlier than would otherwise be the case. This capability provides a basis for simpler external logic and/or better performance.

The minimum duration of an ICU bus cycle is three clock periods for input and four clock periods for output. This is the latent capability of the ICU. The actual duration of a bus cycle, however, depends upon the responsiveness of the peripheral device. Devices which utilize a "strapped" acknowledge signal, or which otherwise activate their acknowledge signal within one and a half clock periods of the start of a bus input cycle, can achieve the three clock period performance. In order to make the ICU compatible with already existing external device logic which utilizes strapped acknowledge but which cannot accomodate the three clock period read cycle, the ICU features a pin-selectable minimum duration of the bus input cycle. Through the use of the 3T/$\overline{\text{4T}}$ pin, a "normal" four-clock period (4T) or a "fast" three-clock period (3T) minimum duration of the bus input cycle can be selected.

In the implementation of the preferred embodiment, a 16-bit data path is used to move data in and out of the MPU. This means that the ICU must perform two internal (MPU/ICU) cycles in order to transfer a full word (32 bits) over the external bus in a single bus cycle. As a result, the minimum effective cycle time for storing an aligned word is seven clock periods, comprising three clock periods for buffering the first halfword and four clock periods for the bus cycle itself. This is a saving of one clock period over the two back-to-back cycles which would otherwise be required, but this saving is not without a price. Since an MPU may not check for operand alignment, the ICU must check all incipient word output for alignment during the three clock period "buffering" time. Inasmuch as alignment checking is completed in the first two clock periods, a bus cycle can be started with only a two clock period delay if the operand is found to be non-aligned. This bus cycle will transfer the first halfword or byte of the word, and one, two, or three more cycles will ensue to complete the transfer, depending upon the target address. Thus, if the word is aligned, the procedure saves one clock period; on the other hand, if the word is not aligned, two clock periods are lost. Application studies show that aligned words occur far more frequently in typical instruction mixes than do non-aligned words, indicating that the procedure will, in practice, yield better performance than if the buffering/checking period and single 32-bit output cycle were completely eliminated. This is particularly true in the presence of high bus contention for which the buffering/checking will often be overlapped with "off-line" use of the bus. Applications for which there are no 32-bit peripheral devices cannot benefit from this capability. The ICU architecture therefore provides a Suppress 32-bit Output pin by which the user can force the ICU to store full words a byte and/or a halfword at a time without the buffering/checking delays.

The ICU provides means for external devices to respond to a bus cycle in any one of fifteen distinct ways, plus several variations thereto. This feature of the ICU, associated with ten pins of its external interface, enables off-chip logic to terminate a bus cycle with a signal that concurrently describes the outcome of that cycle. This feature is a basis for improving performance and for reducing the amount of response logic at external devices, and it also contributes to the programmability of the ICU.

The fifteen responses may be classified into four distinct response classes as shown in FIG. 6. The four normal responses are the basis for the mixed-width device handling and device acknowledge (ACK) reporting features of the ICU, briefly described above. Specifically, the normal responses are the dynamic means for identifying (a) device bit-width during memory access cycles and (b) one-of-four "normal" outcomes of a service cycle. For service cycles, the ICU always reports the particular normal response to the MPU. The MPU, in turn, can use that information itself for non-program-initiated service cycles or it can set a condition code for program-initiated service cycles. In the latter instance, the program may branch at once on the particular outcome, thereby eliminating the need for additional instructions (and bus cycles) to sense the same information.

Any of the eight device exceptions listed in FIG. 6 is always reported to the MPU. This applies to all bus cycles, whether memory access or service. The action of the MPU in response to a device exception is arbitrary. For purposes of illustration, the action of a particular MPU in response to a device exception could comprise one of the following three conditional actions:

Case A. If, and only if, the associated bus cycle was a program-initiated SENSE or CONTROL cycle, the MPU can encode the device response and store it in a general-purpose register designated by the SENSE/CONTROL instruction. It will then resume normal operations without any further action peculiar to the exception. Thus, under these circumstances, the exception is essentially transparent to the MPU.

Case B. If the associated bus cycle was not a program-initiated SENSE or CONTROL cycle and the device response is either $\overline{BERR}$, $\overline{DTEXN/0}$, $\overline{DTEXN/1}$, or $\overline{DTEXN/2}$ (a single signal), the MPU can force a machine check and create and store a 65-bit interruption code containing the device response in encoded from.

Case C. If the associated bus cycle was not a program-initiated SENSE or CONTROL cycle and the device response comprises more than one $\overline{DTEXN}$ signal, the MPU can take an action peculiar to the signal combination and also move a device-generated interruption code (corresponding to a program check or machine check) from the device to the appropriate pre-assigned location in main storage.

Thus, as a consequence of the immediate reporting of the particular exception to the MPU, the MPU may begin its specific response to that exception at once without any further bus cycles to identify the exception. This contributes to performance, and moreover, in all instances, the device response is effectively buffered, either in a general purpose register (Case A) or in main storage (Cases B and C). This eliminates the need to retain at the device the outcome status of the bus cycle, thereby providing a means for simplifying external device logic. In addition, Case A contributes to the programmability of the ICU by providing the program with the precise details of the exceptional response to SENSE or CONTROL cycles.

The single interface check (see FIG. 6) is handled by the ICU exactly as it handles a device exception; i.e., it is individually reported to the MPU. The MPU action, in turn, can be the same as for device exception Cases A and B. Thus, the consequences would also be the same, providing a basis for better performance, simplified device design, and enhanced programmability. It should be noted that the classification distinction between "interface check" responses and "exception" responses is essentially arbitrary. A device could, for example, intentionally signal a particular exception using multiple ACK signals, or a device could assign a particular meaning to the $\overline{VPA}$ response to a control cycle. The interface check classification thus identifies responses that would ordinarily be unintentional and, for simplicity, they are lumped together, indistinguishable from one another, in a common response class.

The ICU will re-run any bus cycle in response to an appropriate, external device-initiated re-run request sequence. Every re-run request sequence comprises three basic phases, as follows:

(a) Prepare Phase. The external device presents $\overline{BERR}$ and $\overline{HALT}$ in response to the bus cycle to be rerun. The ICU responds by terminating that bus cycle and unconditionally enabling bus arbitration. If a macrocycle is also in progress, it too is terminated along with the bus cycle.

(b) Wait Phase. The external device holds the $\overline{BERR}$ and $\overline{HALT}$ signals active while it performs whatever logical functions it desires before initiating the proceed phase of the request sequence. The duration of the wait phase is arbitrary, and bus arbitration proceeds at the ICU.

(c) Proceed Phase. When the external device is ready to proceed, it activates one of the following three "proceed" signals to the ICU appropriate to the circumstances and consistent with its capability:

(c1) Rerun. The external device performs a MC68000 compatible "preferred release" sequence, defined as the removal of $\overline{BERR}$ followed at least one clock period later by the removal of the $\overline{HALT}$ signal. This requests the ICU to rerun the prior bus cycle. The ICU will rerun the cycle in response to this signal only if that cycle had not been within a macrocycle. If a macrocycle had been in progress, the ICU will not rerun the prior bus cycle and will, instead, present rerun request rejected status to the MPU.

(c2) Rerun Unconditionally. Here, the external device performs the preferred release sequence augmented by a momentary activation of the auxiliary reset ($\overline{XRESET}$) signal synchronized with the deactivation of the $\overline{HALT}$ signal. The ICU will unconditionally rerun the prior bus cycle and, if a macrocycle has also been in progress, it too would be resumed, and the $\overline{MIP}$ signal would be reactivated along with the address strobe. All of this action is transparent to the MPU.

(c3) Cancel. The external device performs a "reverse release" sequence, defined as either the concurrent removal of $\overline{BERR}$ and $\overline{HALT}$ or the removal of $\overline{HALT}$ prior to the removal of $\overline{BERR}$. This tells the ICU to proceed without rerunning the previous bus cycle and to transmit rerun request cancelled status to the MPU.

The ICU rerun architecture thus provides compatible means for the associated MPU to operate with MC68000-type devices without, however, exposing its macrocycles to invisible penetration during the rerun process. This follows from the fact that the MC68000 devices, which cannot recognize ICU macrocycles, also cannot perform the unconditional rerun request sequence. The only "proceed" alternatives available to MC68000-type devices, therefore, are rerun and cancel. An unqualified rerun request, in the presence of a macrocycle, will always be rejected by the ICU, thereby protecting the macrocycle from possible penetration. In this case, recovery must be achieved by indirect, software-supported means. It should be noted, however, that use of the unconditional rerun request (c2) by external devices designed specifically for use with the ICU tacitly implies that these devices will also be designed to make appropriate use of the $\overline{\text{MIP}}$-Out signal, thereby guaranteeing that shared memory space will not be violated during the rerun process.

The ICU will "halt" any bus cycle in response to an appropriate request from the peripheral device. The term "halt" refers to completion of the current bus cycle and enablement of bus arbitration, followed by a wait state during which the ICU is effectively idle, except for its bus arbitration and interrupt detection detection functions. The duration of the wait state is arbitrary and ends whenever the peripheral device "releases" the halt signal. The ICU thus halts a bus cycle during every rerun request sequence.

Two distinct types of halt are defined: normal and pseudo. A normal halt is always transparent to the MPU, and the associated bus cycle is always completed normally. A normal halt, moreover, always occurs in response to signals which include the $\overline{\text{HALT}}$ signal. In the absence of a macrocycle, a normal normal halt may be achieved merely by activating the $\overline{\text{HALT}}$ signal along with the normal termination signal. Normal halt can also be achieved with all bus cycles through the appropriate rerun process, but the bus cycle will be rerun upon halt release.

A pseudo halt occurs whenever the device response falls into one of the following three classes, under the conditions noted: (a) device exception, always; (b) rerun, if the bus cycle is not rerun; and (c) interface check, if $\overline{\text{HALT}}$ is concurrently active. Upon removal of the corresponding termination signal(s), the ICU will resume operation and transmit the exception status to the MPU. Data transfer may or may not have been completed correctly. Thus, the conditions which cause a pseudo halt are never transparent to the MPU. For pseudo halts, moreover, there is a distinction between the halt action and the $\overline{\text{HALT}}$ signal. Some pseudo halts may occur independently of the $\overline{\text{HALT}}$ signal as, for example, in the case of the device exceptions listed in the table of FIG. 6, for which concurrent use of the $\overline{\text{HALT}}$ signal is either unnecessary or ineffective.

The basis for the ICU halt architecture is the same as for its rerun architecture. The ICU is designed to be compatible with standard MC68000-type peripherals without exposing its macrocycles to invisible penetration during the halt process, for which bus arbitration is enabled. Normal halt requests from MC68000-type devices are simply ignored during a macrocycle. Bus cycles of a macrocycle can be halted normally, however, by special procedures (i.e., unconditional rerun) which are intended for use only when the integrity of shared resources can be guaranteed.

The ICU provides means for a peripheral device to, in effect, "hedge" its synchronous response to a bus cycle and thereby achieve a full clock period reduction in bus cycle duration over what would otherwise be required. This feature of the ICU may be explained as follows with reference to the timing diagram of the "4T" bus cycle shown in FIG. 7. The duration of this bus cycle is always $(4+N)T$, where T is the clock period and $(N+1)T$ is the duration of the detection sequence (phase) of the bus cycle. For normal terminations, $N \geq 0$, and for exceptional terminations, $N \geq 1$. The value of N is determined entirely by the peripheral device; specifically, by how quickly it can respond to the output controls of the bus cycle. The ICU samples the device response signals at the $S4_i \perp S5_i$ negative transitions of the clock, and the ICU detection logic resolves that response during $S5_i$. It is the output of the detection logic that determines the subsequent action of the ICU. Thus, if during $S5_i$ the detection logic detects a termination signal, $i = N$ and states S6 and S7 unconditionally follow, thereby terminating the bus cycle. Now, consider the situation of a peripheral device whose response logic requires just under $(3+N)T$ to complete, measured from the very start of the bus cycle. In order to keep this explanation simple, the specific case of $N=0$ will be described from which the general case can be readily inferred. For this device, a response to the bus cycle is not available until the end of $S5_0$. This means that another full clock period $(S4_i \perp S5_i)$ would be required in order for the ICU to latch and resolve the device response, leading to a bus cycle duration of 5T. If the peripheral device were allowed to penetrate the ICU logic and apply a special, device-generated CANCEL signal to the output of the ICU detection logic using an AND gate, the device could present a tentative normal response to the bus cycle during $S4_0$ and complete its operation during $S5_0$; i.e., it could overlap its operation with that of the ICU as the latter resolves the initial (tentative) response. If, during $S5_0$, the device finds it cannot complete the bus cycle at this time, it merely asserts its CANCEL signal, thereby preventing the output of the ICU detection sequence from terminating the bus cycle. This operation is illustrated by the timing diagram of the CANCEL signal shown in FIG. 8. On the other hand, if the device finds that it can complete the bus cycle as it had indicated a half-clock period earlier, it does not interfere (by asserting CANCEL) with the output of the detection sequence. By these means, therefore, the device would be able to perform its normal functions with a 4T rather than a 5T bus cycle. In simple terms, such means allow the device to anticipate the successful completion of operations and rely on a cancellation scheme in the event it does not succeed. This capability is included in the ICU architecture. It is achieved through the use of the Auxiliary Reset ($\overline{\text{XRESET}}$) pin, through which the CANCEL signal may be applied. The CANCEL signal is effective for the initial signals of all classes of device response; it is not, however, effective for the "release" phases of the non-normal responses. The CANCEL signal, moreover, may be applied without danger of external reset as long as its duration is under 10T, the latter duration being well beyond the needs of the cancellation process.

The ICU implements three distinct interrupt request groups providing a total capability for detecting up to seven, concurrent interrupt requests. These groups are set forth in the table of FIG. 9. Each interrupt request cannot be guaranteed if that request is removed prematurely. Requests may be presented at any time. Synchronization and deskewing are performed by the ICU. The ICU samples the ten interrupt request pins at every negative transition of the input clock. If any request of (or within) a group is identical with that detected one clock period earlier, that request or its removal is latched in the ICU's interrupt request register (IRR) where it can be sampled by the MPU. Propagation time through the ICU, from first detection to latching in its IRR, is 2.5T, where T is the input clock period. This detection scheme is designed to shield the MPU/ICU VLSI chip from any spurious activity on the interrupt request lines. Interrupt processing is handled entirely by the MPU. Each interrupt request will, in due course, elicit a response from the MPU and, in order to transmit that response to the requestor, the MPU must again draw upon the facilities of the ICU. The facilities used for this purpose by a specific MPU associated with the preferred embodiment of the ICU are summarized in the table shown in FIG. 10. For any of the five system interruption requests, the MPU response in a SENSE/4 and/or SENSE/5 service cycle called, respectively, Sense System Interruption Code Low/High. These service cycles can be microcode or program-initiated; i.e., they are among the "shared" service cycles of the system. The IBM System/370 interruption class (one-of- five) is itself identical in the ACD field of the address bus as indicated in the table of FIG. 4. The requestor should remove the corresponding interrupt request in response to either of these service cycles. The response to interrupt requests of the priority request group appears solely on the System/370 CPU State Indicator pins and, in the case of the E-unit Dump, in the action itself. The dump request should be removed before completion of the dump, or the dump will be repeated. For the vectored interrupts of the MC68000 group, the MPU response is an "interrupt acknowledge" cycle which corresponds in all respects to that of the MC68000. The requestor may, however, place the 8-bit interrupt vector number in any of the three previously described positions on the data bus and define that location with the appropriate acknowledgement. Autovectoring is indicated exactly as with the MC68000, with a $\overline{VPA}$ response. The MC68000 device response should, of course, be removed in response to the interrupt acknowledge cycle.

The bus arbitration architecture of the ICU is similar to that of the MC68000. It utilizes the same three signals, Bus Request ($\overline{BR}$-In), Bus Grant ($\overline{BG}$-Out), and Bus Grant Acknowledge ($\overline{BGACK}$-In), and insofar as access to its external bus is concerned, encompasses the same three classes of device: supreme master (the ICU itself), master, and slave. The ICU can initiate a bus cycle with any device of the other two classes, whereas an ordinary master device can initiate a bus cycle only with slave devices. Slave devices do not have the capability to initiate bus cycles. At any given time, no more than one master device can be in control of the bus. There are, however, some specific differences between the two architectures that may affect compatibility with some master-type devices designed for the MC68000.

For the ICU, a bus grant response to bus request is a necessary condition for the assertion by a requesting master of $\overline{BGACK}$. Violations of this requirement will, in general, lead to conflict with the ICU and unpredictable results. The complete picture is set forth below where, for simplicity, the signal mnemonics denote logical states and not actual levels:

(1) BR can be activated at any time and is ordinarily negated by the requestor just after it asserts BGACK.

(2) BG is the ICU's response to BR. It is never activated for any other reason. The maximum response time is not specified and cannot be predicted by the requestor. Whenever BG is activated during a bus cycle, that activation occurs at the beginning of S6 of the bus cycle, one clock period later than would be the case for the MC68000. BG is negated in response to the assertion of BGACK or to the prior removal (cancellation) of BR.

(3) BGACK is a response to BG·$\overline{AS}$; i.e., BGACK must not be asserted unless BG is active and AS is concurrently inactive. Once activated, BGACK must be held active for the entire duration of bus mastership, for which there is no specified limit.

(4) The bus "busy" condition is synonymous with BGACK+$AS_{ICU}$, where $AS_{ICU}$ denotes the ICU-driven address strobe. There is no specified limit on the duration of a given busy condition. The system designer must, therefore, take into account the needs of overrunable devices.

The underlying reason for the "tight control" of bus arbitration relates to the ICU's capacity for performing sequences of related bus cycles for which, unlike the MC68000, the target address may change from cycle to cycle. Specifically, bus availability to others is affected by macrocycles, unaligned operands, and word transfers that require more than one bus cycle. For the ICU, the BG signal is definitive and must be obeyed. This is quite different from its role in the MC68000. For that microprocessor, the BG signal is essentially only a convenience providing (1) early notification of incipient bus release, if activated during a bus cycle, and (2) means for implementing external, serial priority allocation logic. With the MC68000, a requestor can, for example, infer bus release merely by presenting $\overline{BR}$ or $\overline{BGACK}$ and watching the action of $\overline{AS}$. If, 4.5T after presentation of either of these signals, AS is inactive, the bus is immediately available. On the other hand, if at that time $\overline{AS}$ is active, it may be concluded that the bus will nevertheless become available as soon as AS is subsequently negated. For the MC68000, this need not be long, as a read/modify/write cycle is the longest duration MC68000 cycle.

With the exception of only two cases, the ICU, like the MC68000, will never take more than two back-to-back bus cycles without enabling bus arbitration. The two exceptions are (1) when running macrocycles, and (2) when storing a full word that straddles a non-word aligned physical boundary of a halfword memory followed by a byte memory.

Finally, it is helpful here to note the specific circumstances under which the ICU will tri-state its controls or maintain them in that high-impedance state. These circumstances are the concurrence of the following three conditions: (1) The bus is not needed by the MPU, (2) the ICU is not driving the address strobe, and (3) any one of the conditions of (a) HALT, driven by the ICU in response to a command for the MPU, (b) the bus arbitration "state machine" has detected a logically valid request for bus mastership, or (c) the bus is "busy" under control of an external master. The ICU will also tri-state its controls during any of its three external reset sequences.

DESCRIPTION OF THE PREFERRED EMBODIMENT OF THE INVENTION

The following description is divided into several parts by topic in order to facilitate an understanding of the invention. The first main topic is the external architecture of the ICU. This architecture includes both the pin-out specification and the MPU/ICU interface. The MPU/ICU interface is properly considered a part of the external architecture because, although the MPU and ICU physically share the same VSLI chip, they are logically independent. This is an important and novel departure from the prior art wherein the distinction is not made. The second main topic is the actual implementation of this architecture in the form of the preferred embodiment. This implementation is described in two subtopics dealing separately with execution logic and control logic. Like an MPU, the ICU may be characterized as comprising an execution unit and a control unit. The execution unit is controlled by the control unit and comprises various registers, latches, multiplexers, logic, and data and address buses which provide the physical interface between the MPU and off-chip devices The brain of the ICU is the control unit. In the discussion of the execution logic, no attempt is made to describe in detail the control signals generated by the control logic. These signals are, instead, discussed in the latter subtopic. The execution logic forms the mechanism by which the various functions of the ICU are performed. The control logic determines when those functions are performed.

External Architecture, Pin-Out Specification

Figure 11:
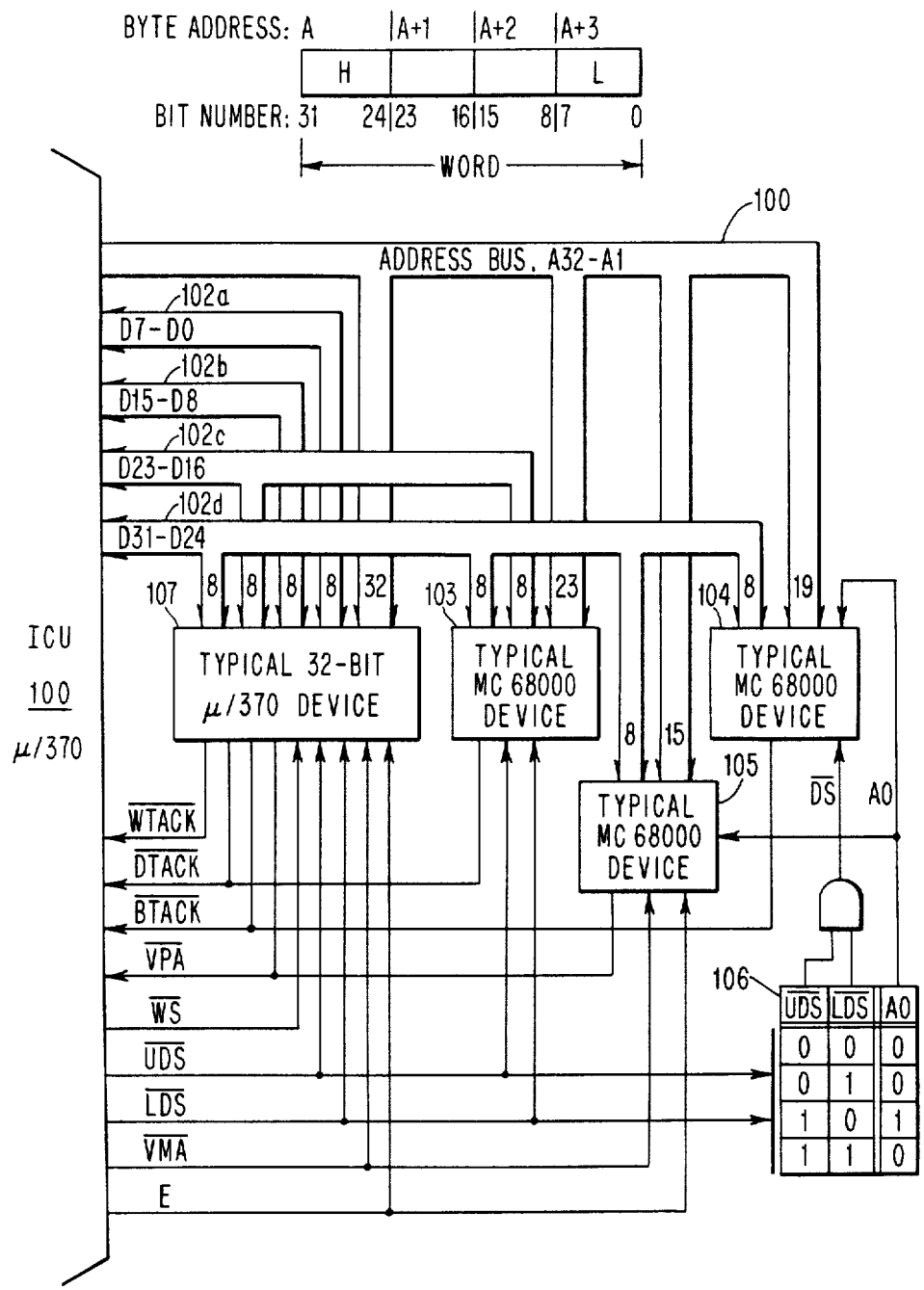
FIG. 11 is a block diagram showing a typical attachment of external devices to the ICU.

Referring now to FIG. 11, the ICU 100 is shown as being connected by an address bus 101 and a four byte-wide data bus 102a, 102b, 102c and 102d to a plurality of external devices having different address and data widths. For example, a typical 16-bit MC68000 device 103 is shown connected to 23 lines of the address bus 101 and to the high-order two bytes of the data bus 102c and 102d. Similarly, a typical 8-bit MC68008 device 104 is shown connected to 19 lines of the address bus 101 and to the high-order byte of the data bus 102d. Both of these devices, despite differences in data widths, belong to the same family of devices. There is also shown a typical MC6800 device 105 connected to 15 lines of the address bus 101 and to the high-order byte of the data bus 102d. This is another 8-bit device, but it belongs to a different family of devices. All of these devices are also connected to the various control signal pins of the ICU by which these devices and the ICU communicate. In the case of the MC68008 and MC6800 devices 104 and 105, additional small-scale integration (SSI) logic 106 is required to generate some of the required control signals. In addition to the MC68000 family of devices which are already commercially available, the ICU according to the invention also contemplates the design and attachment of its own 32-bit devices. A generic device of this type is illustrated at 107. The combination of devices shown in FIG. 11 is merely illustrative, and in a given system there may be a different combination of these types of devices.

The pin designations and functions of the ICU are summarized in the table shown in FIG. 12. From this table, it will be understood that the SSI logic 106 in FIG. 11 combines the upper data strobe $\overline{UDS}$ and the lower data strobe $\overline{LDS}$, which are used by MC68000 devices, to produce the data strobe $\overline{DS}$, which is used by MC6800 devices. In addition, the low-order address bit A0, which is required to address MC68008 and MC6800 devices, is also derived from $\overline{UDS}$ and $\overline{LDS}$ in the logic 106. The logic 106 is represented by a truth table and an AND gate.

The word strobe $\overline{WS}$ is activated for non-service cycles only during output operations, and in particular, only during those for which the ICU has prepared the data bus for a full, aligned 32-bit word transfer. For these transfers, $\overline{UDS}$ and $\overline{LDS}$ are also activated concurrently to maintain MC68000 compatibility, and A1 is set to zero. Byte and halfword transfers are indicated by the ICU using only $\overline{UDS}$ and/or $\overline{LDS}$.

For read/write cycles, the address bus 101 has exactly the same significance as the address bus of the MC68000 microprocessor except that the MPU can address up to $2^{31}$ halfword (16-bit) locations using address bits A31-A01. A32 of the bus is not used for addressing and is, instead, the real address tag. When this tag is active (high), the associated address on bus lines A31-A01 is a real address. When A32 is inactive, the associated address is interpreted as a virtual address. The level of A32 is determined solely by the MPU.

The word transfer acknowledge $\overline{WTACK}$ signal is used by 32-bit devices to indicate a normal response to the output controls of a bus cycle. When used with an input operation, $\overline{WTACK}$ signifies that the addressed device has placed, or will place within the time period T31 (see MC68000 electrical specifications), on the data bus the full 32-bit aligned word corresponding to the address bits A31-A2. This word will be maintained until the device detects the deactivation of the strobe signals from the ICU. When used in response to an output operation, $\overline{WTACK}$ signifies that the device has accepted the byte, halfword, or word on the data bus and that the ICU may now proceed to terminate the bus cycle. The format of the data bus is indicated to the device at the outset of the bus-cycle by the data strobes:

| WS | UDS | LDS | ITEM | LOCATION |
|----|-----|-----|------|----------|
| 1  | 1   | 1   | Full Word | D31-D00 |
| 0  | 1   | 1   | Halfword | D31-D16 & D15-D00 |
| 0  | 1   | 0   | Byte | D31-D24, D23-D16, |
| 0  | 0   | 1   | Byte | D15-D08, & D07-D00 |

All input service cycles are terminated normally in response to any one of the three data transfer acknowledge signals, $\overline{WTACK}$, $\overline{DTACK}$, $\overline{BTACK}$, and $\overline{VPA}$, and each of these signals is identified to the MPU. Output service cycles (CONTROL) are treated similarly except that a $\overline{VPA}$ response will cause an interface check. For interrupt acknowledge service cycles, each acknowledge signal has the following significance:

| DEVICE RESPONSE | LOCATION OF INTERRUPT VECTOR |
|---|---|
| $\overline{WTACK}$ | D07-D00 |
| $\overline{DTACK}$ | D23-D16 |
| $\overline{BTACK}$ | D31-D24 |

A $\overline{VPA}$ response to an interrupt-acknowledge cycle signifies that no vector was transmitted and that the processor should auto-vector the interrupt request. This is a normal response.

Figure 7:
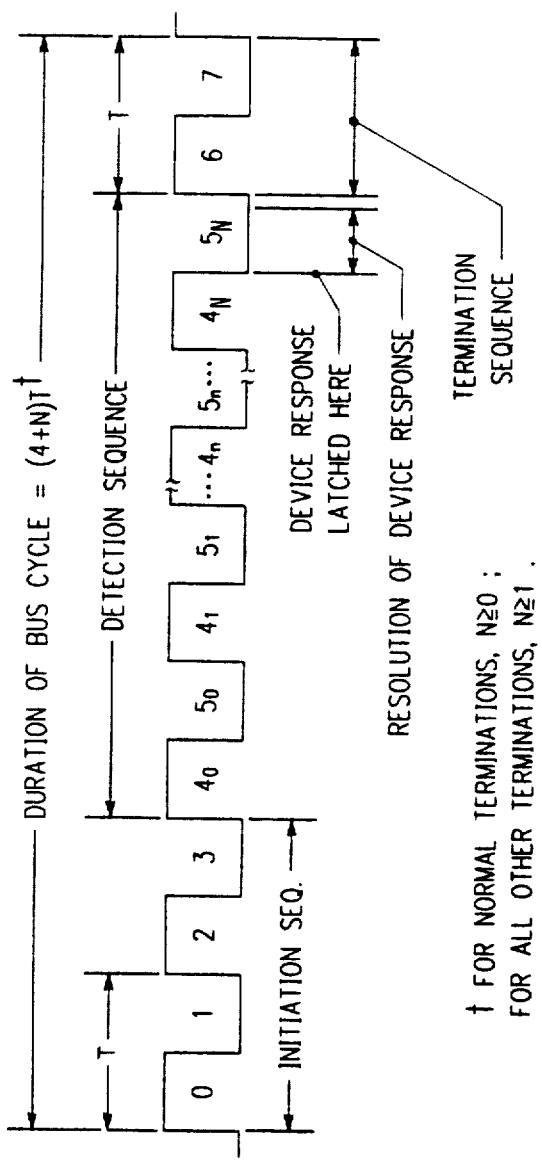
FIG. 7 is a timing diagram of the ICU 4T bus cycle.
Figure 8:
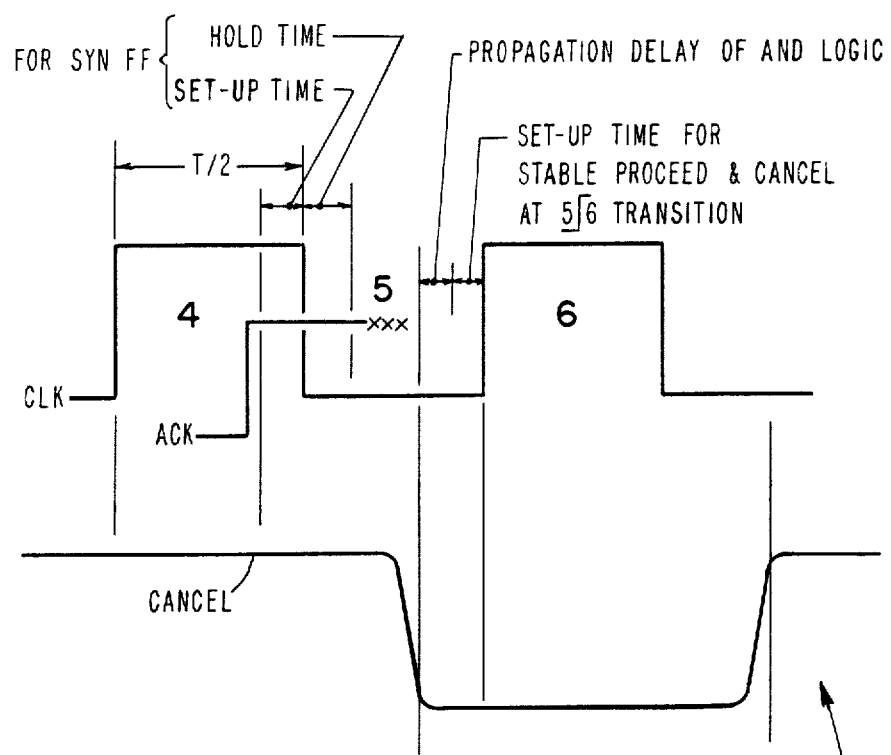
FIG. 8 is a timing diagram illustrating the CANCEL signal timing.

Each of thirteen bus cycle response signals feeds the D-input of its own dedicated, negative-edge triggered D-type flip-flop. The outputs of these synchronizing flip-flops, in turn, drive the ICU detection logic which produces a single status response to the MPU. Detection of any one of the four acknowledge signals ($\overline{\text{WTACK}}$, $\overline{\text{DTACK}}$, $\overline{\text{BTACK}}$, or $\overline{\text{VPA}}$) generates the normal status response to the MPU. Detection of more than one acknowledge signal always generates an "interface check". Whenever the ICU latches up an acknowledge signal, and no exception signal has also been latched, the ICU will next enter state 6 of the bus cycle, as shown in FIG. 7.

The byte transfer acknowledge $\overline{\text{BTACK}}$ signal is used by non-MC6800 8-bit devices to indicate their normal response to the output controls of a bus cycle. When used during an input (read) operation, $\overline{\text{BTACK}}$ signifies that the addressed device has placed, or will place within time period T31, on D31-D24 of the data bus 102d the addressed byte, if a byte fetch, or the high-order byte of a 16-bit fetch. If the fetch request had been for a 16-bit halfword, the ICU 100 will, in response to $\overline{\text{BTACK}}$, immediately act to fetch the low-order byte of the halfword. For output (write) operations, the activation of $\overline{\text{BTACK}}$ signifies that the addressed device has taken only the information on D32-D24 of the data bus 102d and that the ICU may now proceed to terminate the associated bus cycle. The device will store the byte at the location corresponding to A31-A0, where A0=0, if $\overline{\text{UDS}}=1$, and A0=1, if $\overline{\text{UDS}}=0$ and $\overline{\text{LDS}}=1$. If BTACK is received in response to a 16-bit store ($\overline{\text{UDS}}=\overline{\text{LDS}}=1$), the ICU100 will automatically perform another bus cycle to store the low-order byte. For all byte output transfers, the byte is duplicated on all quadrants of the data bus.

The valid memory address $\overline{\text{VMA}}$ and enable E signals are supplied in response to $\overline{\text{VPA}}$, in conformity with the MC6800 specification of these signals.

The complete signal repertoire of the ICU is defined in the table shown in FIG. 12. Not all of the signals defined in FIG. 12 are represented in FIG. 11, this latter figure having been simplified to provide a clear overview of the attachment capability and basic communication between the ICU 100 and externally connected devices.

External Architecture, MPU/ICU Interface

Figure 14A:
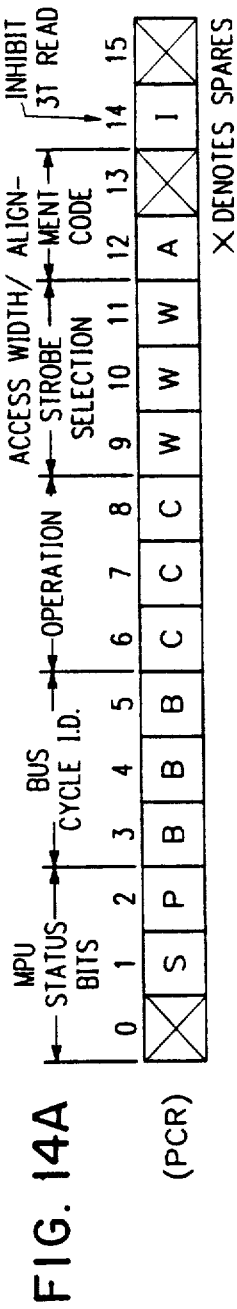
Figure 15:
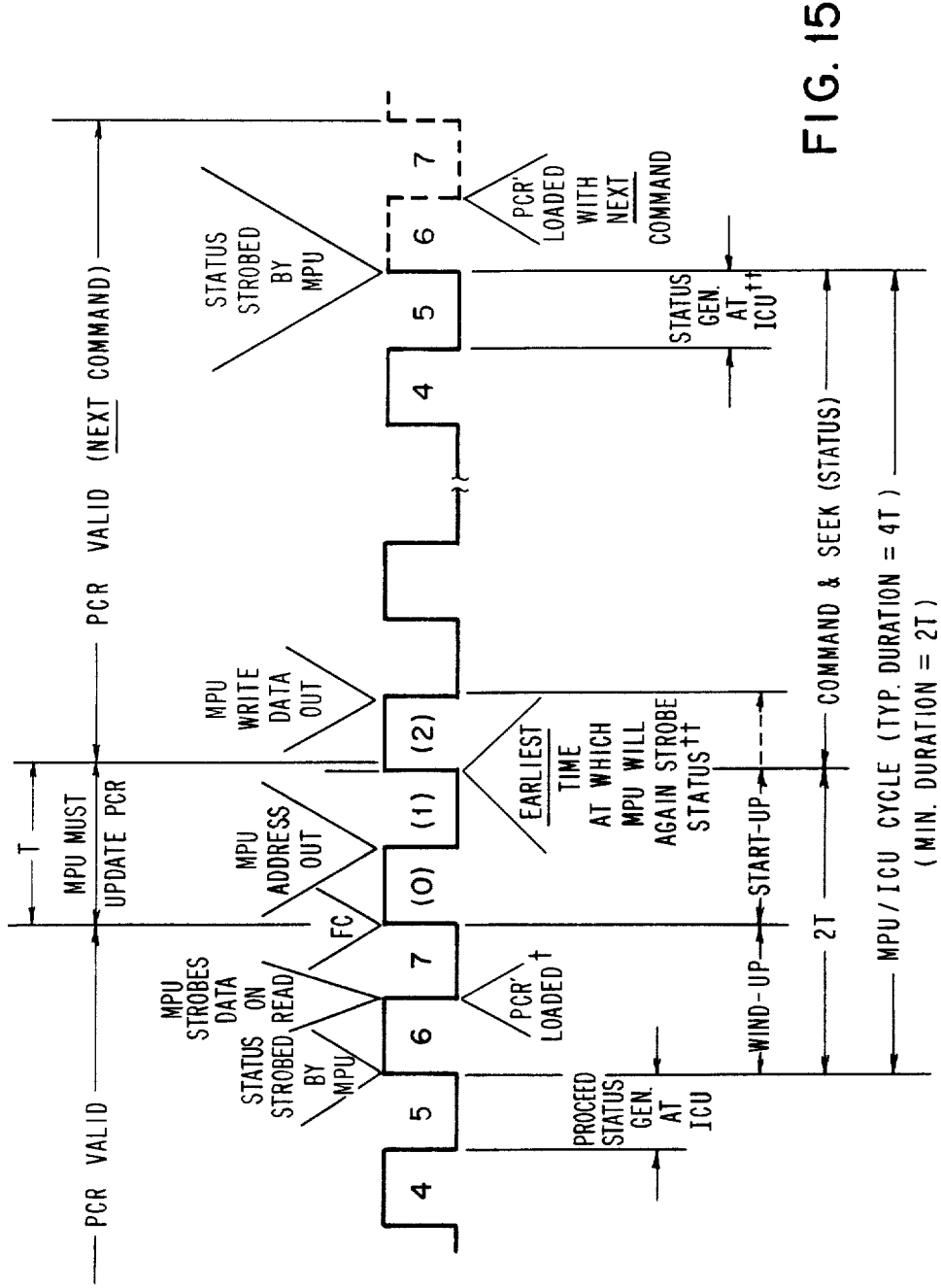
FIGS. 15 and 16 are timing diagrams of the MPU/ICU interface cycles.

As shown in FIG. 13, the ICU 100 provides communication between external devices and the on-chip MPU. Commands to the ICU originate at the processor command register (PCR) 108 located in the MPU. The content of this register is detailed in FIG. 14. Status responses to commands originate in the detection logic 109 within the ICU 100 and are transmitted to the MPU via eighteen status response signal lines SR0–SR17 as described in more detail hereinafter. As indicated in the timing diagrams of FIGS. 15 and 16, commands are taken by the ICU only on falling edges of the input clock. If service to a prior command is not in progress, or if service to the MPU is not temporarily inhibited because of a halt condition, the ICU will strobe and buffer the content of PCR 108 on every falling edge until a non-zero command is detected. The PCR hierarchy comprises three levels, denoted PCR, PCR', and PCR". PCR 108 is the highest level and represents the full command at the MPU. It will be understood by those skilled in the art that PCR 108 need not be a physical register in the MPU. PCR' 108' is the replica of the full PCR 108 as buffered in the ICU during the command sequence. Since the command sequence may be overlapped with states 6 and 7 of the bus cycle, the content of the PCR' 108' may change during the bus cycle. The PCR' 108' cannot, therefore, be used to control address selection or to establish the function code, for these signals must be maintained for the entire bus cycle. Thus, a third level of buffering is required. This is provided by PCR" 108" which receives selected bits of PCR' 108' that must be fixed for the entire bus cycle, namely PCR1(S), PCR2(P), and PCR3(B$_3$). Also, PCR4(B$_4$), PCR10(W$_{10}$), PCR11(W$_{11}$), and PCR12(A) are buffered in PCR" 108". PCR" 108" is implemented as indicated in FIG. 13 and is loaded form PCR' 108' at the start of each bus cycle and buffer enabled by the command sequence.

Figure 16:
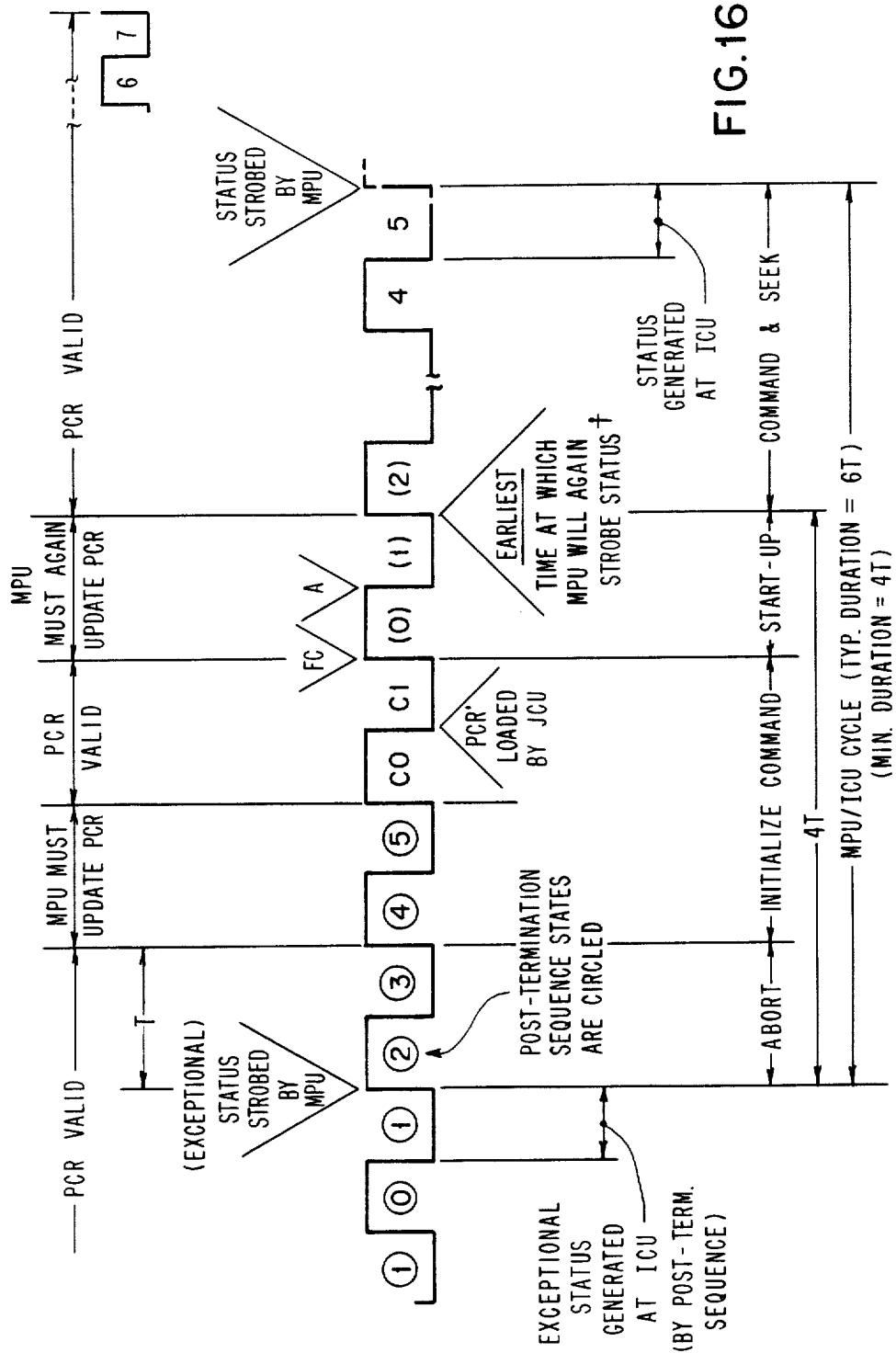

Execution of the command, e.g., a bus cycle, begins as early as one-half clock period after PCR' 108' is loaded. Upon completion of service to the current command, and in the absence of a bus exception, the ICU 100 will begin seeking the next command immediately after the rising edge at which it presents proceed status for the current command. As shown in FIG. 16 for the case of exceptional status (e.g., bus error), the ICU will not begin seeking the next command until 2T after the rising edge at which it presents the exceptional status signal. Loading of PCR' 108' nevertheless occurs only on negative transitions of the clock. In other words, command sensing is delayed by 2T beyond the normal case. This allows the MPU time to replace or cancel the current content of the PCR. The MPU should, therefore, be designed to post commands to the ICU on rising edges of the input clock so that they will be stable for loading into the PCR' at negative transitions of the clock. The PCR 108 and the 31-bit address out (shown coming from address out register AOR 110) together provide all the information needed by the ICU 100 to conduct its operations.

The processor interface also contains two, 32-bit data paths, D1 (shown directed to an MPU data-in register DIR 111) and DO (data out) 112, as shown in FIG. 13. The high-order byte of each path always corresponds to the lower storage address associated with any set of bytes contained thereon. The most significant bit is the high-order bit of the high-order byte. Each 16-bit half of either data path DO of DI to be used may be specified by the MPU with a 1-bit alignment code. All halfword transfers take place through either of these high-order or low-order halves of DO or DI. All byte transfers take place through the low-order byte position of the designated halfword data path.

For a specific MPU used with the preferred embodiment of the ICU according to the invention, all word transfers are accomplished a halfword at a time by two microinstructions. Each of these two microinstructions references a halfword. The first of these microinstructions, moreover, may reference a halfword at any byte address A in storage. This microinstruction is identified in the PCR 108 by the MPU as a fetch or store halfword high (HWH) and implies that a second halfword operation will follow. This second microinstruction will always reference the halfword at a byte address (A+2) in storage. The referenced halfword operands may use either the high or low-order half of either DI 111 or DO 112, as specified by the alignment code for each register. Each of these two commands to the ICU 100 elicits its own status response, as is the case for all commands. The specific MPU used with the preferred embodiment of the invention never checks alignment. The ICU 100 must, therefore, check the low-order address bits before it can perform output cycles on words (herein denoting four contiguous bytes). Moreover, in the case of instruction fetches, if A0=1 the ICU will not execute the command and will, instead, generate odd-instruction address exceptional status in response to the MPU command.

In addition to the MPU/ICU interface facilities already mentioned, an interrupt request register (IRR) 113 and an external reset register (XRR) 114 are provided in the ICU 100 as indicated in FIG. 13. The IRR 113 buffers the interrupt control signals derived from the ten interrupt pins of the ICU. Note that the state indicators are represented by a direct connections between the MPU and external pins of the ICU. These, as well as the other pins represented at the bottom of FIG. 13, are defined in the table of FIG. 12. These state indicators are not germane to the ICU 100 as disclosed herein but are instead a feature of the specific MPU used with the preferred embodiment of the invention. More specifically, the MPU conforms to IBM System/370 processor architecture. Thus, the preferred embodiment of the invention provides an interface between an IBM System/370 processor and Motorola MC68000-compatible devices. But it must be emphasized once again that this is but one example, and other combinations can be envisioned based on the teachings of the invention.

In view of the foregoing and in the interest of simplicity, the specific MPU used with the preferred embodiment of the ICU according to the invention will be referred to simply as the System/370 MPU.

Implementation, Execution Logic

Figure 21:
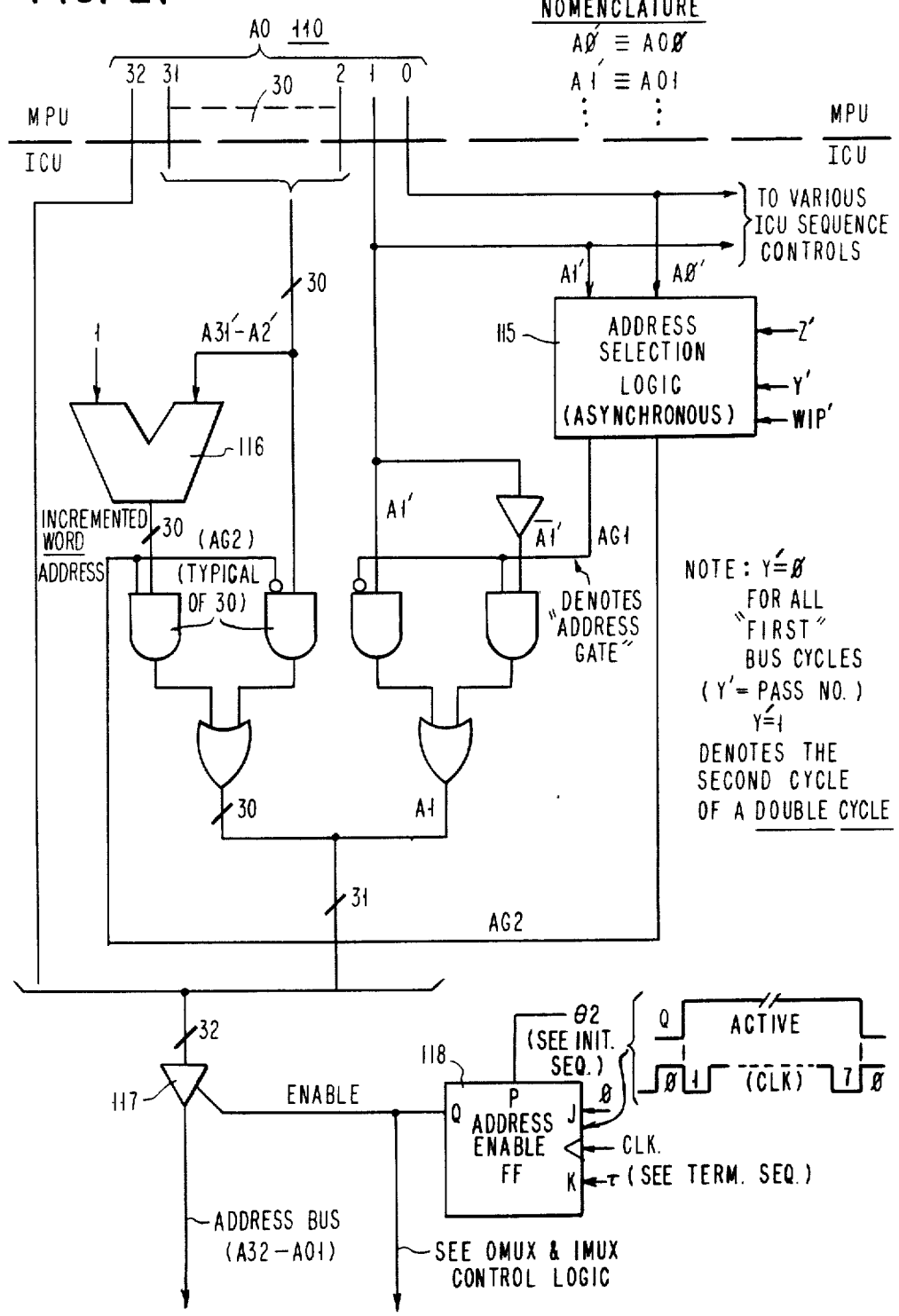
FIG. 21 is a detailed logic diagram of the addressing facilities.

FIG. 21 shows in detail the addressing facilities of the ICU 100. This includes asynchronous address selection logic 115 which receives address bits AO1 and AO0 from the address output AO 110 of the MPU. The address selection logic 115 also receives signals Z', Y' and WIP' from the control logic described hereinafter and generates the output gating signals AG1 and AG2 in accordance with the following truth table, where the X denotes a "don't care" condition:

| Z' | Y' | WIP' | AO1 | AO0 | AG2 | AG1 |
|---|---|---|---|---|---|---|
| A. All cycles other than B & C ||||||||
| X | 0 | 0 | X | X | 0 | 0 |
| B. 2nd cycle of double cycle ||||||||
| X | 1 | 0 | 0 | 0 | 0 | 0 |
| X | 1 | 0 | 0 | 1 | 0 | 1 |
| X | 1 | 0 | 1 | 0 | 0 | 0 |
| X | 1 | 0 | 1 | 1 | 1 | 1 |
| C. Store full word ||||||||
| 0 | 0 | 1 | X | X | 0 | 1 |
| 0 | 1 | 1 | X | X | 0 | 1 |
| 1 | 0 | 1 | X | X | 0 | 0 |
| 1 | 1 | 1 | X | X | 0 | 0 |

The AG1 output of logic 115 is used to select either AO1 or $\overline{AO1}$ as the low-order address bit A1 on the address bus. The AG2 output of logic 115 is used to select either the AO31-AO2 bits from AO 110 or the AO31-AO2 address incremented by one. The incremented address is generated by the ALU 116 which adds one to the AO31-AO2 bits of AO 110. The address bits selected by AG1 and AG2 and address bit AO32 from AO 110 feed the tri-state address bus represented by the tri-state drive 117. The tri-state address bus is enabled by the address enable flip-flop 118.

Figure 23A:
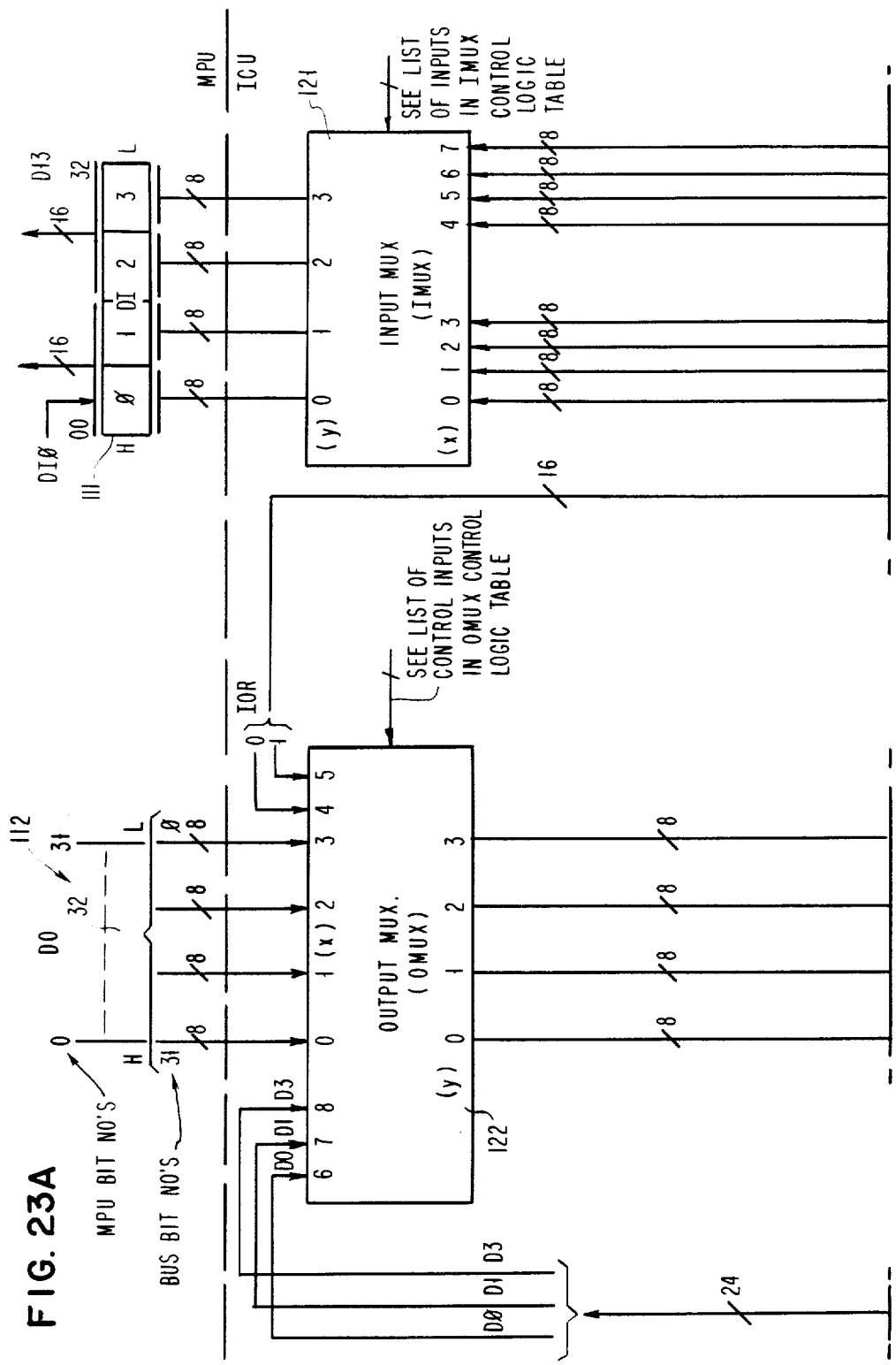
FIGS. 23A and 23B are a detailed block and logic diagram of the ICU data flow facilities.
Figure 23B:
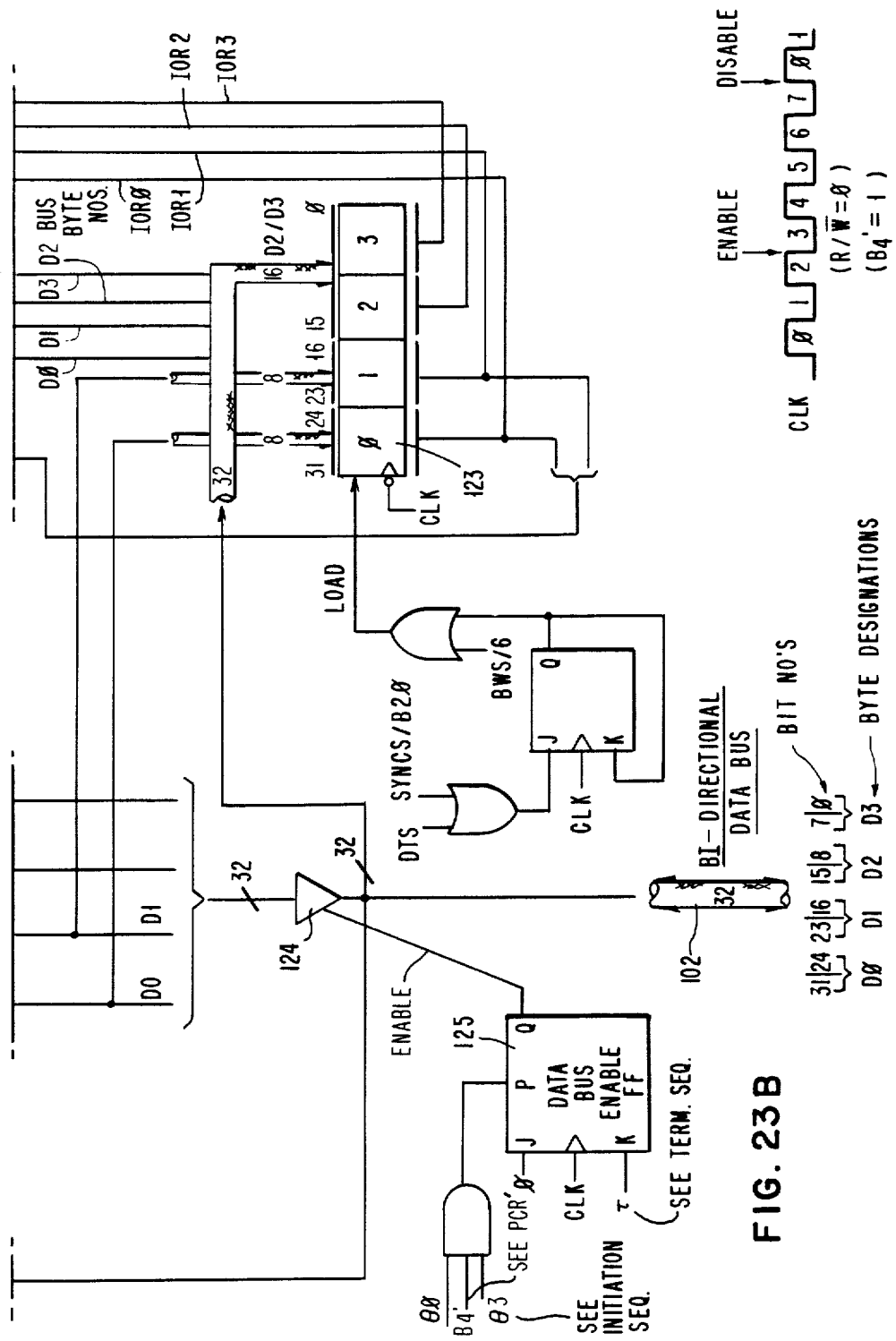

The data flow logic is shown in FIG. 23 and comprises an input multiplexer (IMUX) 121, an output multiplexer (OMUX) 122, and an input/output register (IOR) 123, interconnected as shown. The OMUX 122 is also used during the first bus cycle of double-cycle inputs to steer the high-order byte from the data bus to IOR0 where the byte is buffered for use in the final cycle of the double cycle. The use of a pre-established common buffer (IOR0) in this way simplifies the process of assembling the halfword during the second cycle. Note, however, that the device response for the second cycle need not be the same as that for the first cycle; i.e., the halfword may span two, physically distinct and different storages.

As implemented in the preferred embodiment of the invention, the OMUX 122 connects D0, D1, or D3 to IRO0 for all input cycles. Actual loading of the IOR 123, however, is determined by the detection sequence. Certain fetch cycles, for example, will end up with the low-order byte of a word in both IOR3 and IR00. The same situation will occur during input service cycles. IOR0 is not used in either of these latter two circumstances.

Figure 24C:
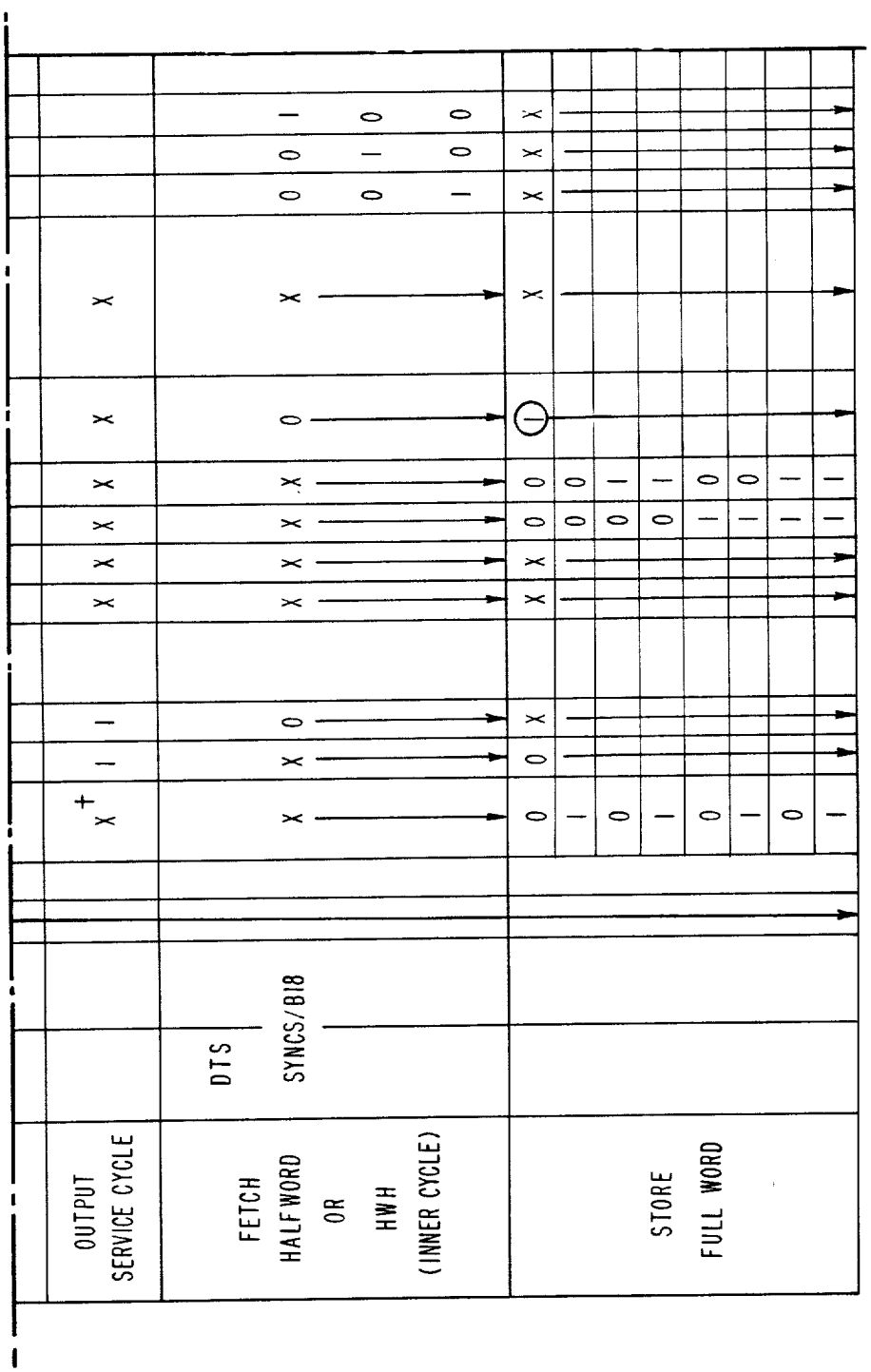

The OMUX 122 asynchronous control logic is defined by the table shown in FIG. 24. For the case of buffer outbound halfword high action (Q=0 in the table shown in FIG. 24), the only significant control is the alignment code A". Loading of the PCR" 108" (FIG. 13) is enabled by the command sequence at D23 (during execution of STORE HWH) and at H26 (during the first macrocycle of an output service cycle, described in more detail hereinafter. This means that the PCR" 108" is loaded at the end of the first and second executions of the command sequence; i.e., corresponding to the end of the "wind-up" and "start-up" phases, respectively, of the MPU/ICU cycle (see FIG. 15). The IOR 123, on the other hand, is not loaded until the second negative edge of the "command and seek" phase of the MPU/ICU bus cycle (indicated in FIG. 53); i.e., 3½ T after the start of the command sequence. The OMUX 122 must, therefore, "settle" within a period of 1½ T after the second loading of PCR" 108" in order to satisfy the timing requirements for this case.

For all output bus cycles, the OMUX 122 setting depends, as shown in FIG. 24, upon the output values of WIP', Y', Z', and A0', as well as on PCR" 108" content. The values of WIP', Y', Z', and A0' begin to appear during S1 of the bus cycle and must be stable by the beginning of S3 in order to satisfy the address bus specification. The OMUX 122, in turn, must stabilize by the end of S4 in order to satisfy the output data specifications; i.e., about one clock (T) after the input controls (WIP', Y', Z', and A0') settle.

In the case of input cycles, the setting of OMUX depends upon the decoded device response (WTACK', etc.), which is not available until into S5 of the detection sequence. The OMUX 122 must then settle in time for the data to be strobed at the end of S6 of the termination sequence. Settling time for the OMUX 122 is therefore T/2, the most stringent of all cases.

Figure 25C:
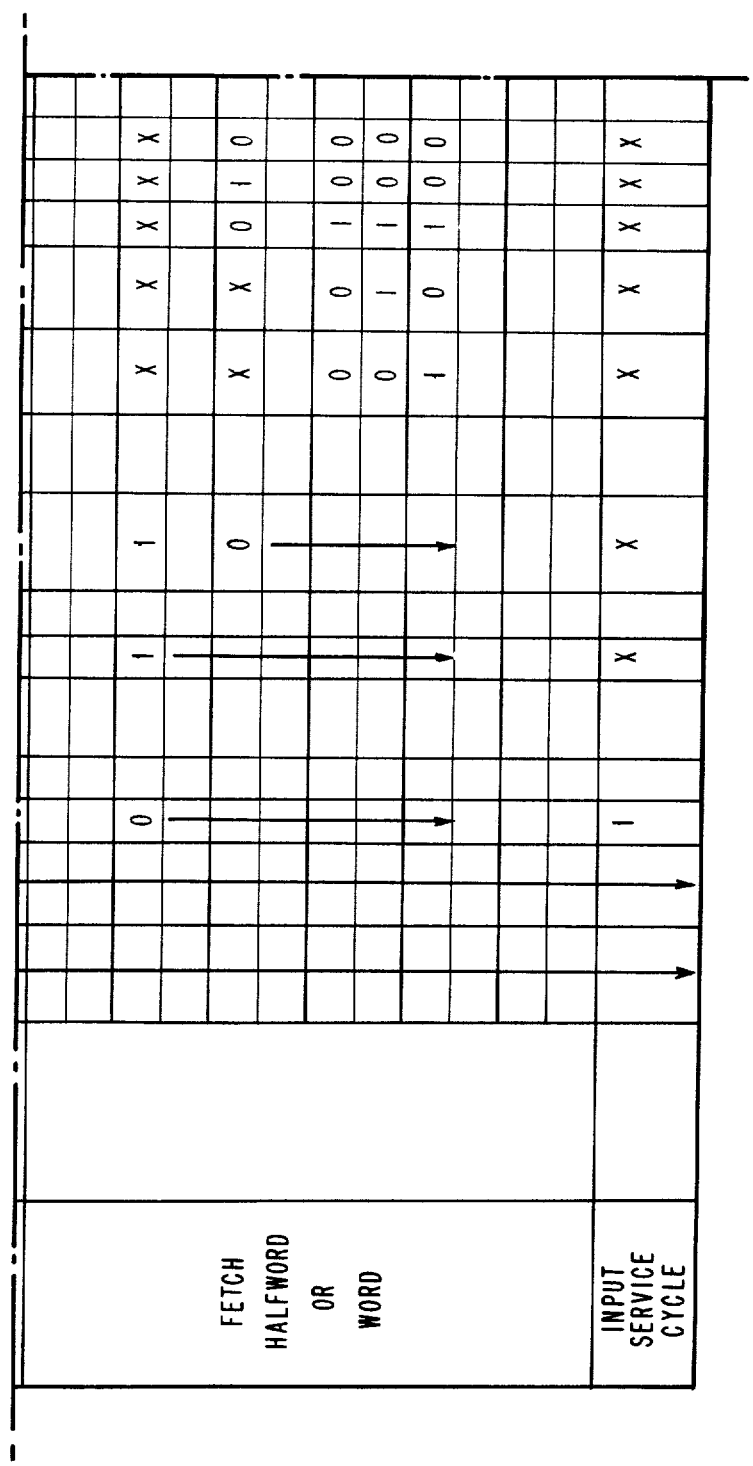

An IMUX control logic table, similar to the OMUX control logic table of FIG. 24 is shown in FIG. 25. The IMUX 121, along with the OMUX 122, must set up during the detection and termination sequences and satisfy set-up time at the negative edge between S6 and S7. Four of the byte inputs to IMUX 121 are directly connected to the 32-bit bidirectional data bus. The other four byte inputs to the IMUX are taken from the IOR 123, as shown in FIG. 23.

Figure 19:
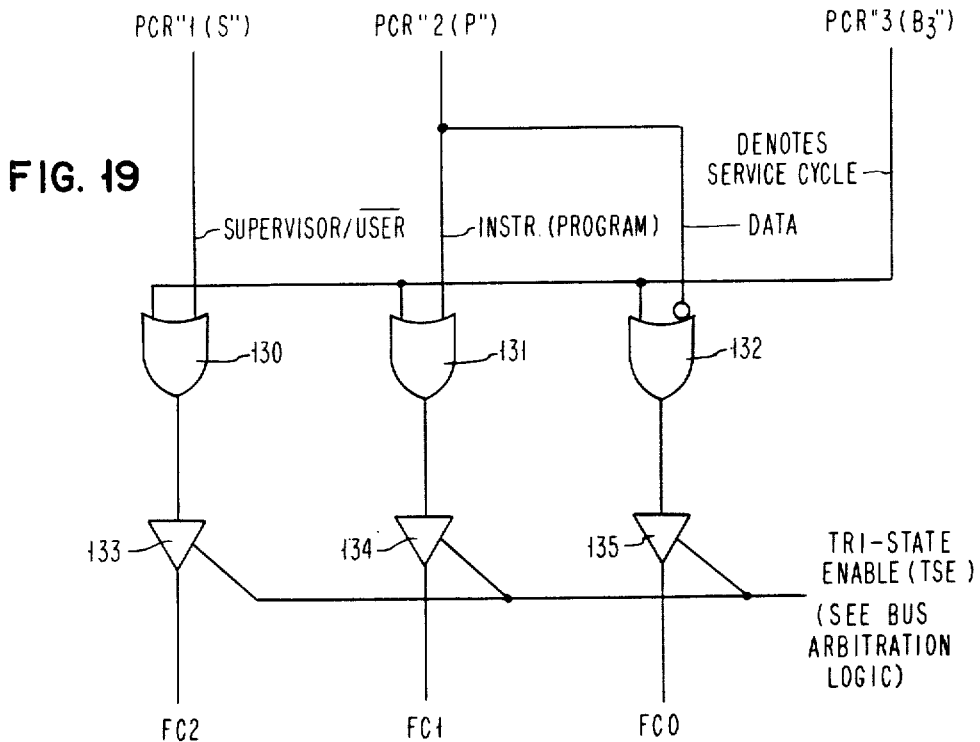
FIG. 19 is a detailed logic diagram of the ICU function code logic.

The function control logic is shown in FIG. 19 which produces signals FC0, FC1 and FC2 which are valid only during a bus cycle. The inputs are from PCR" 108". This logic consists of two-input OR gates 130, 131 and 132. PCR"3(B"$_3$), the service cycle indicator bit, is supplied to one input of each of these OR gates. PCR"1(S") is supplied to the other input of OR gate 130, and PCR"2(P") is supplied to the other input of OR gate 131. PCR"2(P") is also supplied to the second input of OR gate 132, but this input is an inverting input. The outputs of the OR gates 130, 131 and 132 are connected to output pins of the ICU via tri-state drivers 133, 134 and 135.

Figure 26:
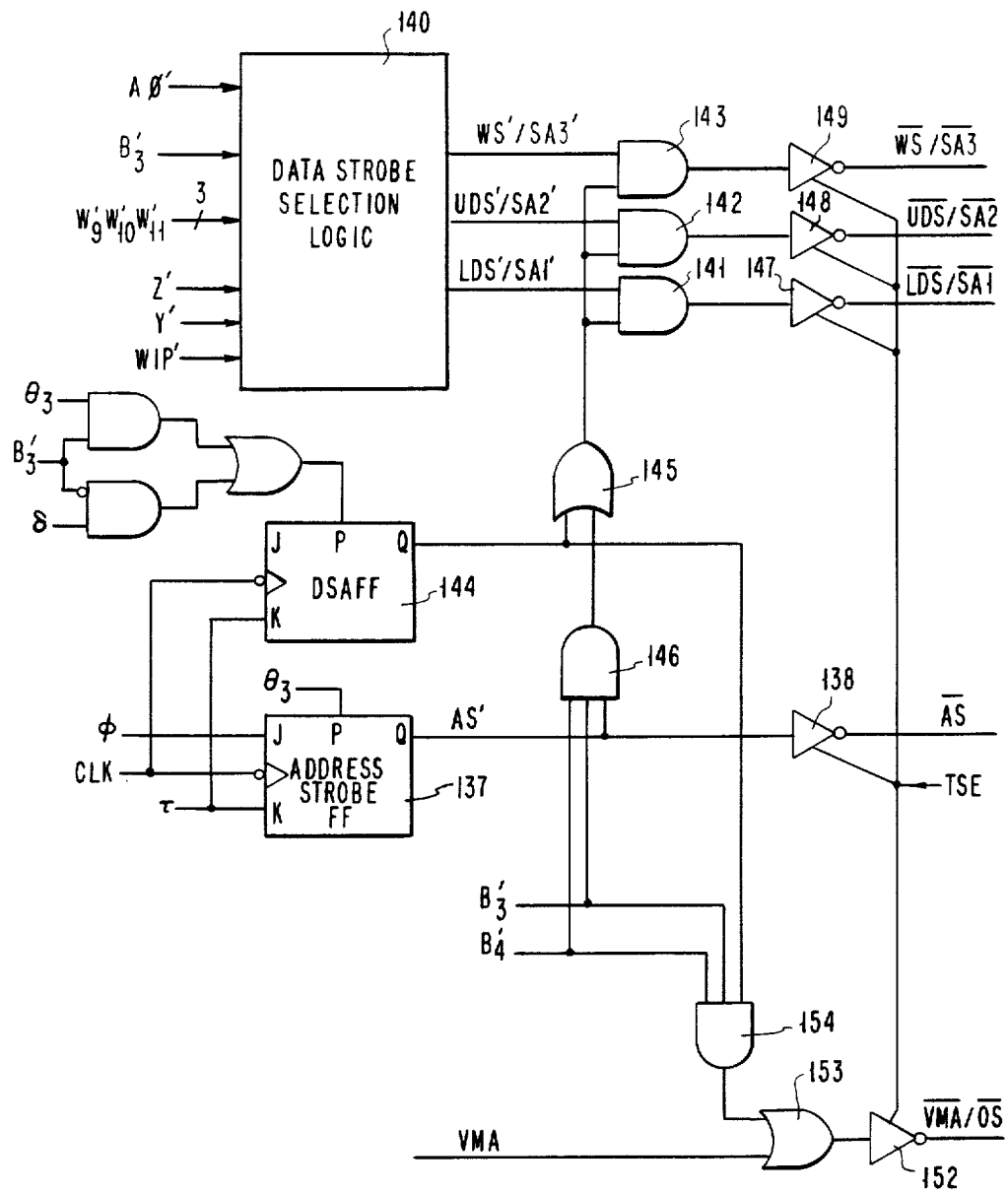
FIG. 26 is a detailed logic diagram of the control facilities for the address and data strobes of the ICU.

The bus cycle controls (see FIGS. 12 and 13) include various output strobes. The address strobe flip-flop 137 is shown in FIG. 26. The output of the address strobe flip-flop 137 is connected to an output pin of the ICU via an inverting tri-state driver 138. The data strobe logic is shown in FIG. 26. The data selection logic 140 is defined by the truth table shown in FIG. 27. The selection logic 140 receives as inputs the WIP', Y' and Z' signals and A0'. Selection logic 140 also receives outputs B'$_3$ and W'≡W'$_9$W'$_{10}$W'$_{11}$ from PCR' 108'. The outputs generated by the selection logic 140 are LDS', UDS' and WS' which are supplied to respective AND gates 141, 142 and 143. These two-input AND gates are enabled by a data strobe activation flip-flop 144 via OR gate 145. The AND gates 141, 142 and 143 are also enabled by the output of AND gate 146 via OR gate 145. The inputs to AND gate 146 are B'$_3$ and B'$_4$ from the PCR' 108', and this AND gate is enabled by the output of the address strobe flip-flop 137. The outputs of the AND gates 141, 142 and 143 are connected to output pins of the ICU via respective inverting tri-state drivers 147, 148 and 149. Also shown in FIG. 26 is the valid memory address (VMA) logic 151 which generates the $\overline{VMA}$ signal of the MC6800 peripheral controls. The output of this logic is connected to an output pin of the ICU via an inverting tristate driver 152 through an OR gate 153. The other input of OR gate 153 is supplied from AND gate 154 which, in turn, receives as inputs B'$_3$ and B'$_4$ from the PCR' 108'. AND gate 154 is enabled by the data strobe activation flip-flop 144. As will be noted, B'$_3$=B'$_4$=1 only for output service cycles.

With the logic of FIG. 26, level-zero service cycles (SENSE/CONTROL) are completely defined (1) by the content of the address bus and (2) the encoded state of the signals appearing on the three data strobe service-address pins 147, 148 and 149. The service address identifies the particular SENSE/CONTROL cycle. Service address timing is similar to that of the address strobe ($\overline{AS}$) for all service cycles for which the service address is defined, by virture of AND gate 146. For level-zero input service cycles (SENSE), the address strobe ($\overline{AS}$) is used both as an address strobe and a data strobe, i.e., it serves the external device in the dual capacity of an address/data strobe. For level-zero output service cycles (CONTROL), the output service strobe ($\overline{OSS}$), driven by the tri-state driver 152, is activated as a data strobe. Its timing corresponds to that of the data strobes during ordinary store cycles, by virtue of AND gate 154. $\overline{VPA}$ is a normal response to all input service cycles irrespective of level, thereby maintaining the Motorola-compatible auto-vectoring request. For output service cycles, on the other hand, $\overline{VPA}$ is disallowed and, if used, will generate an interface check. It will be noted that the timing of the service address for SENSE cycles is therefore different from that of CONTROL cycles. For CONTROL cycles, the service address appears one logic delay later than for SENSE cycles. This is all right since SENSE/CONTROL cycles are not associated with the MC68000; the timing of the service address signals need not meet any Motorola specification.

Figure 20:
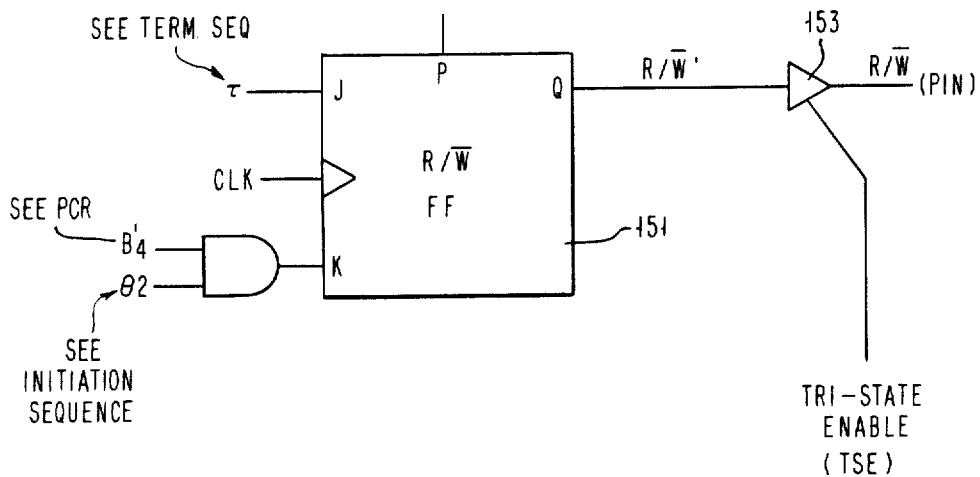
FIG. 20 is a detailed logic diagram of the ICU read/write control logic.

The last of the five bus cycle control-out signals is the read/write ($R/\overline{W}$) signal. The read/write flip-flop 151 is shown in FIG. 20. The output of flip-flop 151 is connected to an output pin of the ICU via the tri-state driver 153.

Figure 17:
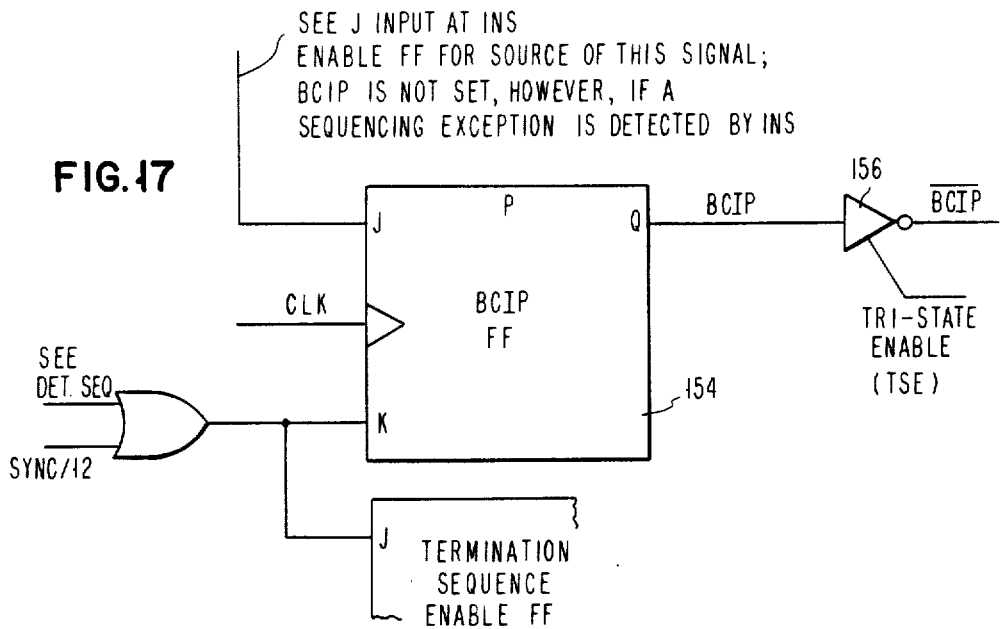
FIG. 17 is a detailed logic diagram of the ICU bus-cycle-in-progress control logic.
Figure 18:
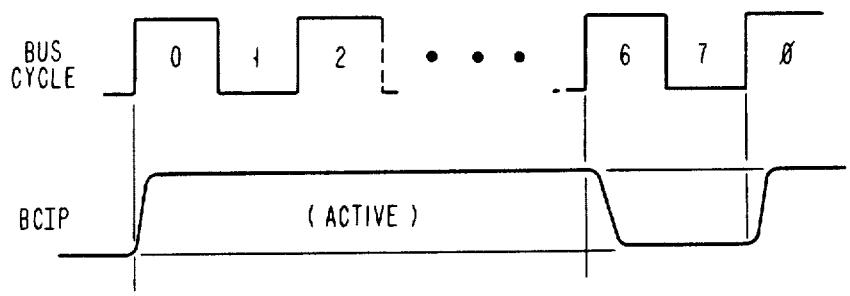
FIG. 18 is a timing diagram of the operation of the bus-cycle-in-progress signal.

The bus-cycle-in-progress (BCIP) signal is one of the timing signals listed in the table shown in FIG. 12. The bus-cycle-in-progress flip-flop 154 is shown in FIG. 17. The output of the flip-flop 154 is connected to an output pin of the ICU via an inverting tri-state driver 156. FIG. 18 is a timing diagram showing the operation of flip-flop 154.

External devices respond to the control-out signals of a bus cycle with one or more asynchronous control-in signals. There are nine control-in signals:

| $\overline{BTACK}$ | $\overline{BERR}$ | $\overline{DTEXN/0}$ |
|---|---|---|
| $\overline{DTACK}$ | $\overline{VPA}$ | $\overline{DTEXN/1}$ |
| $\overline{WTACK}$ | $\overline{HALT}$ | $\overline{DTEXN/2}$ |

Each control-in signal feeds the D-input of a respective negative-edge triggered D-type flip-flop 161 to 169, as shown at the bottom of FIG. 58. In this way, these signals are sampled on every negative edge of the clock. The outputs of the synchronizing flip-flops, in turn, feed the detection logic 170. This asynchronous control logic is discussed under the heading of ICU control, which follows.

Implementation, Control Logic

Figure 28B:
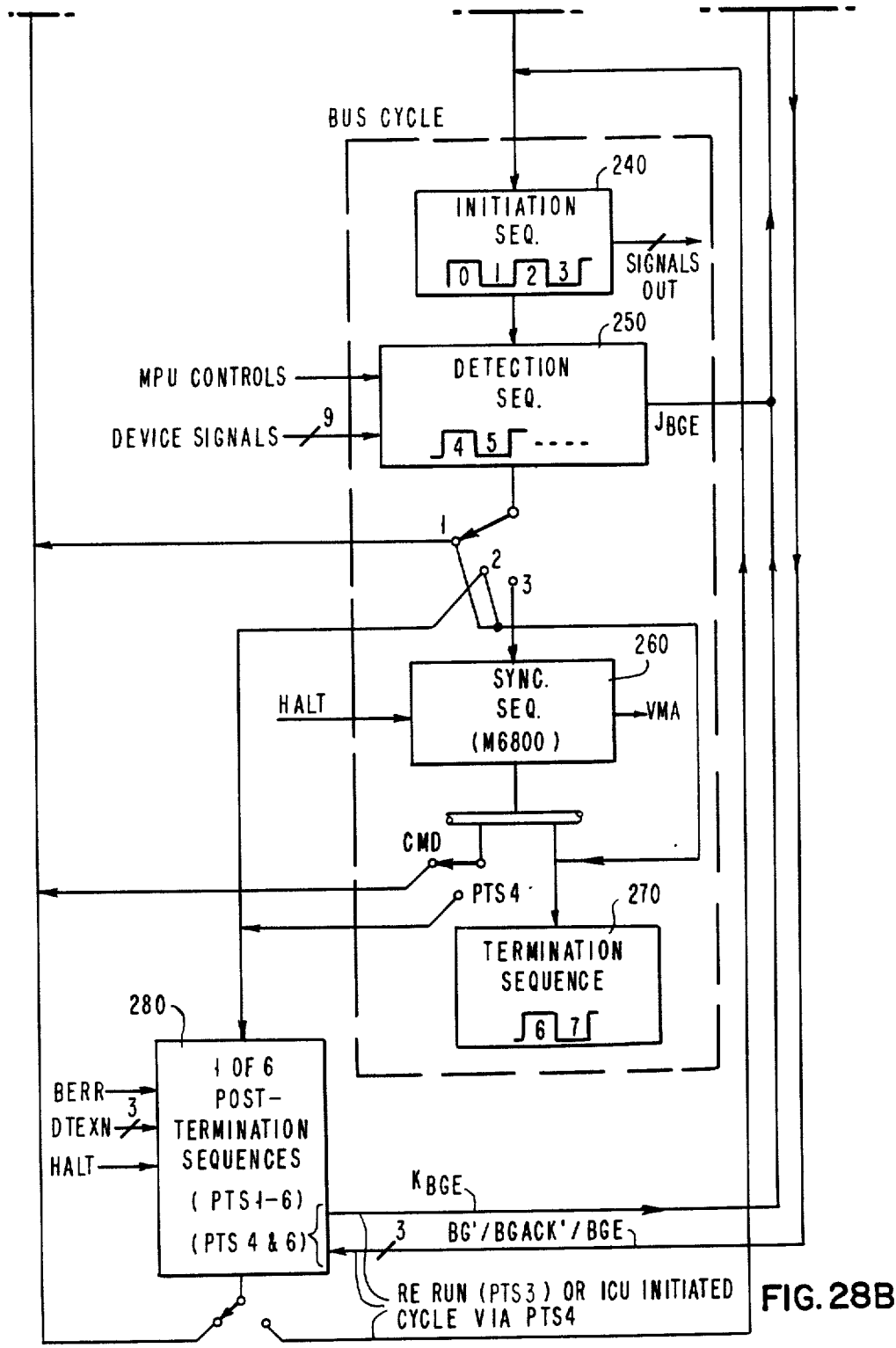

A comprehensive overview of the control logic of the ICU is provided by the block diagram of FIG. 28. This diagram resolves the complex control function of the ICU into four, distinct, concurrently operating "sequences", as follows:
 (1) MPU Service Sequences
  (a) Command
  (b) Execution
   Reset-Out
   Buffer Read
   Buffer Write
   Bus Cycle
   Halt-Out
  (c) Post-Termination
 (2) Bus Arbitration Sequence
 (3) Interrupt Sequence
 (4) External Reset Sequence The term "sequence" refers to the sequence of logical steps performed by the associated logic, i.e., to what the logic does, as distinguished from how it is implemented. These steps will be described hereinafter.

The bus arbitration, interrupt, and external reset sequences are completely independent of one another and of the MPU service sequences. Each of these three independent sequences are enables at all times and operate continuously to detect and respond to their particular input signals. The MPU service sequences, on the other hand, comprise an endless chain of sequences, each enabling at least one other sequence of the set before ending its own operation. No more than two of the MPU service sequences are ever in operation concurrently, i.e., overlapped, and in most instances the sequences are performed one at a time. Some of the MPU service sequences, however, are mutually exclusive, namely the command sequence and each of the post-termination sequences as indicated in FIG. 28 by the available switch positions. The specific concatenation of enablement/disablement of each of these sequences will be made clear in what follows.

The MPU service sequences, moreover, are interlocked in three places (command sequence, PTS4 and PTS6) with three signals (BGE, BR' and BGACK) from the bus arbitration logic. This interlock, indicated in FIG. 28, acts to prevent the associated sequence from initiating a bus cycle while the bus is temporarily unavailable because of bus arbitration.

Because of the overall complexity of the ICU control function, the resolution of function as depicted in FIG. 28 is essential to its understanding and to its successful implementation. This resolution of function is believed to be unique and is, therefore, one of the elements of this invention. The implementation of the preferred embodiment is based directly on FIG. 28, i.e., each sequence is implemented separately. In practice, such an implementation scheme need not be followed. The MPU service sequences, for example, can be implemented by the logic of a single "state machine". But the description of FIG. 28 nevertheless remains as the underlying basis, or specification, of what the state machine, or any other form of implementation, must do.

In what follows, the implementation of each of the control sequences according to the invention is described in detail. In general, the description will comprise three elements: (1) a timing diagram, specifying what the sequence is to do; (2) a logic diagram and/or truth table(s) describing a logical implementation of that sequence; and (3) a flow chart, describing the operation of that implementation. Item (3) will be seen to satisfy the requirements set forth by item (1).

Before proceeding, however, it is helpful to describe first some of the implementation elements used for inter- and intra-sequence communication.

Inter- and Intra-Sequence Communication Logic

Figure 41A:
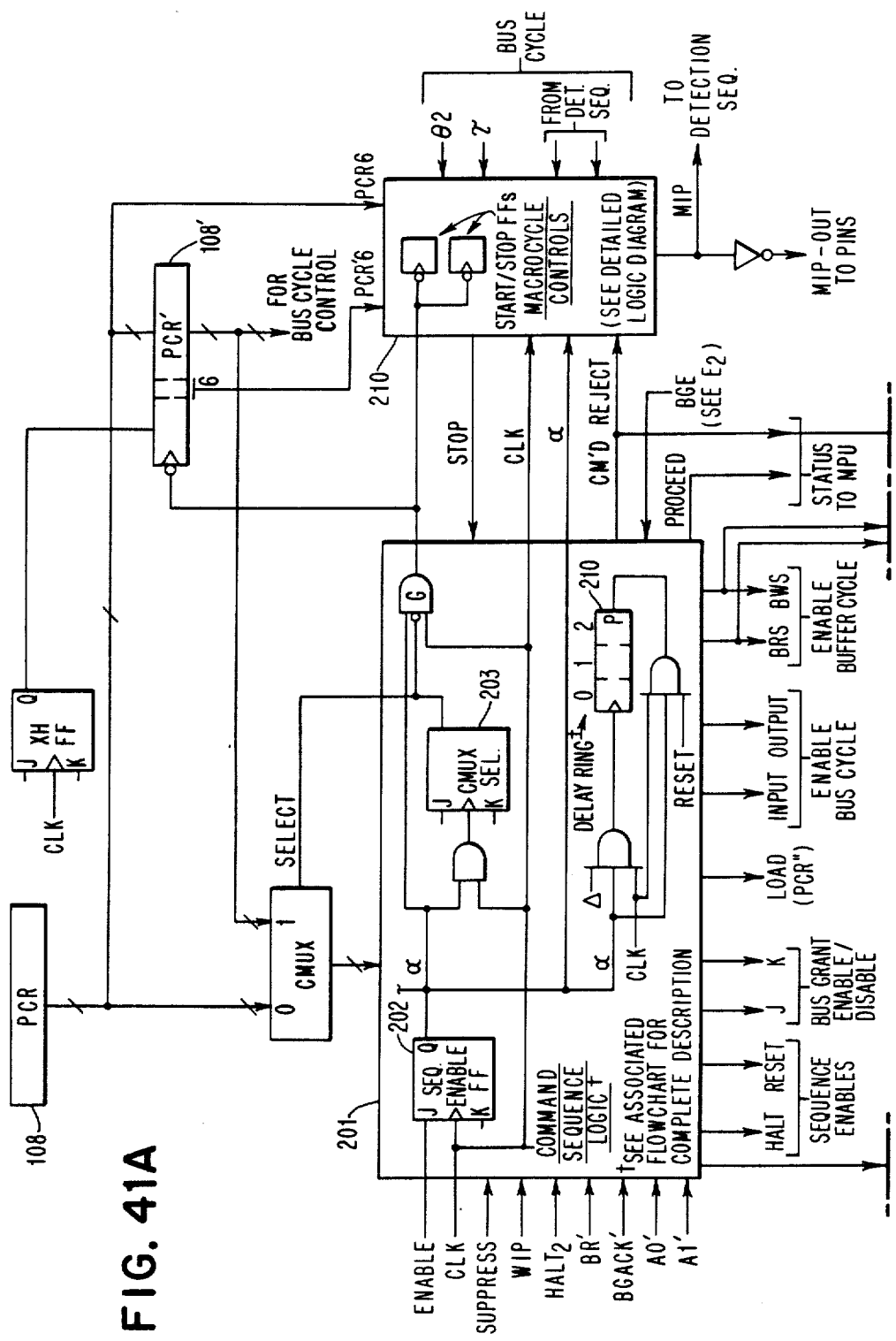

This logic comprises control flip-flops that are set/reset by a sequence, or by more than one sequence, and whose states are interrogated later, either by the setting/resetting sequence or by another sequence. Among these flip-flops are the WIP, Y and Z flip-flops and their buffers, the WIP', Y' and Z' flip-flops. These flip-flops are described in the present topic and are illustrated in FIG. 41. Another such flip-flop is the Bus Grant Enable (BGE) flip-flop. The description of this strategic flip-flop, whose function is more specialized, is deferred to the topic of bus arbitration.

The word-in-progress (WIP) flip-flop 204 (see FIG. 29) is used in conjunction with store or fetch halfword commands to indicate that a full word (32 bits) is to be transferred. For input, the WIP flip-flop 204 is set by the bus cycle detection sequence whenever the ICU is executing a fetch halfword high (HWH) command, the address is word-aligned, and the device has responded with $\overline{\text{WTACK}}$. The ICU will then transmit the high-order half of the word to the MPU and concurrently buffer the low-order half in its input/output register (IOR) 123 (shown in FIG. 23) in anticipation of the next halfword fetch command from the MPU. This next command, detected in the presence of WIP=1, causes the ICU to fetch the low-order half-word form the IOR 123 instead of from the external device, thereby avoiding an additional bus cycle. The WIP flip-flop is then reset. The WIP flip-flop 204 is also set by the ICU in response to a store halfword high (HWH) command for which the target address is found to be word-aligned. Under these circumstances, the ICU buffers the high-order halfword in its IOR 123. The subsequent store halfword bus cycle, noting that WIP=1, is then modified to deliver the full, 32-bit word using all data strobes including, in particular, $\overline{\text{WS}}$. The WIP flip-flop 204 is then reset at the end of the detection sequence of this bus cycle, provided that the device responds with $\overline{\text{WTACK}}$. If additional cycles are required because of $\overline{\text{BTACK}}$, $\overline{\text{DTACK}}$, or $\overline{\text{VMA}}$ responses, the WIP flip-flop 204 is not reset until all bytes of the word have been transferred. Stated differently, the WIP flip-flop 204 is normally reset during the bus cycle that completes the storing of the full word.

Figure 30:
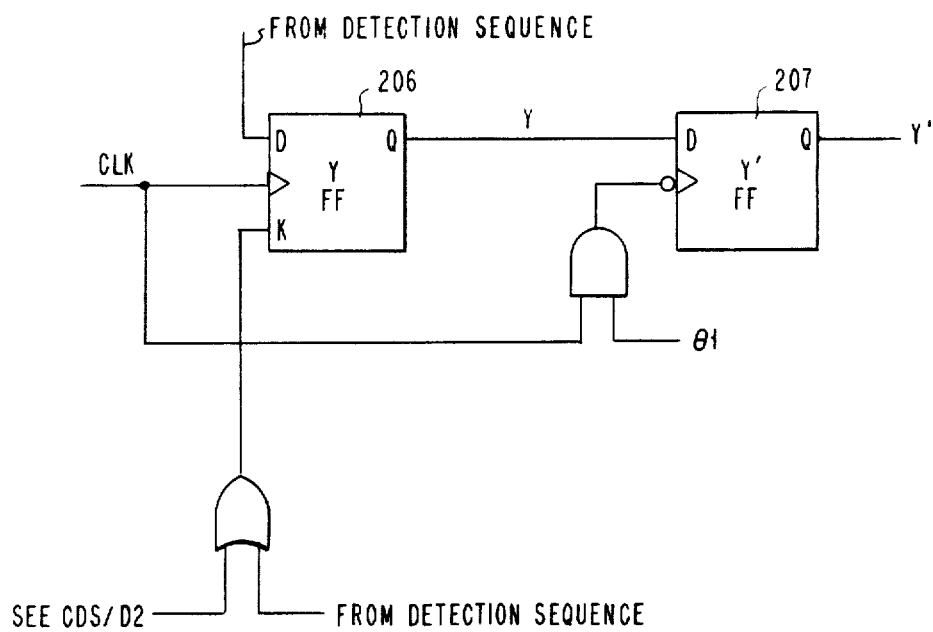

The Y flip-flop 206 (see FIG. 30) is used by the bus cycle controls to identify (1) the second bus cycle (Y=1) of a double cycle and (2) the bus cycles of the word-write operation. The Y flip-flop 206 is always valid for these purposes at the first negative edge of the initiation sequence of each bus cycle, at which time it is buffered by the bus cycle detection sequence (1) upon recognizing the need for a double cycle, or (2) in response to $\overline{\text{BTACK}}$ or $\overline{\text{VPA}}$ during the Z'Y'=00- and Z'Y'=10-cycles of the word-write operation. During the next bus cycle, the Y flip-flop 206 sets the Y' flip-flop 207, and the latter remains in the set state for the duration of that bus cycle. The Y flip-flop 206 is reset at the start of each bus cycle enabled by the command sequence CDS, or by the detection sequence of the Z'Y'=01-cycle of the word-write operation, the latter in response to a normal response from the external device.

Figure 31:
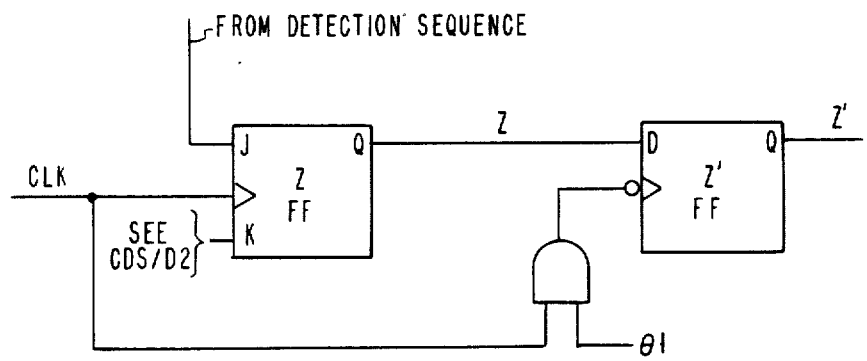

The Z flip-flop 208 (see FIG. 31) is used by the bus cycle controls in conjunction with the Y flip-flop 206 to identify the cycles of a word-write operation. The Z flip-flop 208 is always valid for this purpose at the first negative edge of the initiation sequence of every bus cycle, at which time it is buffered in the Z' flip-flop 209. The output of the Z' flip-flop 209 is of significance only when the WIP flip-flop 204 is in the set state. The Z flip-flop 208 is set only by the bus cycle detection sequence during a word-write operation in response to $\overline{\text{DTACK}}$ during the Z'Y'=00- cycle or in response to $\overline{\text{BTACK}}$ or $\overline{\text{VPA}}$ during the Z'Y'=01-cycle. The Z flip-flop 208 is always reset at the start of every bus cycle enabled by the command sequence.

The WIP' flip-flop 205 (FIG. 29) and Y' flip-flop 207 (FIG. 30) capture the states of the WIP flip-flop 204 and the Y flip-flop 206, respectively, at the first negative edge of the bus cycle and retain these states for the entire duration of the bus cycle, independent of possible changes in the WIP' and Y' flip-flops 204 and 206 that may occur during the bus cycle. Inasmuch as the address bus 101 is also enabled at the first negative edge of the bus cycle, propogation time for the WIP' and Y' flip-flops 205 and 207 must be sufficiently short to allow the address to become valid within the corresponding time specified for the MC68000.

Bus Arbitration

The bus arbitration architecture of the ICU is essentially identical with that of the MC68000, but includes specific variations that will affect compatibility with some master-type devices designed for MC68000, namely those which do not conform to the variations contained herein. The essential elements of the bus arbitration architecture are set forth in what follows.

Bus arbitration is available at the completion of every bus cycle, excluding only the following bus cycles:

(1) Bus cycles with Hold (bus cycles performed in response to CCC=111) that end normally, with or without HALT. These comprise all bus cycles of a macrocycle.

(2) "Qualifying" cycles, that is, bus cycles, not of a double-cycle or of a macrocycle, that qualify for the exclusion of bus arbitration at the end of that cycle, irrespective of the state of Bus Request. Such cycles are associated with storing or fetching the high-order half of full, 32-bit words under specified circumstances.

(3) The first bus cycle ("inner cycle") of a double-cycle, if HALT is inactive.

(4) Specific cycles of the word-write operation, as follows:
  (a) The WIP/00 cycle, if not a $\overline{\text{WTACK}}$ response and no halt request; and
  (b) The WIP/10 cycle, if a $\overline{\text{WTACK}}$ or $\overline{\text{DTACK}}$ response and no halt request.

The processor is effectively halted by a normal halt ($\overline{\text{ACK}}$ signal and $\overline{\text{HALT}}$) or by any exceptional termination arising from the $\overline{\text{BERR}}$ and $\overline{\text{DTEXN}}$ signals (pseudo halt). Bus arbitration is always available while the processor is halted by the active state of any of these signals.

Figure 32:
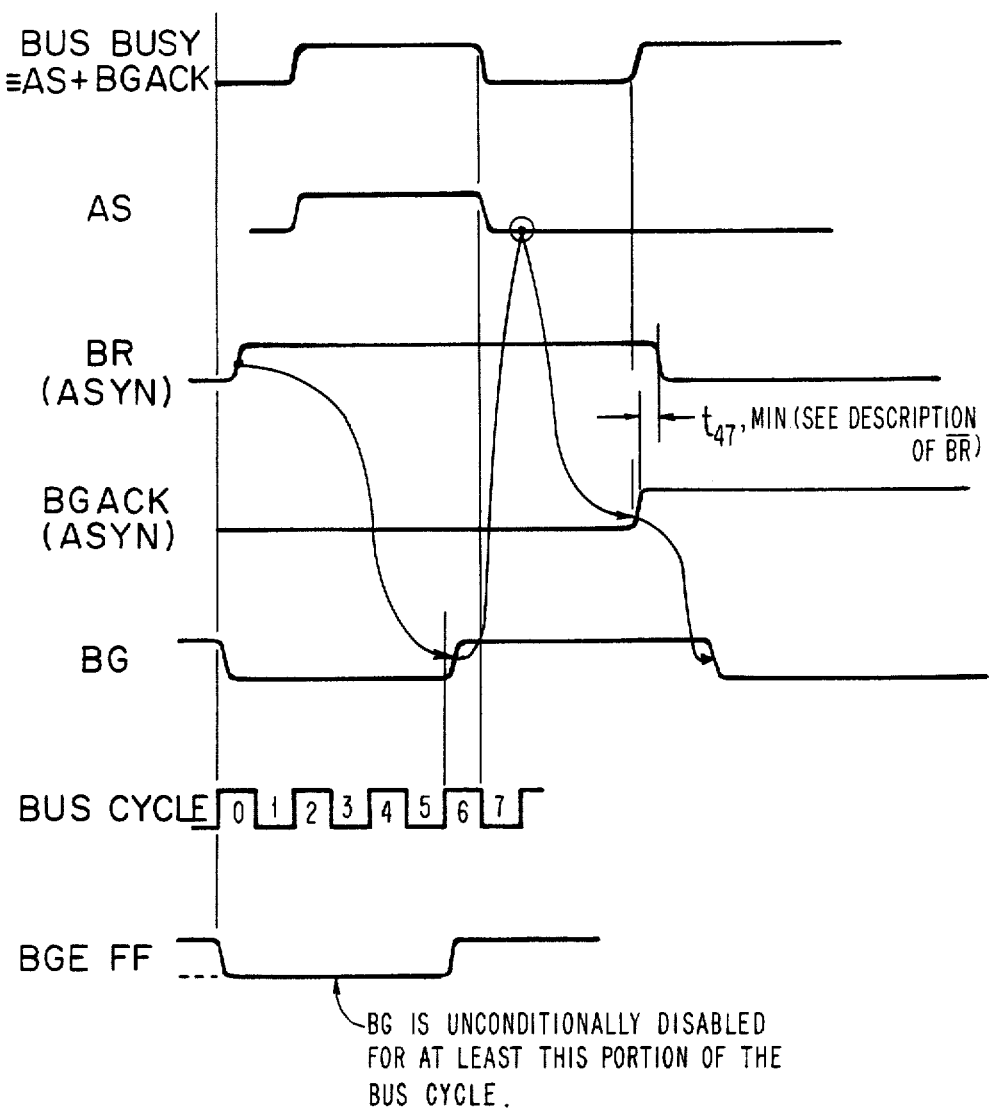
FIG. 32 is a timing diagram describing the basic features of the bus arbitration architecture of the ICU according to the invention.

Bus-master devices control two, asynchronous signals: BR and BGACK, where the notation BR, BGACK, etc. here denote logic levels, for simplicity. The ICU drives AS and BG. The basic rules governing these signals are embodied in the timing diagram of FIG. 32 and comprise the following:

(1) BR can be activated at any time, and it is ordinarily negated by the originator just after it activates BGACK.

(2) BG is the response to BR, and if it is activated during a bus cycle, this will only occur just after the start of S6.

(3) BGACK is a response to BG·$\overline{\text{AS}}$; BGACK must never be activated unless BG is active and AS is concurrently inactive.

(4) The bus "busy" condition is effectively BGACK-+AS.

(5) BG is negated in response to the activation of BGACK (or to a prior negation of BR).

If the bus arbitration logic of a MC68000 device is not consistent with the above, it cannot be used with this implementation of the ICU. In particular, devices which use HALT-In alone to "capture" the bus are excluded from use, as this would violate condition 3 above.

Figure 33:
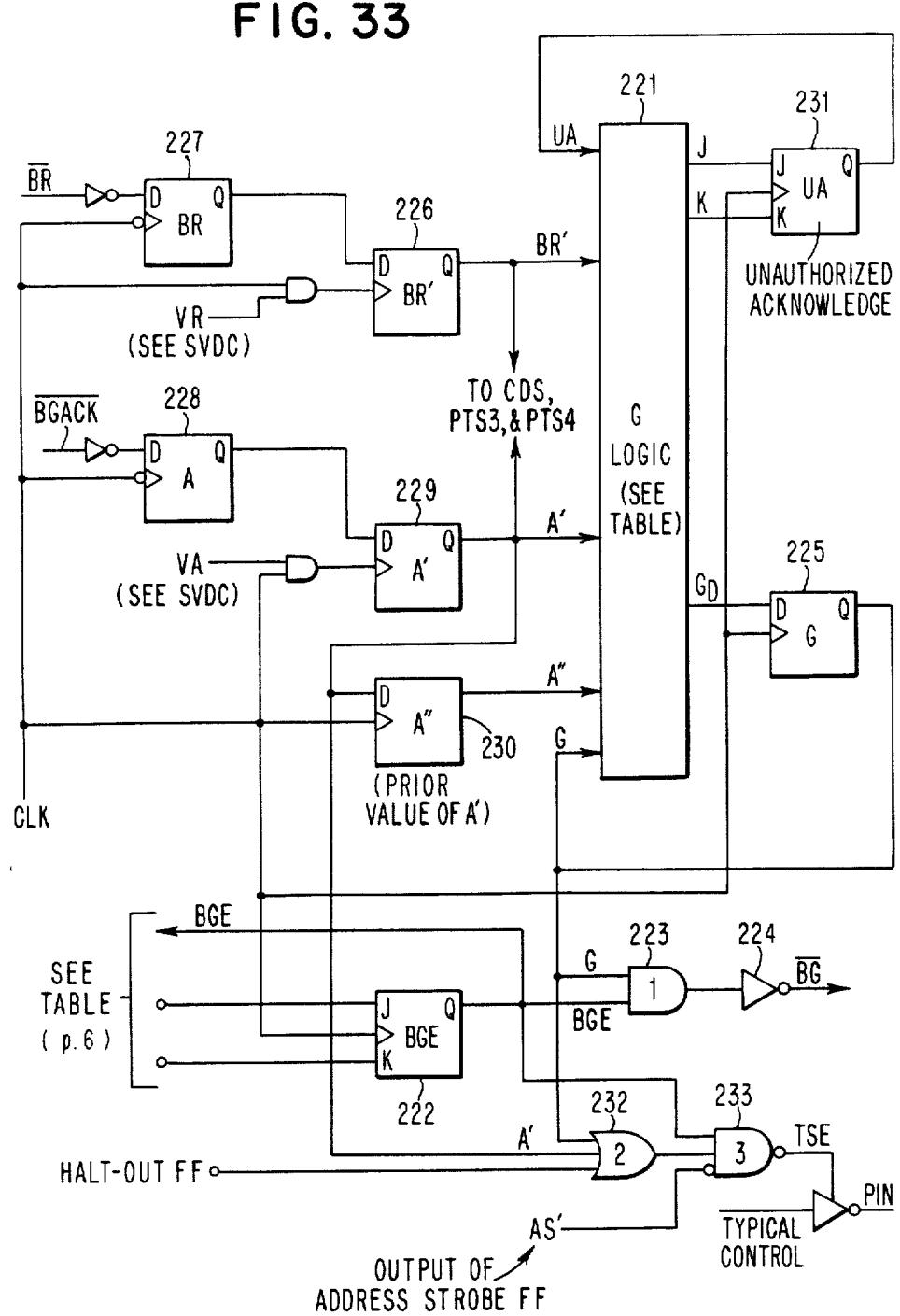
FIG. 33 is a detailed logic diagram of the bus arbitration logic.
Figure 35:
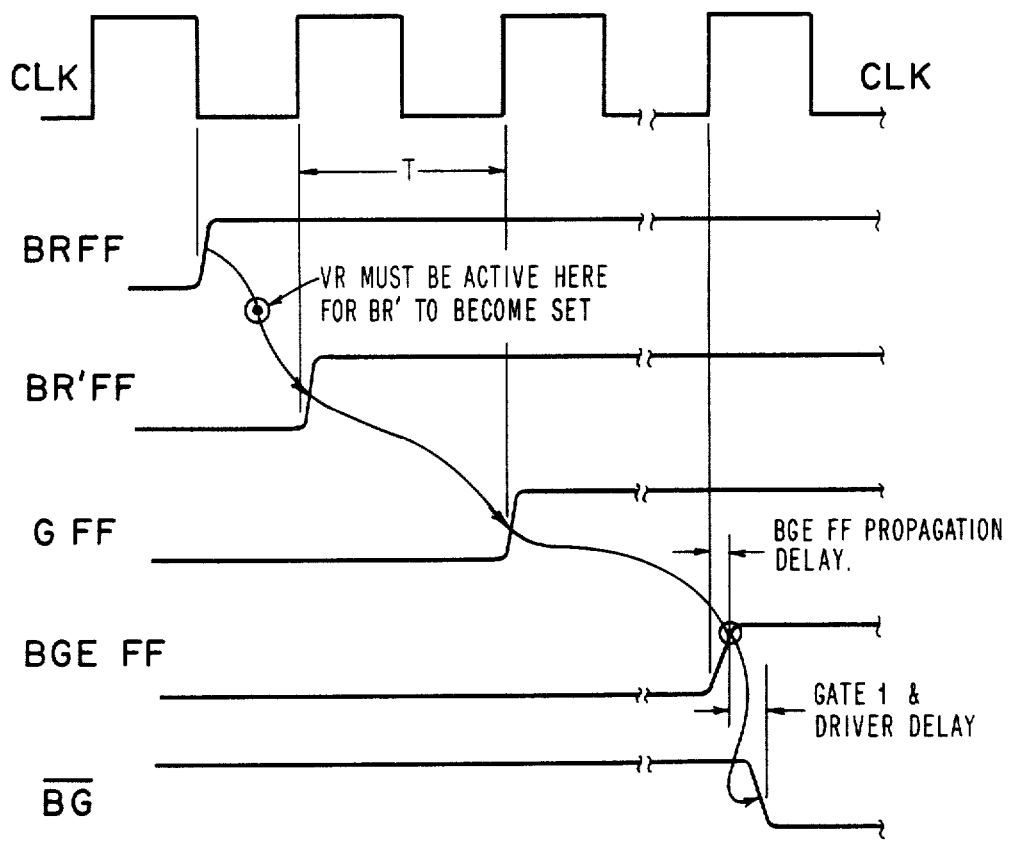
FIGS. 35 and 36 are timing diagrams illustrating the operation of the bus arbitration logic.
Figure 36:
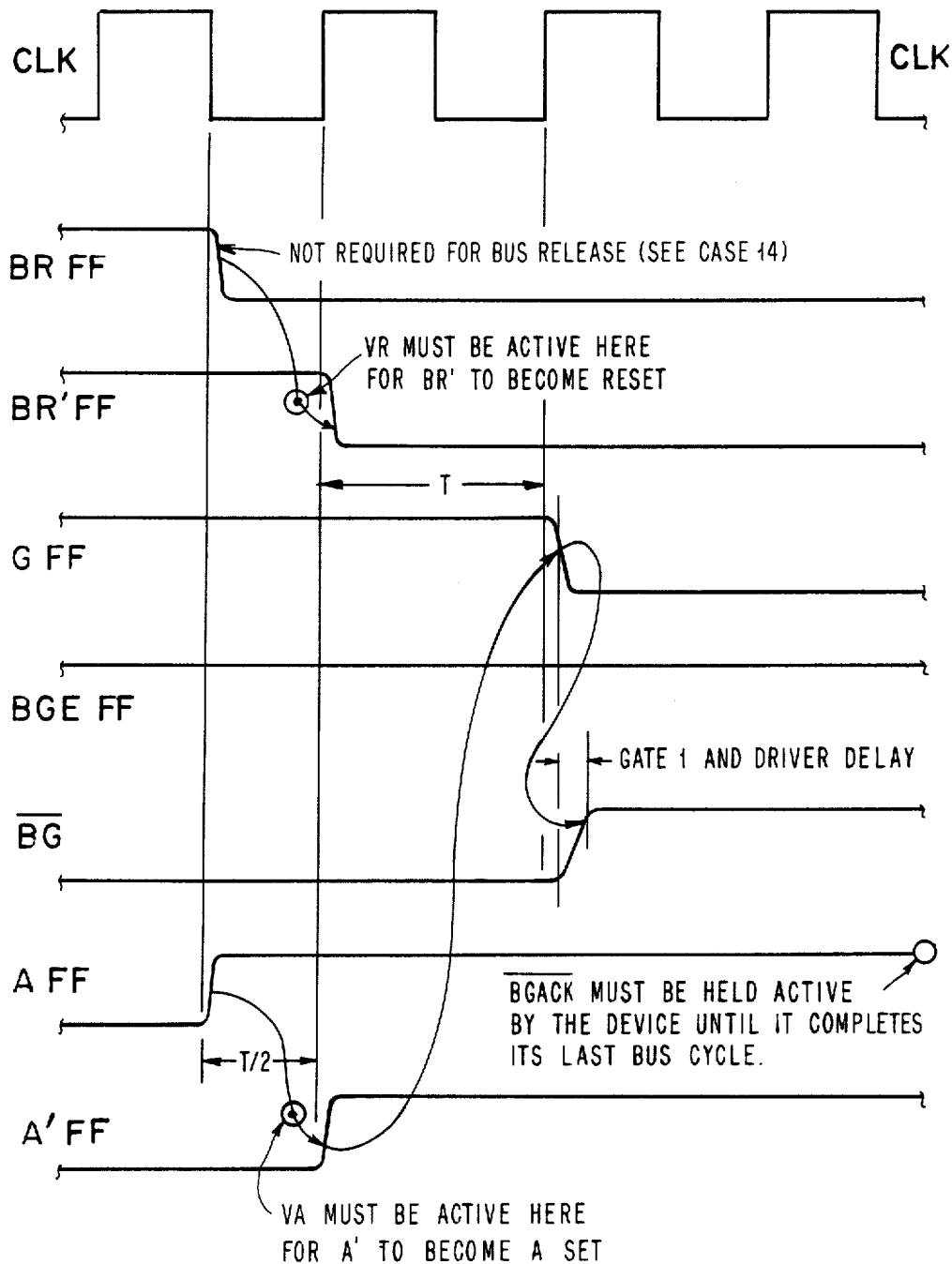

The logical implementation of this bus arbitration architecture is described completely in FIG. 33 and the truth table shown in FIG. 34. The related timing diagrams are shown in FIGS. 35 and 36. The logic of FIG. 33 comprises five basic components:

(1) Device-controlled logic, namely the BR flip-flops 226 and 227 and the BGACK (A) flip-flops 228, 229 and 230.

(2) State-controlled logic, namely the G logic 221, the G flip-flop 225, and the VA flip-flop 231.

(3) The BGE flip-flop, controlled by other sequences of the ICU.

(4) The bus grant logic, consisting of the AND gate 223.

(5) Tri-state enable (TSE) logic, i.e., OR gate 232 and AND gate 233.

The BR logic comprises the negative edge-triggered BR flip-flop 227 and the positive edge-triggered BR' flip-flop 226. The BR' flip-flop is, in effect a conditional slave to the BR flip-flop 227. The BR' flip-flop 226 will copy the state of the BR flip-flop 227 whenever that state is valid, as defined by the SVD signal VR, which gates the clock to the BR' flip-flop 226. If the state of the BR flip-flop is invalid because of untimely transition of $\overline{\text{BR}}$, VR will be zero. An additional clock period will then elapse before the content of BR can be copied into the BR' flip-flop 226, provided that VR has become active. This scheme is, therefore, a two-stage detection scheme.

The BGACK (A) logic is free-running logic that is essentially identical with the BR logic with the sole difference that a third flip-flop (A") 230 is slaved to the A' flip-flop 229 with a phase relationship of one full clock period (T). A" thus represents the prior state of A' and may be used along with A' to identify transitions in the $\overline{\text{BGACK}}$ signal.

The Unauthorized Acknowledge (UA) flip-flop 231 is set and reset solely by the G logic 221 and flags activation of the A' flip-flop 229 in the absence of a G signal. This is the "unauthorized acknowledge" condition. The UA flip-flop 231 is reset whenever the condition is removed (UA=1, A'=0). This logic reflects the requirement that $\overline{\text{BGACK}}$ never be activated by a device in the absence of $\overline{\text{BG}}$.

The G logic 221 is driven by five flip-flops, as shown in FIG. 33, and determines the states of the UA and G flip-flops 231 and 225, respectively. These two flip-flops and the G logic 221 thus comprise a "state machine" whose current state is determined by the indicated external events, its own prior state (through feedback of the UA and G signals), and the "history" of the A' flip-flop 229 (provided by A"flip-flop 230). State changes occur only at positive transitions of the clock, and the G logic must, therefore, have a propagation time of <T in order to satisfy set-up time for the next positive transition.

The BGE flip-flop 222 is set and reset as indicated in the table of FIG. 37. Unconditional reset occurs at the start of every bus cycle, i.e., at the positive transition of the clock which begins S0 of the bus cycle. The conditions for starting a bus cycle are assessed by the command sequence or a post-termination sequence during the clock period just preceding the tentative start of the bus cycle. If BGE is active and the output of the BR' flip-flop 226 is also found to be active, meaning that G and $\overline{\text{BG}}$ are either active or about to become active, a bus cycle is not started. Thus, a $\overline{\text{BG}}$ signal. is never aborted by the ICU.

The BGE flip-flop 222 is set at the positive edge of the clock that ends the detection sequence of every bus cycle, excluding the following specific cycles:

(1) All cycles of a macrocycle that end normally, either with or without HALT.

(2) Qualifying cycles as defined above.

(3) Inner cycles, not of a macrocycle, for which HALT-in is not detected.

(4) Specific cycles of the word-write operation. The BGE flip-flop 222 is also set during the command sequence (whenever a bus cycle is either delayed or the processor halted), during the ICU reset sequence, and whenever an interface check prevents initiation of a bus cycle (sequencing exception).

The BGE signal thus synchronizes the enablement of $\overline{BG}$ with the bus cycle, allowing $\overline{BG}$ to begin to appear (1) no earlier than at 5⌐6 of a bus cycle, (2) at the end of each macrocycle, or (3) whenever the ICU is delayed in initiating a bus cycle on behalf of the MPU. Once activated, it is never reset unless BR' and A' are both inactive at the prior positive transition of the clock, i.e., degating of $\overline{BG}$ is never performed by the BGE flip-flop 222. Instead, deactivation of $\overline{BG}$ is determined solely by the G signal, in response to $\overline{BR}$ and/or $\overline{BGACK}$. Thus, whenever the ICU sets the BGE flip-flop 222, it is effectively releasing the bus for arbitration. Whenever it next wants the bus for MPU service, it resets the BGE flip-flop 222 as soon as the bus becomes available, indicated by concurrent reset states of BR' and A'. In other words, once the device is given the bus, the device may hold the bus for as long as it wants. The ICU cannot "take it away". But, whenever the ICU has the bus, it too may retain the bus as long as it desires.

The bus grant logic comprises only AND gate 223. Whenever BGE is active, $\overline{BG}$ is activated whenever the device wants the bus (G active). $\overline{BG}$ is always deactivated by deactivation of G, i.e., when the device releases the bus.

The TSE signal enables all tri-state controls of the bus. This explicitly excludes the bi-directional data bus and the address bus which are tri-stated by other controls. The TSE signal is generated as shown in FIG. 33, using OR gate 232 and AND gate 233. The ICU controls are removed from the bus (TSE inactive) whenever the following conditions are met:

(1) BGE active (bus has been released by the MPU);

(2) G or A' active (bus being requested by a device), or HALT-out active; and (3) AS inactive (bus cycle ending or absent, on behalf of the MPU).

Thus, during the "last" bus cycle on behalf of the MPU, TSE begins to fall during state 7 of the bus cycle. The device can, in principle, begin its cycle immediately if it activates $\overline{BGACK}$ at the same time.

Finally, with regard to the implementation of the bus arbitration architecture of the ICU, and by way of summary, it is important to note that the logic embraced by the BGE flip-flop 222 and the AND gate 223, the BR' flip-flop 226, and the A' flip-flop 229, is the means by which the bus cycle control logic and the bus arbitration G logic, each with different responsibilities, dynamically share the singe, external bus of the ICU. The bus cycle control logic expresses its needs for the bus by resetting and setting the BGE flip-flop at times consistent with the states of the BR' and A' flip-flops. Similarly, the G logic 221 expresses its needs for the bus through the G flip-flop 225. These two, independent and mutually exclusive actions are then combined by the AND gate 223 to produce the BG signal. The important point is that as a result of the logical structure depicted in FIG. 33, the designer of the bus cycle control logic need not know the specific action of the G logic 221 in order to carry out that design. And, the converse is true: any set of arbitration rules can be implemented by the G logic 221 in complete harmony with any form of bus cycle protocol. For the preferred embodiment herein, the G logic defined by the table of FIG. 38 conforms closely, but not exactly, to the bus arbitration protocol of the MC68000. That behavior did not, however, impact the specification and implementation of the bus cycle control architecture. Thus, the logical structure depicted in FIG. 34 provides the designer of a microprocessor with the important benefit of even further separation of function. This, in turn, leads to flexibility in the choice of architectural elements and to simplicity of implementation.

Command Sequence

The purpose of the command sequence (CDS) 200 (see FIG. 28) is to detect, buffer, and initiate execution of commands form the MPU. These functions are unique to this control sequence. The command sequence 200 also performs the normal halt-release function. A logic diagram of the command sequence 200 and its inbound and outbound control signals is shown in FIG. 41. The actual control logic is not detailed here and is described separately in what follows.

The command sequence 201 is specified as comprising two states, C0 and C1, and a single phase ($a$) corresponding to the output of the command sequence enable flip-flop. C0 corresponds to clock high, and C1 to clock low. See FIG. 38. Once enabled, the sequence runs continuously until a detected command can be executed. A busy bus, for example, can delay command execution. the timing is critical: a STOP command becomes valid after a negative clock edge, and the outcome must be resolved by the logic in less than one-half clock period (T/2) in order to satisfy set-up time for the next positive clock edge. Apart from START/STOP commands, commands otherwise become valid after positive edges of the clock. The command sequence may itself generate a status response. This occurs only in the case of command reject or during execution of the buffer write sequence. In either case, status is valid only across the single positive clock edge at which it is intended to appear, i.e., the status signal satisfies both set-up and hold time for that one edge. If the command sequence ends with the presentation of exceptional status, as is the case with command reject, the deactivation of status occurs as a result of disablement of the command sequence. For this case, the command sequence is then resumed after a 2T delay. If, however, the command sequence is repeated while PROCEED status is active, the command sequence logic, operating on the new command will generate a new status response in time for the next positive edge. This new status response will be zero in the case of a NOOP or when no status is forthcoming from the command sequence itself.

The command sequence is enabled or enablable by the following sequences:

(1) Interface check, upon attempt to initiate a bus cycle;

(2) External Reset;

(3) Reset-Out;

(4) Bus Cycle Detection Sequence (conditional, but normal);

(5) Buffer Read Sequence (BRS); (Buffer Write Sequence runs concurrently with Command Sequence);

(6) Post-termination (all sequences other than PTS4 and, if rerun occurs, PTS3); and (7) MC68000 sequence, if not HALT.

Figure 39:
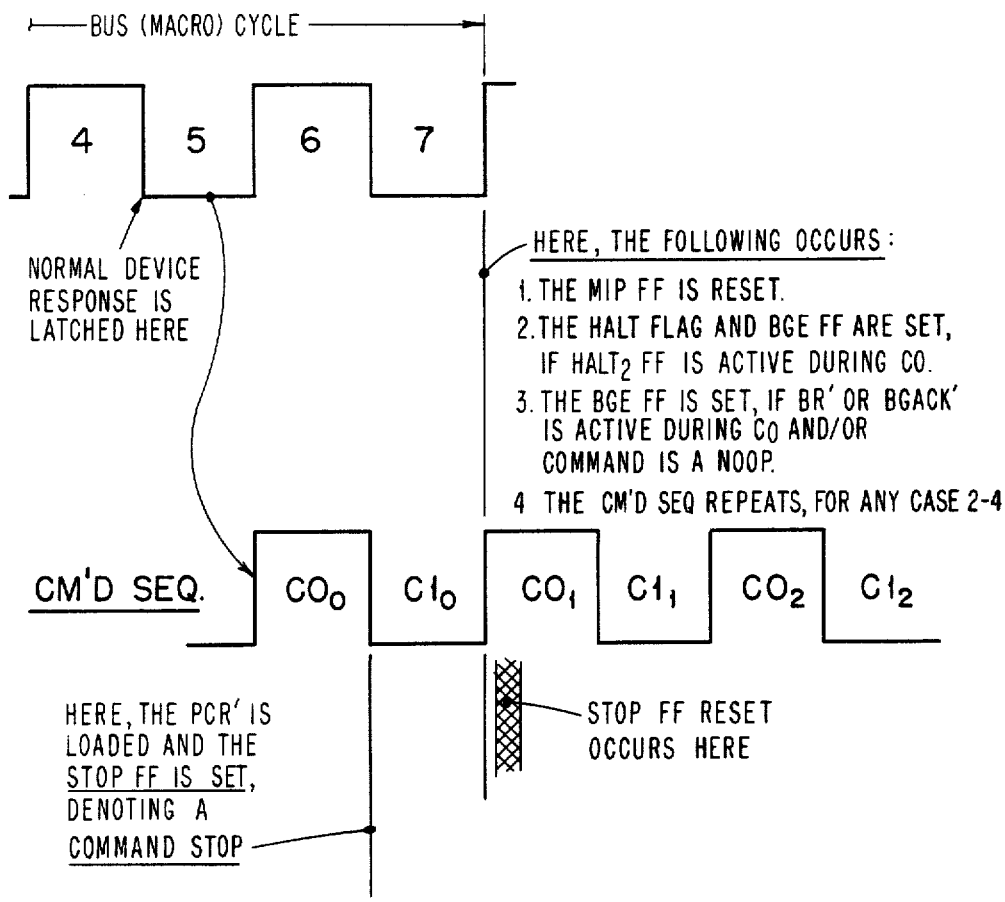
FIG. 39 is the specification timing diagram for the command stop.
Figure 42:
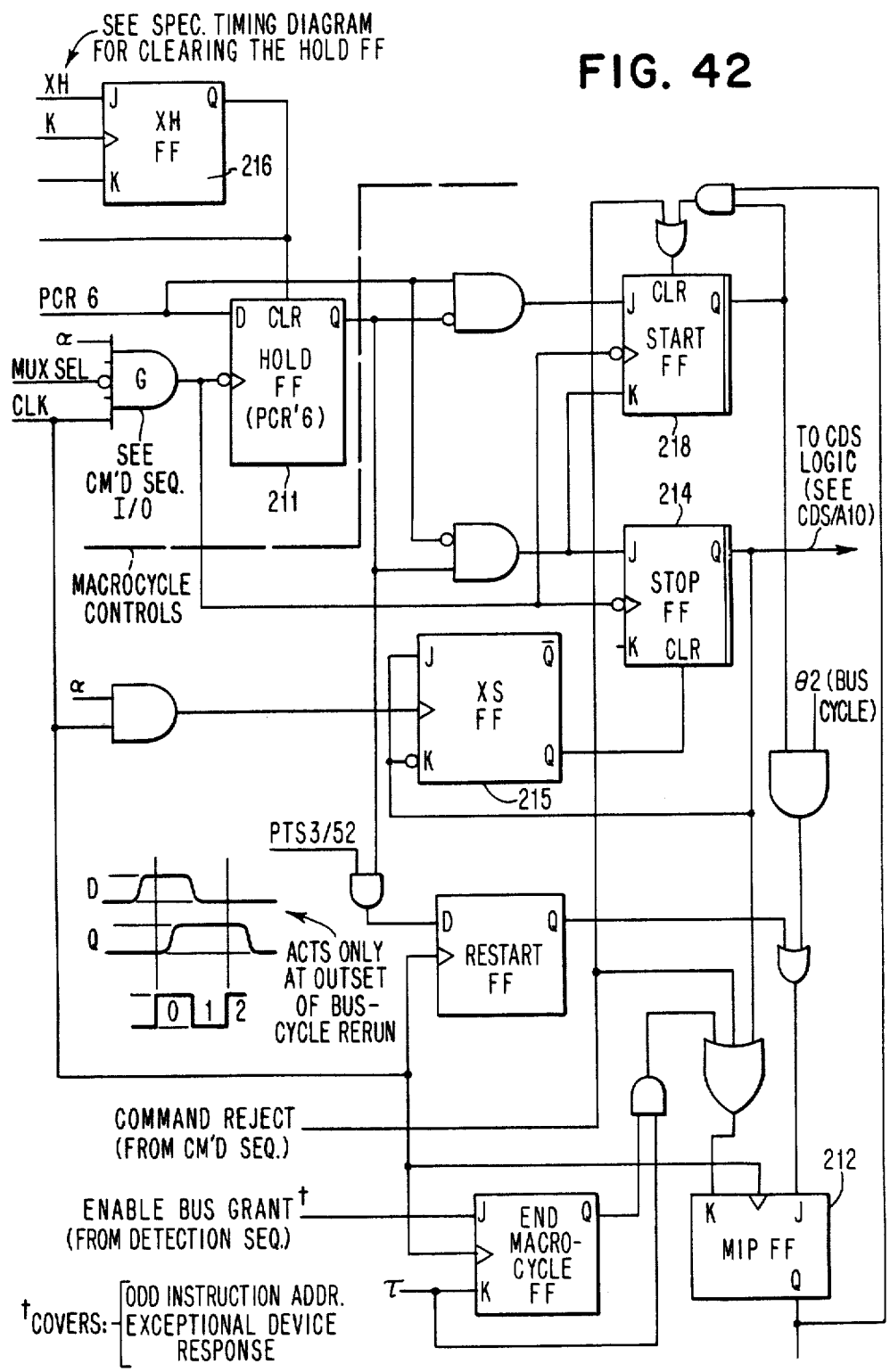
FIG. 42 is a detailed logic diagram of the ICU macrocycle control logic.

The macrocycle controls 210 identify the start of a mcarocycle, its continuous presence (independent of the activation/deactivation of the address strobe), and its termination. These controls are shown in more detail in FIG. 42 and include the following basic elements: the HOLD flip-flop 211, the macrocycle-in-progress (MIP) flip-flop 212, the START flip-flop 213, and the STOP flip-flop 214. Specification timing diagrams for Command Stop and for clearing the HOLD flip-flop are shown in FIGS. 39 and 40, respectively.

The HOLD flip-flop 211 denotes bit 6 of the PCR buffer, i.e., PCR'6. This bit is the high-order bit of the Operation field of the PCR; it expresses the MPU's desire to start or maintain a macrocycle. The HOLD flip-flop 211 is therefore set or reset each time PCR' 108' is loaded, i.e., at negative transitions of the clock during the command sequence. A start macrocycle request from the MPU is detected when this bit toggles from 0 to 1. This may occur just as a bus cycle is completing or while the bus is idle relative to the processor. Similarly, a stop macrocycle request from the MPU is detected when this bit toggles the other way, i.e., from 1 to 0. This will generally occur during S7 of the last bus cycle of a macrocycle, but it can also occur later, while the bus is idle.

The MIP flip-flop 212 identifies an ongoing macrocycle. It also drives the $\overline{\text{MIP}}$ pin on the bus to identify the macrocycle to multi-ported storage devices. This is needed because the address strobe ($\overline{\text{AS}}$) may rise and fall during a macrocycle. The MIP flip-flop 212 is set during the first bus cycle of the macrocycle, at the same time $\overline{\text{AS}}$ is activated. It is always reset on a positive transition of the clock in one of the following ways:

(1) In response to a stop request from the MPU. For this case, the MIP flip-flop 212 will be reset one-half clock period after the STOP command is loaded into PCR' 108' by the command sequence. This will ordinarily occur at the end of S7 of the last bus cycle of the macrocycle.

(2) In response to an illegal command from the MPU. Reset will occur at the positive edge of the clock that ends the command sequence.

(3) In response to an odd-instruction address. For this case, the MIP flip-flop 212 will be reset at the end of S7 of the bus cycle in progress at the time the address exception is detected. This cycle then becomes an ICU-forced last cycle of the macrocycle.

(4) In response to any exceptional device termination. This case is similar to case 3 except for the origin of termination and the moment of detecting the exception. Detection occurs during the detection sequence.

The transition time of the MIP flip-flop 212 must be less than one-clock period to assure that $\overline{\text{MIP}}$ is inactive before the earliest time at which AS can next become active. The minimum off time for the MIP flip-flop (inactive state) is two clock periods. The minimum time can occur if a NOOP command ends a macrocycle and is followed one clock period later with a Bus Cycle with Hold command.

The START flip-flop 213 requests that a macrocycle begin with the next bus cycle. As a consequence, the MIP flip-flop 212 is set at the S1$\int$S2 transition of that next bus cycle. The START flip-flop 213 is set whenever PCR' 108' is loaded and PCR'6 changes from 0 to 1. It remains set until reset by one of the following three events:

(1) Activation of the MIP flip-flop 212 during the first bus cycle of the macrocycle. This bus cycle may not occur at once, however, if the START flip-flop 213 is set by a NOOP with HOLD or by a command that causes a buffer cycle. Additional NOOPs may also follow. This reset of the START flip-flop 213 occurs after the command sequence has terminated.

(2) By the command sequence upon any command reject.

(3) Setting of the STOP flip-flop 214. This implies that the START flip-flop 213 had been set by a NOOP with HOLD and no subsequent bus cycle was either requested or performed for the macrocycle. There is no net effect from the setting of the START flip-flop under these circumstances.

The STOP flip-flop 214 is set whenever the PCR' 108' is loaded and PCR'6 toggles to 0. This denotes a Command Stop and causes the following to occur:

(1) The MIP flip-flop 212 is reset at the next positive transition of the clock.

(2) The BGE flip-flop 222 is set at the next positive transition of the clock and the command sequence is repeated if any of the following conditions prevail:

(a) the HALT$_2$ flip-flop is active, in which case the halt-release function of the command sequence is enabled;
(b) the BR' flip-flop 226 is active; or
(c) the STOP command is a NOOP.

A Command Stop cannot occur as the result of the next command following an exceptional termination of a macrocycle because the ICU has itself already cleared PCR'6. This prevents toggling to 0 until after another macrocycle has been initiated by the MPU. The STOP flip-flop 214 is unconditionally reset during the positive clock following its setting; i.e., the duration of its active state is approximately one-half clock period (T/2).

The required action of the command sequence control logic is specified in detail in the flowcharts of FIGS. 43 to 51. The form of implementation is arbitrary, but whatever the form (PLA, combinational logic, etc.), it must produce the action specified by these flowcharts. In the paragraphs which follow, these flowcharts will be "read" in some detail to explain the control logic action and, at the same time, how to read the flowcharts of this document. With this introduction to the flowchart form of describing a complex sequence, all other flowcharts herein will be treated in context as essentially stand-alone, self-explanatory description.

Figure 43:
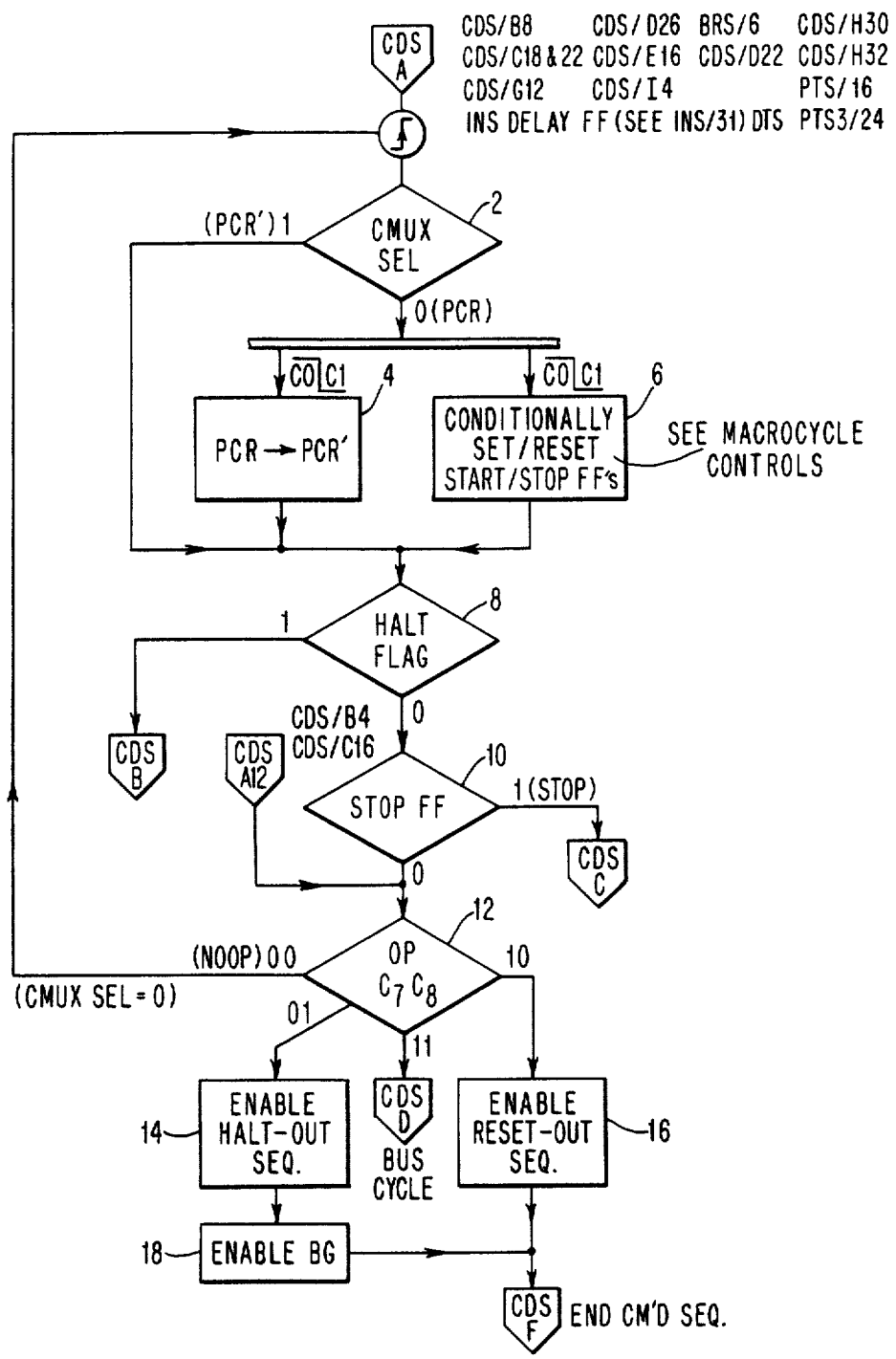
Figure 44:
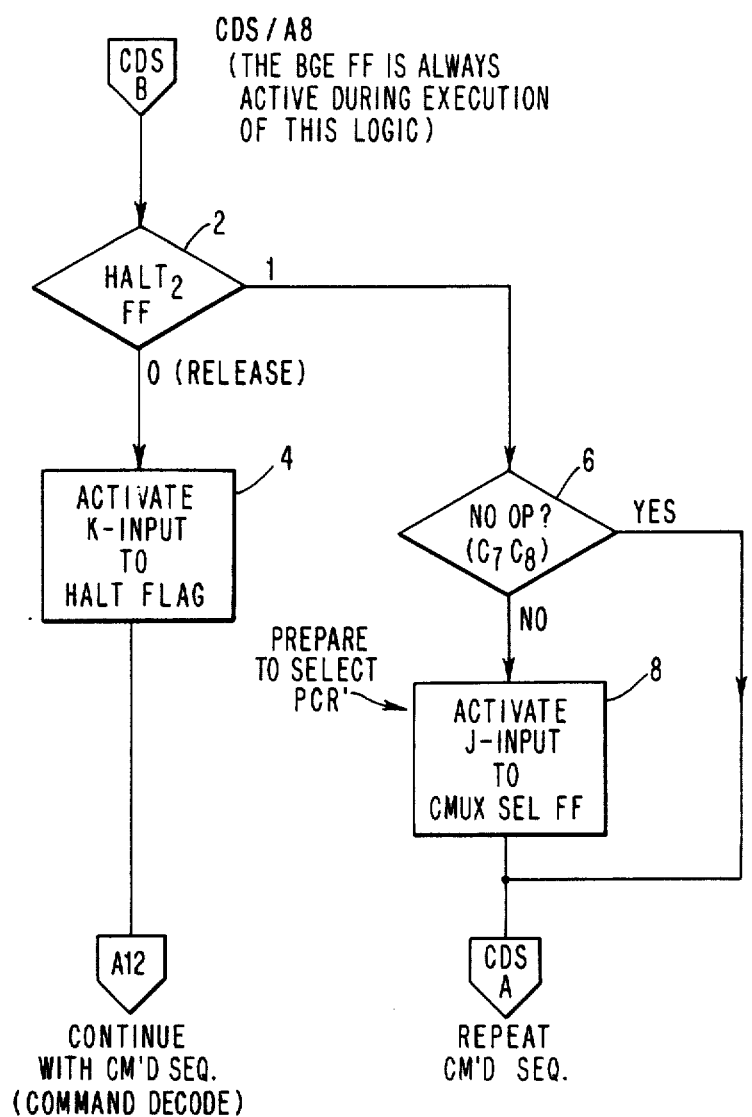
Figure 45:
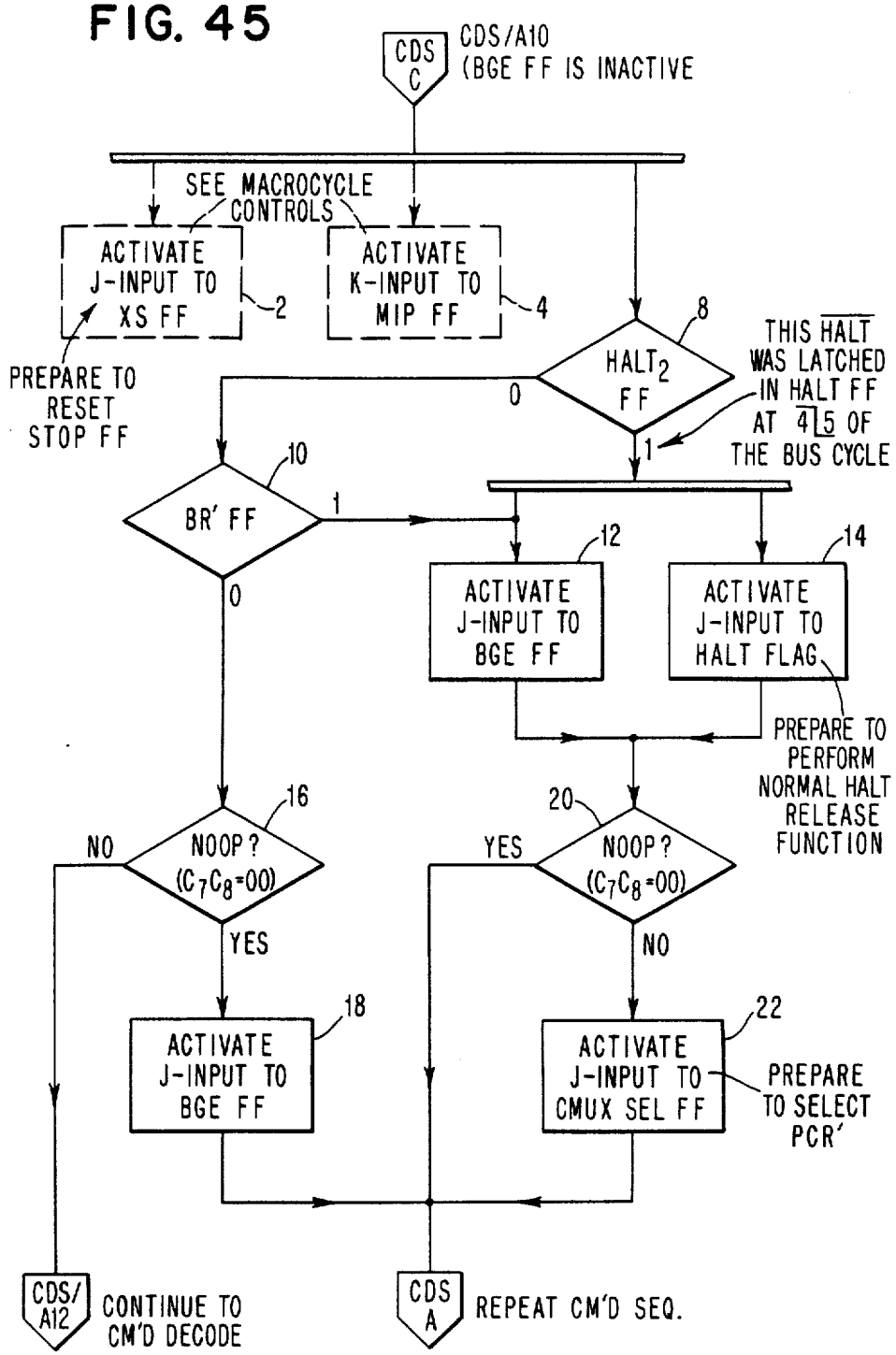
Figure 46:
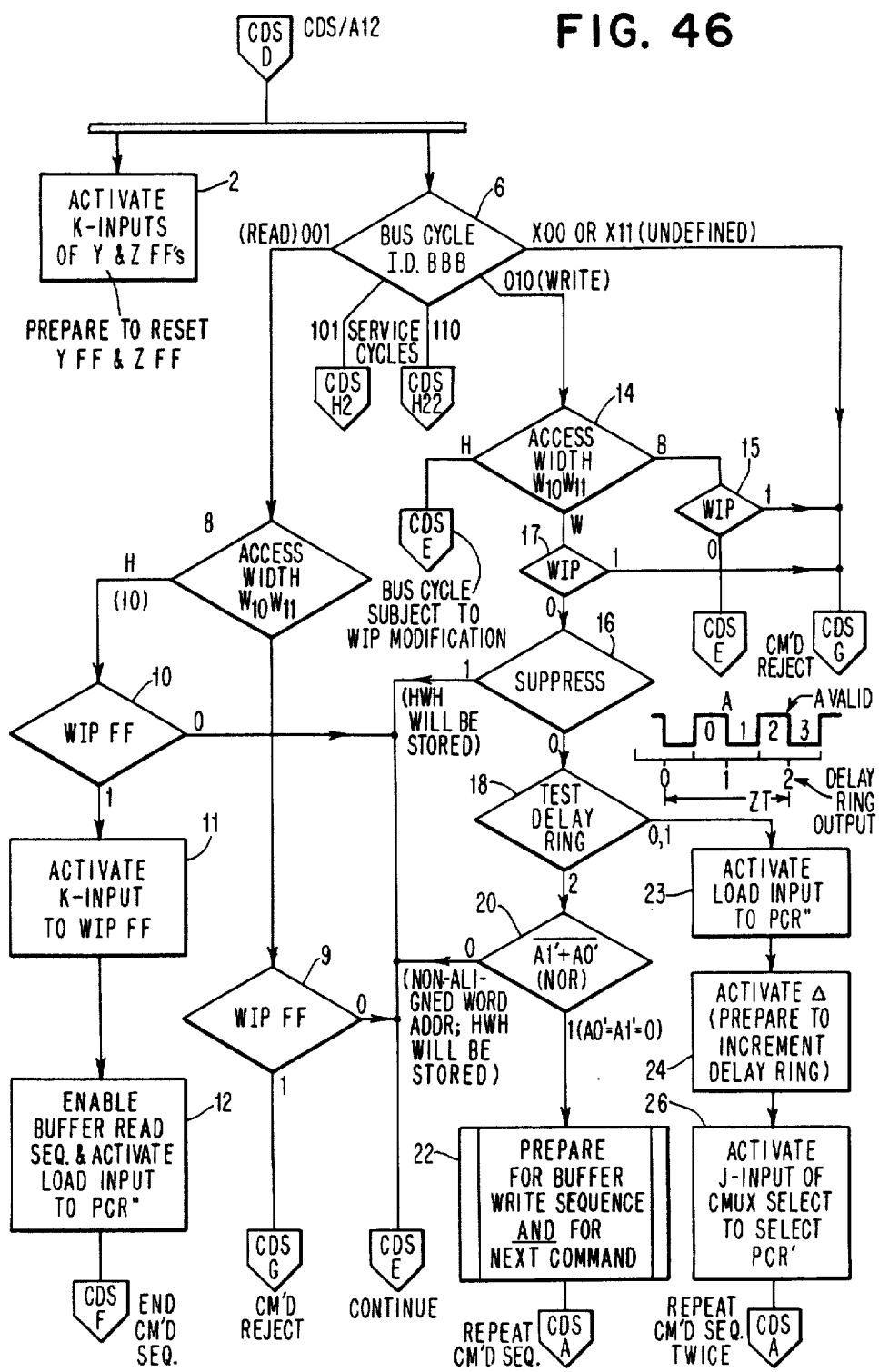

With reference first to FIG. 43, a command sequence begins at a positive edge of the clock. The CMUX select flip-flop 203 is checked to determine if it is at 1 or 0, the former selecting PCR' 108' and the latter selecting the PCR 108. If the CMUX select flip-flop 203 is set at 1, this means that a command has already been buffered but could not yet be executed. The command sequence is therefore repeating. If, on the other hand, the CMUX select flip-flop 203 is set at 0, the contents of PCR 108 are read into PCR' 108' on the negative transition between clock periods 0 and 1 and, at the same time, the START and STOP flip-flops 213 and 214, respectively, are conditionally set or reset. After the CMUX-select action, the next step in the logic is to check the HALT FLAG. Note here that the command sequence steps A8 and A10 are mutually exclusive because (1) the HALT FLAG cannot be set by the detection sequence (DTS) during a macrocycle and (2) the HALT FLAG is set as the STOP flip-flop 214 is being reset during a normal STOP with HALT. Assuming first that the HALT FLAG is 0, the STOP flip-flop 214 is checked to determine its state. If the STOP flip-flop 214 is zero, the operation code C$_7$C$_8$ is checked. If the code is 00 representing a NOOP, the logic returns to the beginning and the command sequence is repeated upon the start of the next positive clock If the code is 01, the HALT-out sequence is enabled and the BG flip-flop is enabled. Here, "enabled" means that the J-input of the corresponding flip-flop is activated. From here, the logic goes to the flow diagram shown in FIG. 48 for ending the command sequence. If the code is 10, the RESET-Out sequence is enabled and the process also goes to the flow diagram shown in FIG. 48.

Figure 48:
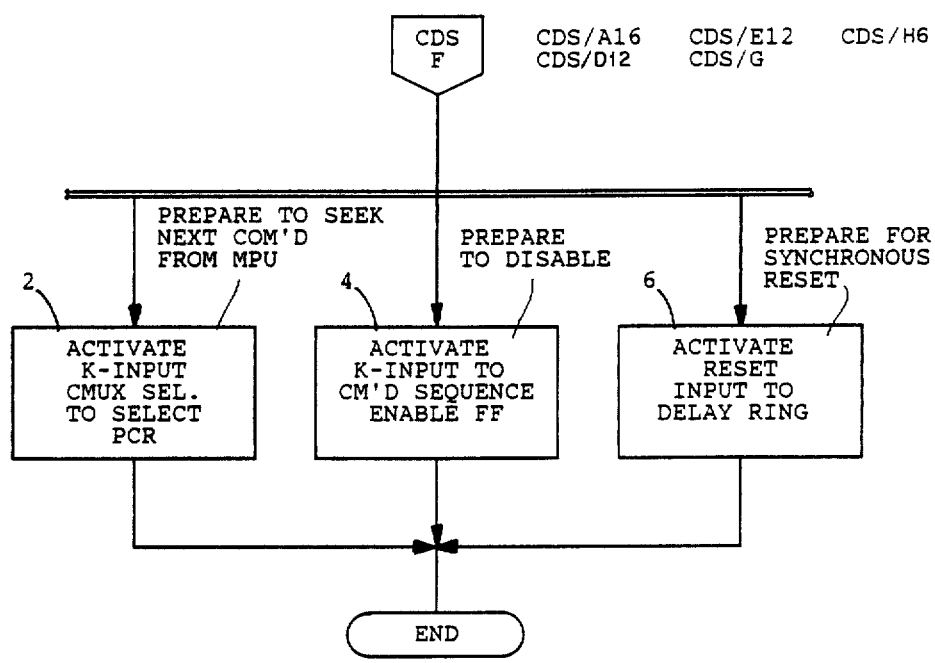

Turning briefly to FIG. 48, the end of command sequence involves the activation of the K-input of the CMUX select flip-flop 203 to select the PCR 108, the activation of the K-input of the command sequence enable flip-flop 202, and the activation of the reset input to the delay ring 210. When the K-input of the CMUX select flip-flop 203 is activated, preparation is made to seek the next command from the MPU when the command sequence is next enabled. Activation of the K-input of the command sequence enable flip-flop 202 prepares for disabling the sequence at the next positive transition of the clock, and activation of the reset input to the delay ring prepares the delay ring 210 logic for synchronous reset (see FIG. 41).

Returning to FIG. 43, what has been described so far are the initial steps and the final steps (FIG. 48) performed by the command sequence logic 201. Assume now that when the HALT FLAG is checked at step 8 it is found to be a 1. In this case, the logic goes to FIG. 44 which shows the normal HALT release function. Note that the BGE flip-flop 222 is always active during execution of this logic. First, the HALT$_2$ flip-flop is checked and, if set to 0, the K-input to the HALT FLAG flip-flop is activated. The logic then returns to FIG. 43 to continue with the command sequence at the command decode (step 12). On the other hand, if the HALT$_2$ flip-flop is set to 1, then a decision is made as to whether this is a NOOP, i.e., is $C_7C_8=00$? If so, the logic simply returns to FIG. 43 where the command sequence is repeated at the next positive transition of the clock. If not, the J-input to the CMUX select flip-flop 203 is activated in preparation to select PCR' 108' before returning to FIG. 43.

Again with reference to FIG. 43, assume now that the HALT FLAG is 0 and the STOP flip-flop 214 is a b 1. In this case, the logic next goes to FIG. 45 which describes the Command Stop logic. First, preparation is made to reset the STOP flip-flop by activating the J-input to the XS flip-flop 215. In addition, the K-input to the MIP flip-flop 212 is activated. These steps are performed directly by the output of the STOP flip-flop 214 (see FIG. 42). The HALT$_2$ flip-flop is checked and, if set to 1, the J-inputs to the BGE flip-flop 222 and the HALT FLAG flip-flop are both activated, the latter in preparation to perform a normal HALT release function. In this case, $\overline{HALT}$ was latched in the HALT flip-flop at the negative clock transition between periods 4 and 5 of the bus cycle. After the J-inputs of the BGE and HALT FLAG flip-flops have been activated, a determination is made as to whether this is a NOOP, i.e., is $C_7C_8=00$? If so, the logic returns to FIG. 43 to repeat the command sequence at the next positive clock. If not, the J-input to the CMUX select flip-flop 203 is activated to prepare to select PCR' 108' before returning to FIG. 43 to repeat the command sequence. Returning to the HALT$_2$ flip-flop, if it is set to 0, the BR' flip-flop 226 is checked and, if it is set to 1, the logic proceeds as if the HALT$_2$ flip-flop had been set to 1. On the other hand, if the BR' flip-flop 226 is set to 0, a determination is made as to whether this is a NOOP. If it is, the J-input to the BGE flip-flop 222 is activated before the logic returns to FIG. 43 to repeat the command sequence. If not, the logic simply returns to FIG. 43 to perform the command decode operation.

If the command decode operation of FIG. 43 produces a code of 11, a bus cycle is specified. The logic then proceeds to FIG. 46 where (1) the K-inputs of the Y and Z flip-flops 206 and 208, respectively, are activated in preparation to reset both of these flip-flops, and (2) the bus cycle ID field (BBB) is decoded. If the BBB field is X00 or X11, the command reject logic is initiated since these codes are undefined. If the bus cycle code is 001, this denotes a read cycle, and the first determination that must be made is the access width, whether a byte, halfword or the first halfword of a word. In either case, the WIP flip-flop 204 is checked to determine if the previous bus cycle had extracted an aligned word from memory and, if not, the logic goes to FIG. 47 where the set-up of the bus cycle is concluded. Similar logic exists for a decoded write bus cycle. Here again the access width is determined and for byte or halfword high (word) output, the WIP flip-flop 204 is checked for consistency with the access width. For halfword high (word) output, the Supress pin is checked to determine if full-word output is to be to be suppressed and, if so, a bus cycle is initiated (see FIG. 47) to store the high-order halfword. If not, the delay ring 210 is tested, and after two passes through the command sequence, a determination is made as to whether $A1'=A0'=0$. This is indicated in the drawing figure by the NOR operator $\overline{A1'+A0'}$. If $A1'\neq A0'=0$, a nonaligned word address is detected, and, as before, a bus cycle is initiated (see FIG. 47) to store the high-order halfword.

Figure 47:
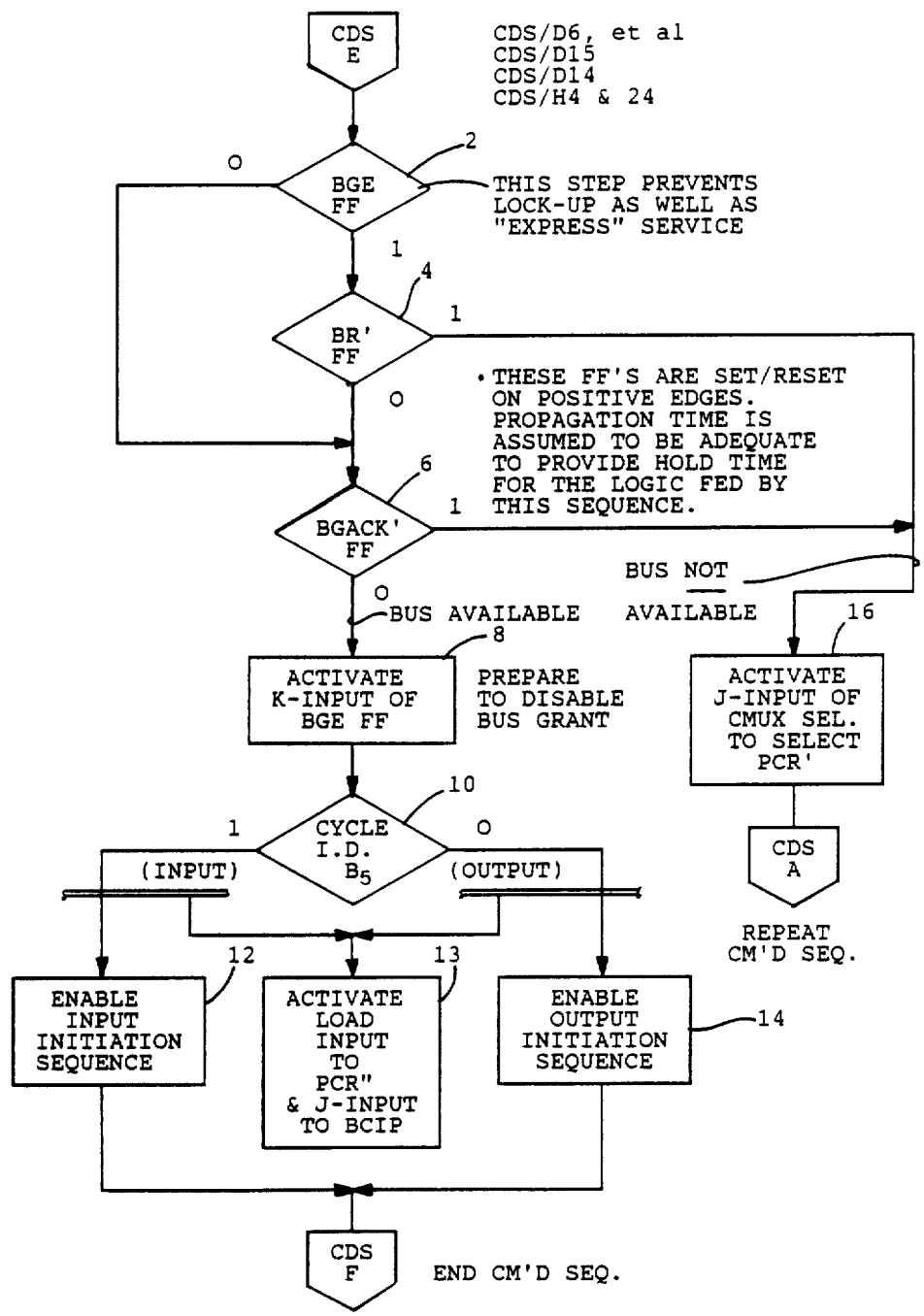

Turning now to FIG. 47, the set-up for the bus cycle continues by checking the BGE flip-flop 222. This step prevents lock-up as well as provides "express" service. If the output of the BGE flip-flop is 1, the BR' flip-flop 226 is checked, and if 0, it is as if the BGE flip-flop had been set to 0. In both cases, the BGACK' flip-flop is checked to determine its level. (Each of these flip-flops is set and reset on the positive edges of the clock. Propagation time is assumed to be adequate to provide hold time for the logic fed by the command sequence.) If the BGACK' flip-flop is 0, this indicates finally that the bus is available. The next thing that is done is to activate the K-input of the BGE flip-flop 222 in preparation for disabling bus grant ($\overline{BG}$). Next, the load input to PCR" 108" and the J-input to the BCIP flip-flop 154 are activated and the initiation sequence is enabled. When this is accomplished, the logic goes to FIG. 48 to end the command sequence as previously described. On the other hand, if upon testing the BR' flip-flop 226 or the BGACK' flip-flop, either is found to be set, the bus is not available and the J-input of the CMUX selector flip-flop 203 is activated to select the PCR'. The logic then returns to FIG. 43 to repeat the command sequence at the next positive clock.

Figure 49:
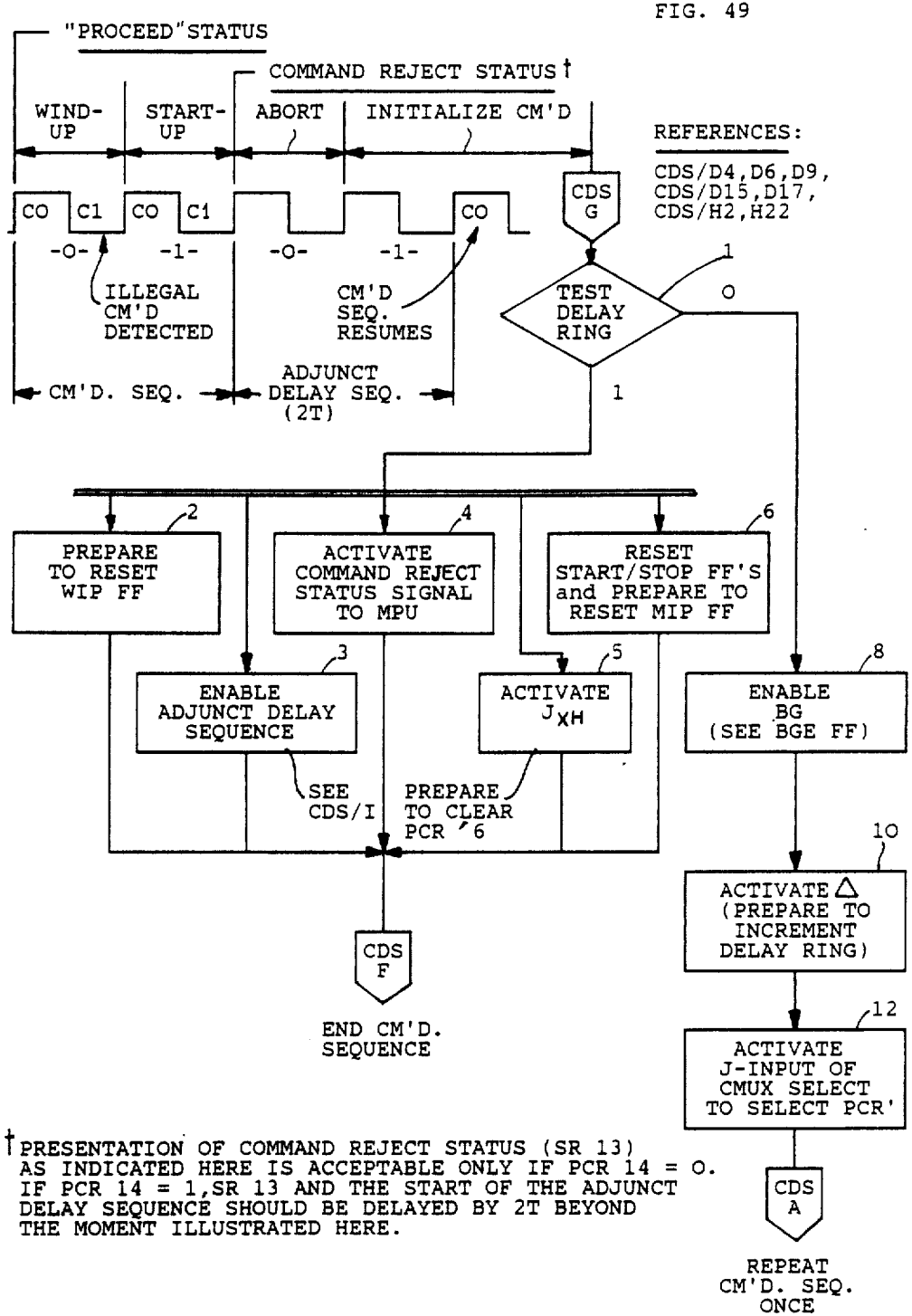
Figure 50:
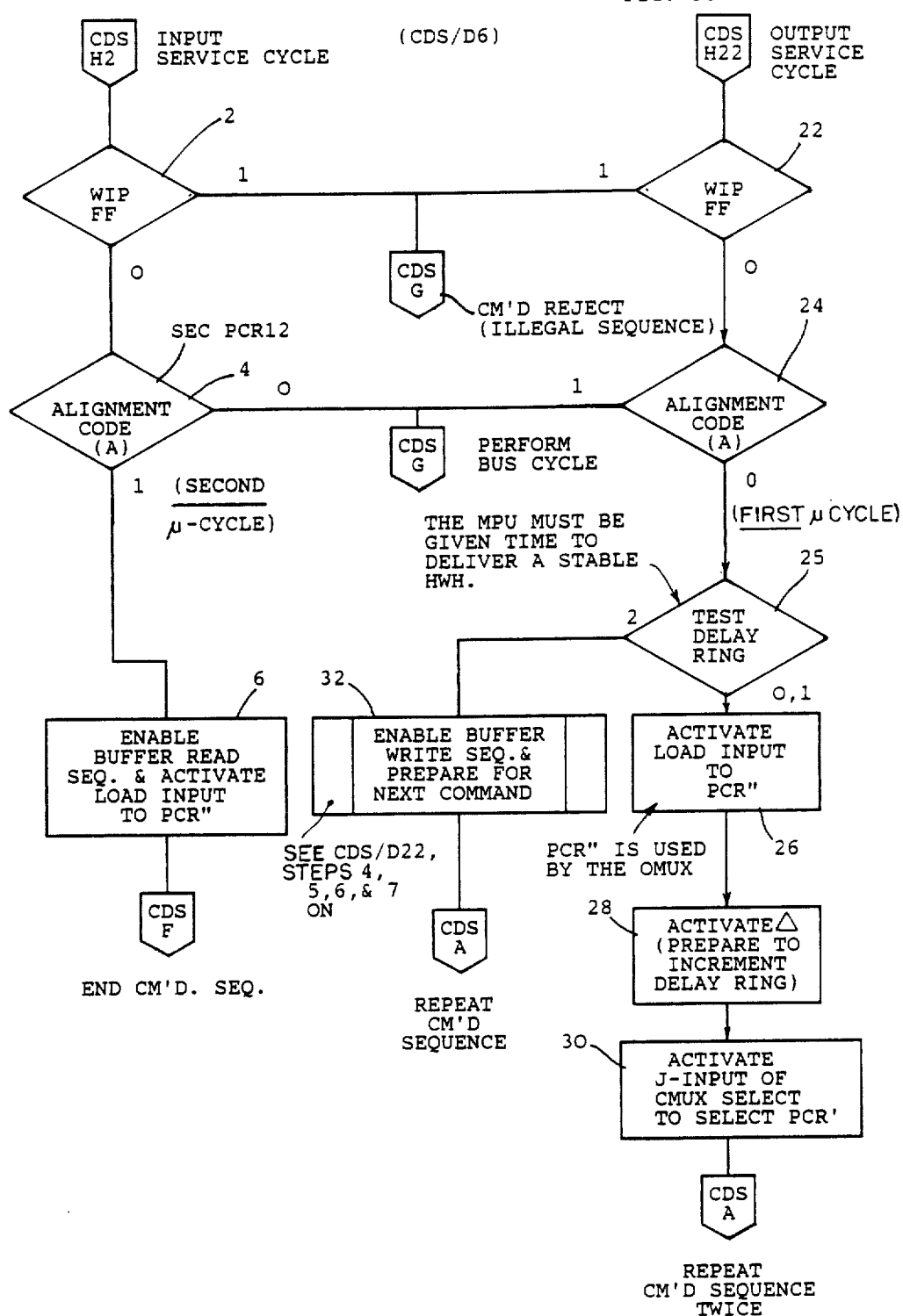
Figure 51:
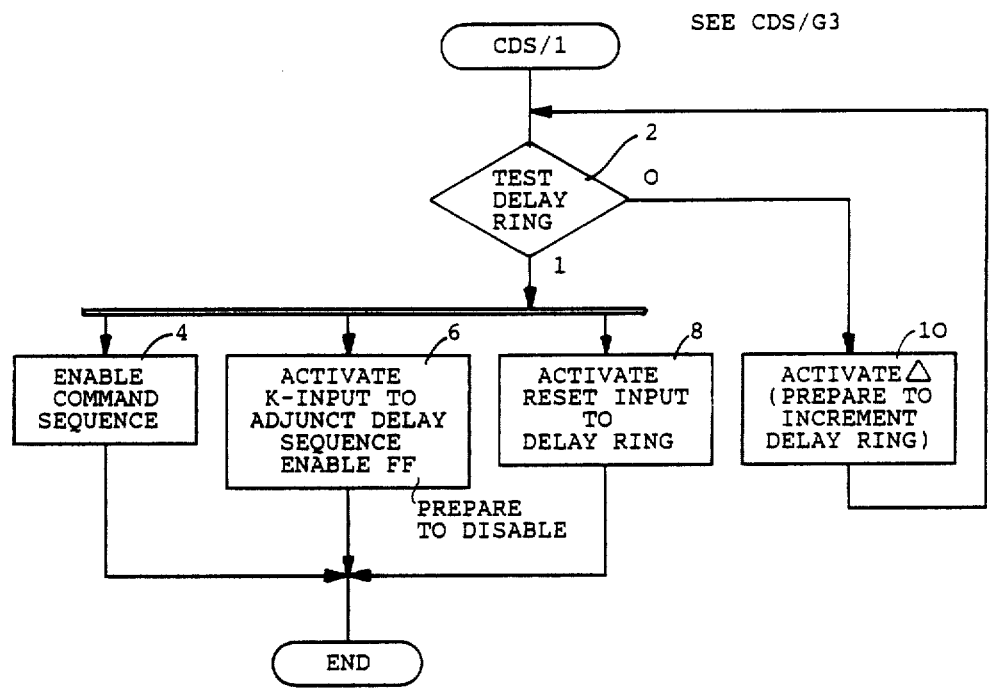

Returning now to FIG. 46, assume that a read cycle has been detected, the access width has been decoded for a halfword, and the WIP flip-flop 204 is 1, indicating that the MPU is attempting to fetch the low-order halfword or a full word. In this case, the K-input of the WIP flip-flop 204 is activated in preparation to reset that flip-flop (if it has done its job), and then the buffer read sequence is enabled and the load input to the PCR" is activated. At this point, the logic again goes to FIG. 48 to end the command sequence as previously described. On the other hand, assume either that the bus width was detected to be a byte or a halfword high (HWH) and the WIP flip-flop 204 is 1, indicating that the MPU has issued inconsistent command. In this case, the logic proceeds to FIG. 49 for the command reject sequence. A similar result is obtained for a write cycle if the WIP flip-flop 204 is 1. As shown in FIG. 49, the first step in the command-reject process is to test the delay ring. If it is 0, indicating that na illegal command has just been detected, the J-input to the BGE flip-flop 222 is activated and preparations are made to increment the delay ring. Also, the J-input of the CMUX select flip-flop 203 is activated to select PCR' 108'. At this point the logic returns to FIG. 43 to repeat the command sequence. The purpose of this procedure is to achieve a one clock-period delay. This delay has been achieved when the delay ring is found to be at 1. Preparation is then made to reset the WIP flip-flop 204, and the adjuct delay sequence is enabled. Also, the command-reject status signal to the MPU is activated, the J-input to the XH flip-flop 215 is activated in preparation to clear PCR'6, and the START and STOP flip-flops 213 and 214, respectively, are reset. And, finally, preparation is made to reset the MIP flip-flop 212. This done, the logic proceeds to FIG. 48 to end the command sequence, as previously described.

Returning again to FIG. 46, assume that a write cycle has been detected to store the high-order half of a word, the WIP flip-flop 204 is 0, and word output is not suppressed. Again, the delay ring 210 is tested, and if 0 or 1, the load input to PCR" 108" is activated, the increment output is activated to prepare for incrementing the delay ring 210, and the J-input of the CMUX select flip-flop 203 is activated to select PCR' 108'. At this point, the logic returns to FIG. 43 to repeat the command sequence. If, when the delay ring is tested and found to be at 2, the two low-order address bits are both zero, then preparation is made for a buffer write sequence and to seek the next command. The logic then returns to FIG. 43 to repeat the command sequence. Preparation for the buffer write sequence involves activating the J-input to the WIP flip-flop 204 and enabling the buffer write sequence. Preparation for the next command involves activating proceed status to the MPU, the K-input of the CMUX select flip-flop 203 to select PCR 108, and the reset input to the delay ring 210.

The description thus far has been for the set up for a bus or buffer cycle involving ordinary read or write operations. If, in FIG. 46, service cycle codes of 101 or 110 are detected, the logic proceeds to FIG. 50. The code 101 is the input service cycle, and the code 110 is the output service cycle. When either are detected, the first thing that is done is to check the WIP flip-flop 204. It should never be 1. If it is, then the MPU is in error and the logic goes to FIG. 49 for the command-reject sequence previously described. If the WIP flip-flop 204 is 0, the next thing that is checked is the alignment code. In the case of an input service cycle, if the alignment code is 0, or in the case of an output service cycle, if the alignment code is 1, the logic goes to FIG. 47 to perform a bus cycle. Assume, however, that the alignment code for the input service cycle is 1, representing the second microcycle. The buffer read sequence is then enabled and the load input to PCR" 108" is activated. At this point the logic goes to FIG. 48 to end the command sequence. Assuming on the other hand that the alignment code for an output service cycle is 0 (denoting the first microcycle), it is necessary to introduce a 2T delay to give the MPU time to deliver valid data. If the delay ring 210 is at 0 or 1, the load input to PCR" 108" is activated, the increment input is activated to prepare for incrementing the delay ring, and the J-input of the CMUX flip-flop 203 is activated to select PCR' 108'. At this point, the process returns to FIG. 43 to repeat the command sequence. When the delay ring 210 is found to be at 2, the buffer write sequence is enabled and preparation is made to seek the next command. The logic then returns to FIG. 43 to repeat the command sequence. The preparation for the next command involves activating (1) proceed status to the MPU, (2) the K-input of the CMUX select flip-flop 203 in preparation to reset that flip-flop fo selection of PCR 108, and (3) the reset input to the delay ring 210.

Execution Sequence, Bus Cycle Control

Returning to FIG. 28, the five "execution" sequences of the control logic of the ICU are seen to be Reset-Out, Buffer Read, Buffer Write, Bus Cycle, and Halt-Out. The bus cycle sequence is chosen as exemplary of this set and is described in detail in what follows. It is also the sequence of most action. Detailed descriptions of the other execution sequences are not included herein since these sequences can be inferred by those skilled in the art. Flowchart descriptions of the operation of the buffer read and buffer write sequences are nevertheless included in FIGS. 52 and 53, respectively.

Bus cycle control is itself subdivided into four, functionally distinct sequences: initiation, detection, synchronization, and termination. These subsequences are described in this order. The Initiation Sequence 240 "initiates" every bus cycle. Its primary function is to enable the buses and activate the output controls at the appropriate moment peculiar to each signal and to the type of bus cycle in progress In addition, the initiation sequence enables the next sequence of the bus cycle, namely the detection sequence, and means are provided for early enablement in the event that a "fast read" is requested. The initiation sequence also implements the detection of a sequence exception (Interface Check/B). If a sequence exception is detected, a bus cycle is not initiated. Instead, SR9 is activated, the BGE flip-flop is set, and, after a 2T delay, the command sequence is re-entered.

The specification timing diagram for the initiation sequence is given in FIG. 54, and one form of implementation is illustrated in FIG. 55. With reference to FIG. 55, the initiation sequence comprises four states (0, 1, 2, and 3) and four phases ($\theta 0$, $\theta 1$, $\theta 2$, and $\theta 3$). It is executed only once for each bus cycle, and its duration is always 2T, as specified in FIG. 54. The output of the INS ENABLE flip-flop 241 is designated $\theta$. The functions performed depend on the state of the sequencing exception (SEQX) flip-flop 242 which is set at the same time the INS ENABLE flip-flop 241 is set, if an exception is detected. This is shown in more detail in the timing diagram of FIG. 54. The enabling sequences which set the INS ENABLE flip-flop 241 are the Command Sequence (see CDS/E12 or E14), Post-Termination Sequence 3 (for rerun), and Post-Termination Sequence 4 (for double-cycle and word-write operation). The four phases are seen to be generated by a rign counter 243. These phase signals perform the gating functions shown in FIG. 55, and, in addition, the following: $\theta 1$ functions enable the clock input at the Y' and WIP' flip-flops 207 and 205, respectively, and activate the J-input at the address (bus) enable flip-flop. $\theta 2$ functions enable the K-input at the R/W flip-flop and the J-input at the MIP flip-flop 212. θ3 functions activate the P-input of the address strobe activation flip-flop 144, and enable the J-input of the data bus enable flip-flop 125. The operation of the initiation sequence logic is summarized in the flowchart of FIG. 56 which may be read in the same manner as demonstrated previously with respect to FIG. 43 to 51 of the Command Sequence logic.

The second sequence of the bus cycle control sequences is the detection sequence 250. This critical sequence detects the device response to the output controls and then decides what next steps are to be performed. The specification timing diagram for the detection sequence is given in FIG. 57, and the logical implementation of a preferred embodiment is detailed in FIG. 58 and in the related truth tables of FIGS. 61 to 74. FIG. 58 shows the relationship of the detection sequence logic to the first-stage external signal synchronization flip-flops, discussed earlier, and to the status reporting elements of the ICU, which carry the termination response for the command just completed.

The detection sequence can generate any one of fourteen of the possible eighteen termination status responses to the MPU. The other four status responses (SR9, SR10, SR11, and SR13) are generated by other control sequences, as noted in FIG. 58. The significance of each status signal is summarized in the table shown in FIG. 59.

The detection sequence is enabled solely by the initiation sequence 240 and comprises states 4 and 5 of the bus cycle and a single phase, denoted by δ. Once enabled, the sequence runs continuously, i.e., states 4/5 repeat indefinitely, as shown in FIG. 57, until a valid response is detected. It then generates its output signals and passes control on to the next sequence of its choice, namely, either the synchronization sequence 260 or the termination sequence 270 and, if the latter, also the command sequence or a post-termination sequence.

Exceptional responses, containing the BERR signal and any of the three DTEXN signals, are handled by a two-edge detection scheme that permits completely asynchronous presentation of multiple signals without a tight skew tolerance. First detection of any of these exception signals causes the detection sequence to perform at least one additional cycle (denoted 4'/5') during which it can again sample the device response. Any exceptional or normal response detected during states 4'/5' is then unconditionally recognized. If, however, during states 4'/5' no response is detected (the prior signal was either spurious or removed), the detection sequence returns to state 4 and continues its normal operation.

Specifically, the detection sequence performs the following functions:

(A) Detection of any one of 510 device responses, plus a status cancellation signal ($\overline{HALT}$, occurring alone, is not detected);

(B) Logical resolution of the device response, in conjunction with the command from the MPU, and other controls;

(C) Generation and buffering of all status signals, other than SR09, SR10, SR11, and SR13 (see FIG. 58);

(D) Depending upon the outcome of step B, either (a) repeating S4, (b) starting S4', or (c) terminating, upon enabling one sequence from Group 1 below and, conditionally, one sequence from Group 2:

1. (a) The Termination Sequence, comprising states S6/S7 of the bus cycle; or (b) the MC68000 Synchronization Sequence.
2. One of the following, in conjunction only with the Termination Sequence (1(a) above): (a) Command Sequence; or (b) a Post-Termination Sequence (one of six), to deal with unusual conditions.

(E) If D2(a) is an outcome, the detection sequence also gates status to the MPU (see G0 in FIG. 58), so that valid status will be available to the MPU at the positive edge of S6.

(F) Enables loading of the IOR 123 at 6⌊7 of input bus cycles, whenever buffering is required.

(G) Conditional enablement of Bus Grant ($\overline{BG}$).

(H) Detection of the fetch of an aligned full word in response to a corresponding command from the MPU, in which case the WIP flip-flop 204 iset to flag the subsequent command sequence.

(I) Reset of the WIP flip-flop 204, upon detecting a bus cycle that stores a full word (WIP'=1).

(J) Detection of the need for a double cycle, in which case the Y flip-flop 206 is set and PTS4 is enabled; and, similarly, control fo the word-write operation, through set and reset action on the Y and Z flip-flops 206 and 208, respectively.

(K) Permits the use of multiple, asynchronous, exceptional device-response signals, without the need for tight tolerances to skew, using a two-edge detection scheme implemented with the XRV flip-flop 215.

(L) "Proceed" cancellation, through means for detecting the synchronous presentation of a CANCEL signal. Proceed cancellation allows the device to anticipate (and signal) a normal response T/2 before it determines the validity of that response. If not valid, timely activation of the CANCEL signal allows the bus cycle to continue without interruption.

All of these functions A through L may be seen to be carried out by the preferred embodiment described in FIG. 60 and its associated truth tables in FIGS. 61 to 74.

The synchronization sequence 260 in FIG. 28 is provided to handle Motorola MC6800 peripheral devices. These devices respond to the bus cycle with a $\overline{VPA}$ signal, and upon detection of this signal, the detection sequence enables the synchronization sequence (symbolic path 3 in FIG. 28) rather than proceeding directly to the termination sequence 270 (paths 1 or 2). It is during the synchronization sequence that the ICU responds to $\overline{VPA}$ with $\overline{VMA}$; $\overline{VMA}$ is the effective "proceed" signal to the MC6800 device. The device then performs its input/output (I/O) function, and the ICU completes its synchronization sequence in concurrence with a common synchronization signal (ENABLE). The duration of the synchronization sequence is dependent entirely upon when the VPA is asserted relative to the ENABLE signal. The ENABLE signal (E) is a free-running, "slow clock" derived exclusively from the input clock (CLK). It is completely independent of the bus cycle and of any action on the part of MC6800 devices. The purpose of the E signal is to provide synchronization for MC6800 devices.

Again, in the interest of brevity, a description of the preferred embodiment of the synchronization sequence is not provided herein. This sequence must satisfy the known Motorola specification for MC6800 devices and can, therefore, be implemented by those skilled in the art without further description. Moreover, the sequence is not essential to the invention.

The termination sequence 270 (see FIG. 28) is the final sequence of each bus cycle. It performs the following termination functions:

(1) Negation of all strobes at the 6 ⌐7 transition of the clock, specifically, negation of $\overline{AS}$, $\overline{WS}$, $\overline{UDS}$, and $\overline{LDS}$.

(2) Activation or deactivation of other controls at the end of S7 of the bus cycle, as follows: $R/\overline{W}$ (activated), $\overline{MIP}$ (activation, conditionally), and $\overline{VMA}$ (deactivated).

(3) Tri-stating of the address bus and data bus, at the end of S7.

The termination sequence comprises two states (6 and 7) and one phase, denoted by $\tau$. It is executed only once for each bus cycle, and its duration, therefore, is one clock period. It does not itself enable any subsequent sequence. The sequences that enable the termination sequence are the detection sequence 250, indirectly, each time the command sequence 200 or any post-termination sequence (PTS) is enabled, or by the MC6800 synchronization sequence 260, as shown in FIG. 28. Implementation of this sequence is straight-forward and is not, therefore, further described.

Post Termination Sequences

At the end of the detection sequence 250 or at the end of the synchronization sequence 260, i.e., at the end of S5 or S5', one of the following two sequences (in addition to the termination sequence) may be enabled: (1) the command sequence, or (2) a post-termination sequence. A post-termination sequence is always enabled under any of the following circumstances:

(1) All exceptional terminations;

(2) Normal termination with HALT, for non-macrocycles; and (3) Normal termination of a detected inner cycle of a double-cycle or a word-write operation.

Post-termination sequences perform the following functions, in the order given:

(1) Release detection, where the term "release" refers to removal of the associated device response signal(s);

(2) Status generation, if the order of release of multiple signals is significant;

(3) Presentation of status to the MPU, via the status buffer register or directly;

(4) Generation of post-status delay (2T), if required; and (5) Enablement of either (1) the command sequence, (2) the second bus cycle of a double-cycle or the 01, 10, and 11 cycles of the word-write operation, or (3) a rerun of the same cycle.

The typical features of a post-termination sequence are illustrated by the timing diagram shwon in FIG. 75. Six separate post-termination sequences are specified. They are the following wherein names denote the device response to the associated bus cycle:

PTS1-Interface Check: This sequence merely supplies post-status delay before enabling the command sequence. There is no release constraint on the ACK signals, and status, formed earlier, is gated from the status buffer. The HALT signal is checked by this sequence. The presence of HALT will delay presentation of status and enablement of the command sequence. Neither BERR nor any of the DTEXN signals is significant to this sequence.

PTS2-DTEXN (Data Transfer Exception): This sequence presents exceptional status to the MPU upon negation of the exception signal(s), then inserts the post-status delay before enabling the command sequence. Status is gated from the status buffer register (SBR). For simplicity, all DTEXN must be inactive to satisfy the release condition, independent of the particular DTEXN previously latched in the SBR. HALT release is performed. BERR is not checked.

PTS3-BERR with HALT (Rerun Request): This sequence provides preferred/reverse release detection, and, upon:

(a) Preferred release, the bus cycle is rerun, provided that the rerun request is unconditional, or that the cycle is not part of a macrocycle; for cycles of a macrocycle in the absence of an unconditional rerun request, rerun reject status is generated followed by post-status delay and enablement of the command sequence; and (b) Reverse release, an exceptional status (rerun cancelled) is presented to the MPU, followed by post-status delay, and enabling of the command sequence.

Independent of the type of release, the DTEXN signals are not checked. Moreover, the interface is checked for availability before enabling INS (rerun) and resetting the BGE flip-flop 222. Whenever rerun rejected or rerun cancelled statis is set, the WIP flip-flop 204 is also reset.

PTS4-Normal Termination/Inner Cycles: This sequence enables the second bus cycle of a double-cycle and the 01, 10, and 11 cycles. of the word-write operation, following normal termination of the prior cycle. That prior cycle determines the state of the BGE flip-flop 222. The initiation sequence, not the command sequence, is the successor sequence to PTS4. Status is not gated to the MPU. If BGE=1, the interface is checked for HALT release and availability before enabling INS and resetting the BGE flip-flop 222.

PTS5-BERR and Not HALT (Time-Out): This sequence presents buffered time-out status to the MPU upon negation of BERR, then inserts the post-status delay (2T) before enabling the command sequence. Note that, as applied here, Time-Out implies the absence of any other initial response from the device, i.e., the response which terminates the detection sequence. The HALT signal is ignored by PTS5.

PTS6-General Release: This sequence is used when exceptional status is generated independently of the device response, e.g., odd-instruction address. PTS6 does the following: (1) waits for release of HALT, BERR, and all DTEXN signals, if any of these is present, and (2) upon total release, gates status from the status buffer and, after a 2T delay, enables the command sequence.

The post-termination architecture of this invention is believed to be unusual in the design of microprocessors as it precisely specifies the action that will be taken for all possible responses to a bus cycle. No longer is the resolution of unusual responses left to whatever eventually falls out of the circuit design process. The term "post-termination" may be seen to refer to the fact that these sequences always operate beyond the moment that the associated bus cycle actually ends, namely S7. But, in all instances, the termination sequence is enabled concurrently with any post-termination sequence. In retrospect, therefore, these sequences could be accurately called "co-termination" sequences. The actual implementation of the post-termination sequences is straightforward and is illustrated by the specification and logical implementation of PTS3 illustrated in FIGS. 76, 77 and 78.

While the invention has been particularly shown and described with respect to a preferred embodiment thereof, it will be understood by those skilled in the art that changes in form and detail may be made therein without departing from the spirit and scope of the invention.

Having thus described my invention, what I claim as new, and desire to secure by Letters Patent is:

1. A single-chip microprocessor comprising:
   external signal pins to which off-chip devices are connected;
   a microprocessing unit; and
   an interface control unit, said interface control unit being connected to said microprocessing unit and to said external signal pins of said single-chip microprocessor, said microprocessing unit and said interface control unit being logically distinct elements, such that said interface control unit is logically transportable for use with other and different microprocessing units;
   said interface control unit comprising:
   execution means connected to said microprocessing unit and to said external signal pins; and
   control means for controlling said execution means and for performing signal sequencing at said external signal pins, said signal sequencing being called a bus cycle, said control means being responsive to commands from said microprocessing unit and to control signals from said off-chip devices;
   said control means including command means responsive to said commands from said microprocessing unit and status means for presenting status to said microprocessing unit describing the outcome of each command, wherein said command means causes said execution means to perform a data transfer in response to a command from said microprocessing unit, and said status means presents the outcome status of said particular command upon logical completion of said data transfer.

2. The single-chip microprocessor as recited in claim 1 wherein said execution means and said control means are designed to provide an external appearance at said external signal pins that is compatible with peripheral devices of a specific microprocessor called the compatible microprocessor, thereby enabling at least one peripheral device of said compatible microprocessor to be attached to said single-chip microprocessor and to communicate with said co-resident microprocessing unit.

3. The single-chip microprocessor recited in claim 2 wherein said execution means and control means further include extended means for attaching and operating other peripheral devices of different type than associated with said compatible microprocessor, said extended means and its operation being transparent to any co-attached device of said compatible microprocessor.

4. The single-chip microprocessor recited in claim 3 wherein said extended means comprises:
   means for generating non-compatible signals not physically detectable by any attached device of said compatible microprocessor; and
   means for generating compatible signals physically detectable by, but logically transparent to, all attached devices of said compatible microprocessor, said compatible signals conforming to the natural communication protocol of the devices of said compatible microprocessor, said other peripheral devices of different type than associated with said compatible microprocessor using said non-compatible signals and said compatible signals in the process of communicating with said interface control unit.

5. The single-chip microprocessor recited in claim 3 wherein said control means includes mixed-width device handling means for dynamically controlling said execution means in response to an addressed off-chip device's width-identifying response to a bus cycle.

6. The single-chip microprocessor recited in claim 3 wherein said control means includes accessing means for accessing operands from said off-chip devices at any byte location including those locations which do not correspond to an integral boundary of the accessed operand.

7. The single-chip microprocessor recited in claim 3 wherein said control means is responsive to an external control signal for varying the minimum duration of a bus cycle.

8. The single-chip microprocessor recited in claim 1 wherein said control means further comprises:
   initiation sequence means for generating initiation signals identifying said bus cycle to at least one off-chip device;
   detection sequence means for responding to the external signals produced by said off-chip device in response to said initiation signals; and
   termination sequence means for concluding said bus cycle.

9. The single-chip microprocessor recited in claim 3 wherein said bus cycle comprises outbound control signals which are specified explicitly by said command from said co-resident microprocessing unit.

10. The single-chip microprocessor recited in claim 9 wherein said external signals produced by said off-chip device are in response to said bus cycle, said external signals being identified explicitly in said status describing said outcome of said command.

11. The single-chip microprocessor recited in claim 1 wherein said control means further comprises:
    bus arbitration means for granting temporary and exclusive use to an off-chip master device of any bus derived from said external pins of said single-chip microprocessor, said arbitration means being logically independent of said control means responsive to said commands from said co-resident microprocessing unit, and said granting being subject to enablement by said control means as a condition for being exhibited to said off-chip master device; and
    bus grant enable means responsive to said bus arbitration means for enabling and disabling said granting of said bus.

12. A bus control architecture for microprocessors consisting of a logically independent interface control unit capable of being used with a variety of microprocessing units, said interface control unit permitting a microprocessing unit to be used with externally connected support devices of another, different microprocessor, said interface control unit being connected to memory means for storing data, said memory means being divided into memory address space and service address space, said interface control unit comprising:
    address means for providing an output address unit and said externally connected support devices during a bus cycle;
    data means for providing a bidirectional data path between said microprocessing unit and said externally connected support devices during a bus cycle;

processor command means for receiving and buffering commands from said microprocessing unit to said interface control unit; and control means connected to said processor command means and responsive to commands from said microprocessing unit for performing either a memory access bus cycle or a service access bus cycle depending on the command from said microprocessing unit wherein memory address space is accessed during a memory access bus cycle and service cycle address space is addressed during a service bus cycle, said service bus cycle address space being divided into interrupt-acknowledge address space for space externally connected support devices and control and sense address space of said microprocessing unit to permit an extension of the functional capability of said microprocessing unit in a manner that is transparent to said externally connected support devices of said compatible microprocessor.

13. The bus control architecture recited in claim 12 wherein said interface control unit further comprises status means connected to said control means for buffering and transmitting sataus response signals from said interface control unit to said microprocessing unit according to the outcome of the execution of commands from said associated microprocessing unit.

14. The bus control architecture recited in claim 13 wherein said externally connected support devices of said compatible microprocessor may have various and different address and data widths, said externally connected support devices providing a width-identifying response to a bus cycle, and said control means further including mixed-width means responsive to a width-identifying response for dynamically initiating the required number of bus cycles to fulfill an access command from said microprocessing unit.

15. The bus control architecture recited in claim 14 wherein said microprocessing unit may access operands which are not aligned with integral boundaries of said externally connected support devices, and said control means further including alignment detection means for accessing non-aligned operands piecewise using separate bus cycles at each addressed field in memory address space within which any portion of the non-aligned operand is contained or directed.

16. The bus control architecture as recited in claim 13 wherein said control means further includes macrocycle control means for logically chaining related bus cycles for serialized access of said externally connected support devices in a macrocycle, said macrocycle control means prohibiting interruption of a macrocycle by any one of said externally connected support devices until said macrocycle has been completed.

17. The bus control architecture recited in claim 13 wherein said control means is further connected and responsive to other externally connected devices unrelated to said compatible microprocessor, the communication between said control means and said other externally connected devices being transparent to the connected support devices of said compatible microprocessor.

18. The bus control architecture recited in claim 17 wherein said control means further includes rerun means responsive to said externally connected support devices and said other externally connected devices for distinguishing between bus cycle rerun requests of said externally connected support devices and said other externally connected devices with means for the latter type of device to cancel a rerun request, said control means reporting a cancellation of a rerun requenst to said microprocessing unit.

19. The bus control architecture as recited in claim 13 wherein said control means further includes cancellation detection means responsive to a cancellation signal from an externally connected support device for cancelling that device's earlier response to a bus cycle, thereby providing for the overlap of that device's operation with the operation of said interface control unit.

20. The bus control architecture recited in claim 13 wherein said control means further includes interrupt detection means for detecting and reporting via said status means interrupt signals from said externally connected support devices.

21. The bus control architecture recited in claim 20 wherein said interrupt detection means includes means for detecting and reporting via said status means interrupt signals from other externally connected devices which are unrelated to said compatible microprocessor.

22. The bus control architecture recited in claim 21 wherein said interface control unit further includes bus arbitration means connected to said control means for effecting an orderly, prioritized and dynamic sharing of said address means and said data means.

23. The bus control architecture recited in claim 13 wherein said control means of said interface control unit unconditionally reports all externally connected device responses to said microprocessing unit via said status means during service bus cycles, said associated microprocessing unit controlling the content of the paths of said address means and said data means during said service bus cycles.

* * * * *